United States Patent
Abrahamsson et al.

(10) Patent No.: US 12,427,532 B2
(45) Date of Patent: Sep. 30, 2025

(54) MAGNETIC LEVITATION SYSTEM

(71) Applicant: President and Fellows of Harvard College, Cambridge, MA (US)

(72) Inventors: Christoffer Karl Abrahamsson, Cambridge, MA (US); Amit Arun Nagarkar, Cambridge, MA (US); Michael Johannes Fink, Cambridge, MA (US); Markus P. Nemitz, Cambridge, MA (US); Daniel John Preston, Cambridge, MA (US); Shencheng Ge, Cambridge, MA (US); Joseph Bozenko, Cambridge, MA (US); George M. Whitesides, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 633 days.

(21) Appl. No.: 17/439,281

(22) PCT Filed: Mar. 16, 2020

(86) PCT No.: PCT/US2020/022924
§ 371 (c)(1),
(2) Date: Sep. 14, 2021

(87) PCT Pub. No.: WO2020/190845
PCT Pub. Date: Sep. 24, 2020

(65) Prior Publication Data
US 2022/0152628 A1    May 19, 2022

Related U.S. Application Data

(60) Provisional application No. 62/819,382, filed on Mar. 15, 2019.

(51) Int. Cl.
*B03C 1/32* (2006.01)
*B03C 1/01* (2006.01)
(Continued)

(52) U.S. Cl.
CPC ............... *B03C 1/32* (2013.01); *B03C 1/01* (2013.01); *B03C 1/0332* (2013.01);
(Continued)

(58) Field of Classification Search
CPC ....... B03C 1/0335; B03C 1/01; B03C 1/0332; B03C 1/0337; B03C 1/32; B03C 1/288;
(Continued)

(56) References Cited

U.S. PATENT DOCUMENTS

| 4,508,625 A | 4/1985 | Graham |
| 6,902,065 B2 | 6/2005 | Kimura et al. |

(Continued)

FOREIGN PATENT DOCUMENTS

WO    WO-2020/190845 A1    9/2020

OTHER PUBLICATIONS

"2017 National Drug Threat Assessment," U.S. Department of Justice, Drug Enforcement Administration, Oct. 2017, DEA-DCT-DIR-040-17. (https://www.dea.gov/sites/default/files/2018-07/DIR-040-17_2017-NDTA.pdf). 182 pages.
(Continued)

*Primary Examiner* — An H Do
(74) *Attorney, Agent, or Firm* — Wilmer Cutler Pickering Hale and Dorr LLP

(57) ABSTRACT

A magnetic levitation system is described, including a first and second magnets having surfaces of their like-poles facing each other; and a container disposed between the first and second magnets' like poles and containing a solution including a paramagnetic complex in a non-aqueous solvent, where the paramagnetic complex includes a paramagnetic
(Continued)

metal and at least one ligand that coordinates to the paramagnetic metal via electron donation. Methods of separating a mixture of solid compounds, and/or identifying, confirming, and/or predicting the composition of the mixture, are also described.

61 Claims, 48 Drawing Sheets

(51) Int. Cl.
    B03C 1/033    (2006.01)
    B03C 1/28    (2006.01)
    G01N 1/28    (2006.01)
    G01N 21/65    (2006.01)
    G06N 3/08    (2023.01)

(52) U.S. Cl.
    CPC .......... *B03C 1/0335* (2013.01); *B03C 1/0337* (2013.01); *B03C 1/288* (2013.01); *G01N 1/28* (2013.01); *G01N 21/65* (2013.01); *G06N 3/08* (2013.01); *B03C 2201/18* (2013.01); *B03C 2201/26* (2013.01)

(58) Field of Classification Search
    CPC ............ B03C 2201/26; B03C 2201/18; G01N 21/65; G01N 1/28; G06N 3/08
    See application file for complete search history.

(56) References Cited

U.S. PATENT DOCUMENTS

| | | | | |
|---|---|---|---|---|
| 8,689,981 | B2* | 4/2014 | Stone | B03C 1/01 209/214 |
| 10,357,780 | B2* | 7/2019 | Kang | G01N 33/54366 |
| 10,468,301 | B2* | 11/2019 | Cao | H01L 22/10 |
| 11,676,750 | B2* | 6/2023 | Ge | H02N 15/00 73/32 R |
| 2014/0123461 | A1 | 5/2014 | Whitesids et al. | |
| 2015/0135829 | A1 | 5/2015 | Whitesides et al. | |

OTHER PUBLICATIONS

"2018 Annual Surveillance Report of Drug-Related Risks and Outcomes, United States," CDC National Center for Injury Prevention and Control, U.S. Department of Health and Human Services, Aug. 31, 2018. 91 pages.
"2018 National Drug Threat Assessment," U.S. Department of Justice, Drug Enforcement Administration, Oct. 2018, DEA-DCT-DIR-032-18. (https://www.dea.gov/sites/default/files/2018-11/DIR-032-18%202018%20NDTA%20final%20low%20resolution.pdf). 164 pages.
"Acetyl fentanyl (N-(1-phenethylpiperidin-4-yl)-N-phenylacetamide)," Drug Enforcement Admininstraction, Diversion Control Division, Drug & Chemical Evaluation Section, Oct. 2018. 2 page. (www.deadiversion.usdoj.gov/drug_chem_info/acetylfentanyl.pdf).
"Carbon Tetrachloride," Material Safety Data Sheet, Matheson Tri-Gas, Inc., Jan. 24, 1989, (https://www.mathesongas.com/pdfs/msds/MAT04310.pdf). 8 pages.
"Carfentanil: A Dangerous New Factor in the U.S. Opioid Crisis," Drug Enforcement Administration, Office Safety Alert, available online Dec. 21, 2016. 1 page.
"DEA Warning to Police and Public: Fentanyl Exposure Kills," U.S. Department of Justice, Drug Enforcement Administration, Jun. 10, 2016, (https://www.dea.gov/press-releases/2016/06/10/dea-warning-police-and-public-fentanyl-exposure-kills). 4 pages.
"Decane," No. D901 Sigma Aldrich, (https://www.sigmaaldrich.com/catalog/product/sigald/d901), May 8, 2019. 8 pages.
"European Drug Report, Trends and Developments," European Monitoring Centre for Drugs and Drug Addiction (2014), 10.2810/32306 (https://publications.europa.eu/en/publication-detail/-/publication/ee6d3292-0624-44ce-a692-b12ce6cdbc12/). 88 pages.
"European Drug Report, Trends and Developments," European Monitoring Centre for Drugs and Drug Addiction (2018), ISBN: 978-92-9497-272-9, ISSN: 2314-9086, Pub. DOI: 10.2810/800331. (http://www.emcdda.europa.eu/publications/edr/trends-developments/2018_en). 96 pages.
"Guidelines on Sampling of Illicit Drugs for Quantitative Analysis," European Network of Forensic Science Institutes, Drugs Working Group, Ref. Code: DWG-GQS-002, Issue No. 001, Apr. 2014. (http://enfsi.eu/wp-content/uploads/2016/09/guidelines_quant_sampling_dwg_printing_vf4.pdf). 82 pages.
"Heptane," No. 34873 Sigma Aldrich, (https://www.sigmaaldrich.com/catalog/product/sigald/34873,) May 8, 2019. 9 pages.
"Information Bulletin; Crystal Methamphetamine," U.S. Department of Justice, Drug Enforcement Administration, Aug. 2002, Document ID: 2002-L0424-005, 11pages. (https://www.justice.gov/archive/ndic/pubs1/1837/1837t.htm).
"Methamphetamine, A European Union perspective in the global context," European Monitoring Centre for Drugs Drug Addiction (2009), issue 1, ISSN 1831-4929. (http://www.emcdda.europa.eu/publications/joint-publications/methamphetamine_en). 32 pages.
"Methods of Analysis/Analytical Scheme for Identification of Drugs or Chemicals", Revision to Part III B of Scientific Working Group for the Analysis of Seized Drugs (SWGDRUG) Recommendations, U.S. Department of Justice Drug Enforcement Administration, revised Aug. 4, 2018. 6 pages. (https://www.swgdrug.org/Documents/Part%20IIIB_082018_CLEAN.pdf).
"Nonane," No. N29406, Sigma Aldrich, https://www.sigmaaldrich.com/catalog/product/sigald/n29406, May 8, 2019. 8 pages.
"Octane", No. 296988 Sigma Aldrich, (https://www.sigmaaldrich.com/catalog/product/sial/296988,) May 8, 2019. 8 pages.
"Oxycontin," RxList.com, May 3, 2019, (https://www.rxlist.com/oxycontin-drug.htm#description). 4 pages.
"Portable Infrared Spectroscopy Chemical Detectors Assessment Report," U.S. Department of Homeland Security, Jun. 2016, (https://www.dhs.gov/sites/default/files/publications/Portable-Infrared-Spectroscopy-Chemical-Detectors-ASR_0616-508.pdf). 36 pages.
"Reducing Working Exposure to Perchloroethylene (PERC) in Dry Cleaning," United States Department of Labor, Occupational Safety and Health Administration, OSHA 3253-05N 2005, (https://www.osha.gov/dsg/guidance/perc.pdf). 28 pages.
"Solvents," Sigma Aldrich, (https://www.sigmaaldrich.com/chemistry/solvents/hexane-center.html), May 8, 2019. 7 pages.
"Statistical Bulletin 2017—Price, purity and potency," European Monitoring Centre for Drugs and Drug Addiction (2017), (http://www.emcdda.europa.eu/data/stats2017/ppp_en). 7 pages.
"Tetrachloroethylene," No. 371696 Sigma Aldrich, (https://www.sigmaaldrich.com/catalog/product/sial/371696), May 8, 2019. 8 pages.
"US Hazardous Materials Identification System (HMIS)," Chemsafetypro.com, Dec. 30, 2015, (https://www.chemsafetypro.com/Topics/USA/Hazardous_Materials_Identification_System_HMIS.html). 4 pages.
Abrahamsson et al., "Analysis of Powders Containing Illicit Drugs Using Magnetic Levitation," Angew. Chem. Int. Ed., Jan. 7, 2020, vol. 59(2), pp. 874-881.
Amlani et al., "Why the FUSS (Fentanyl Urine Screen Study)? A cross-sectional survey to characterize an emerging threat to people who use drugs in British Columbia, Canada," Harm Reduction Journal, Nov. 14, 2015, vol. 12:54, pp. 1-7.
Annual Surveillance Report of Drug-Related Risks and Outcomes, U.S. Department of Health and Human Services, Centers for Disease Control and Prevention, National Center for Injury Prevention and Control (2017). 83 pages. (https://www.cdc.gov/drugoverdose/pdf/pubs/2017-cdc-drug-surveillance-report.pdf).
Armenian et al., "Fentanyl, fentanyl analogs and novel synthetic opioids: A comprehensive review," Neuropharmacology (2018), available online Oct. 14, 2017, vol. 134, pp. 121-132.
Ash et al., "Formation and identification of novel derivatives of primary amine and zwitterionic drugs," Forensic Chemistry Aug. 2018, vol. 10, pp. 37-47.

(56) References Cited

OTHER PUBLICATIONS

Atkinson et al., "Using Magnetic Levitation to Separate Mixtures of Crystal Polymorphs," Angewandte Chemie International Edition, Sep. 23, 2013, vol. 52(39), pp. 10208-10211.

Balchin et al., "The unusual solid state structure of heroin hydrochloride monohydrate and its slective detection using NQR spectroscopy," New J. Chem., available online Oct. 4, 2004, vol. 28, pp. 1309-1314.

Barfidokht et al., "Wearable electrochemical glove-based sensor for rapid and on-site detection of fentanyl," Sensors and Actuators: B Chemical, available online Apr. 14, 2019, vol. 296: 126422. 6 pages.

Broseus et al., "The cutting of cocaine and heroin: A critical review," Forensic Science International, May 2016, vol. 262, pp. 73-83.

Brunt et al., "Drug testing in Europe: monitoring results of the Trans European Drug Information (TEDI) project," Drug Testing Analysis (2017), vol. 9, pp. 188-198, available online Feb. 17, 2016.

Buléon et al., "Starch granules: structure and biosynthesis," Int. J. Biol. Macromol., Aug. 1998, vol. 23, pp. 85-112.

Burks et al., "Detechip: A Sensor for Drugs of Abuse," J. Forensic Sciences, May 2010, vol. 55, pp. 723-727.

Bwambok et al., "Paramagnetic Ionic Liquids for Measurements of Density Using Magnetic Levitation," Aug. 23, 2013, Analytical Chemistry, vol. 85, pp. 8442-8447.

Cao et al., "Use of prediction methods to estimate true density of active pharmaceutical ingredients," Int. J. Pharm. (2008), available online Dec. 23, 2007, vol. 355, pp. 231-237.

Cheng et al., "Studies on the Validity of the Einstein Viscosity Law and Stokes' Law of Sedimentation," J. Polym. Sci., Mar. 1955, vol. 16, pp. 19-30.

Christie et al., in Encyclopedia of Psychopharmacology (Ed.: I. P. Stolerman), Springer Berlin Heidelberg, Berlin, Heidelberg, 2010, pp. 936-941. 37 pages.

Ciccarone, "Fentanyl in the US heroin supply: A rapidly changing risk environment," International Journal of Drug Policy, Aug. 2017, vol. 46, pp. 107-111.

Cole et al., "Cut: A Guide for Adulterants, Bulking agents and other Contaminants found in Illicit drugs," Centre for Public Health, Liverpool John Moores University, Apr. 2010, (http://www.cph.org.uk/wp-content/uploads/2012/08/cut-a-guide-to-the-adulterants-bulking-agents-and-other-contaminants-found-in-illicit-drugs.pdf). 59 pages.

Coulson et al., "Scheduling of newly emerging drugs: a critical review of decisions over 40 years," Addiction, Apr. 2012, vol. 107, pp. 766-773.

Curtis et al., "Relative potency of controlled-release oxycodone and controlled-release morphine in a postoperative pain model," Eur. J. Clin. Pharmacol., Aug. 1999, vol. 55, p. 425-429.

Davis, "TruDefender FTX," Thermo Fisher Scientific, Inc., CBRNE Tech Index, Jul. 10, 2019, (http://www.cbrnetechindex.com/Print/3561/thermo-fisher-scientific-inc/trudefender-ftxftxi). 3 pages.

De Araujo et al., "Portable analytical platforms for forensic chemistry: A review," Anal. Chim. Acta, available online Jun. 11, 2018, vol. 1034, pp. 1-21.

DEA Intelligence Report, "2015 Heroin Domestic Monitor Program," U.S. Department of Justice, Drug Enforcement Administration, DEA-DCW-DIR-035-17, Oct. 2017. (https://www.dea.gov/sites/default/files/2018-07/HeroinDomesticMonitorProgram.pdf). 33 pages.

Dusek et al., "Sodium carbonate revisited," Acta Crystallogr. B, Struct. Sci., Jul. 2003, vol. 59, pp. 337-352.

Duvauchelle et al., "The Synergistic Effects of Combining Cocaine and Heroin ('Speedball') Using a Progressive-Ratio Schedule of Drug Reinforcement," Pharmacol. Biochem. Behav., Nov. 1998, vol. 61, pp. 297-302.

Edwards et al., "Metamorphosis of caffeine hydrate and anhydrous caffeine," J. Chem. Soc., Perkin Trans. 2, Jan. 1997, 1985-1990.

Elie et al., "Microcrystalline Tests in Forensic Drug Analysis," Encyclopedia of Analytical Chemistry: Applications, Theory and Instrumentation, Dec. 15, 2009, John Wiley & Sons, Ltd. online. 12 pages.

Elkins et al., "Colour quantitation for chemical spot tests for a controlled substances presumptive test database," Drug Testing and Analysis (2017), vol. 9, pp. 306-310, online Feb. 9, 2016.

Elversson et al., "Particle Size and Density in Spray Drying—Effects of Carbohydrate Properties," J. Pharm. Sci., Sep. 2005, vol. 94:9, pp. 2049-2060.

Evans, J., "400. The determination of the paramagnetic susceptibility of substances in solution by nuclear magnetic resonance," Chem. Soc., (1959), pp. 2003-2005.

Ferrier, "The crystal and molecular structure of β-D-Glucose," Acta Crystallogr., Oct. 1963, vol. 16, pp. 1023-1031.

Gabe et al., "The crystal and molecular structure of l-cocaine hydrochloride," Acta Crystallogr., (1963), vol. 16, pp. 796-801.

Gao et al., "Label-free manipulation via the magneto-Archimedes effect: fundamentals, methodology and applications," Mater. Horizons, Apr. 3, 2019, vol. 6, pp. 1359-1379.

Ge et al., "Magnetic Levitation in Chemistry, Materials Science, and Biochemistry," Angew. Chem. Int. Ed. (2020), Jun. 4, 2019, vol. 59, pp. 17810-17855.

Ge et al., "Magnetic Levitation to Characterize the Kinetics of Free-Radical Polymerization," J. Am. Chem. Soc., Dec. 6, 2017, vol. 139, pp. 18688-18697.

Gehl et al., "Introduction to Criminal Investigation: Processes, Practices and Thinking Introduction to Criminal Investigation: Processes and Thinking," Justice Institute of British Columbia (2016), (http://uilis.unsyiah.ac.id/oer/files/original/93e658ee61ec01d69c97becccd1221c3.pdf). 182 pages.

George et al., "Carfentanil—an ultra potent opioid," Am. J. Emerg. Med., May 2010, vol. 28, pp. 530-532.

Girolami et al., "Synthesis and Technique in Inorganic Chemistry. A laboratory Manual," Third Edition, University Science Books, Sausalito, CA, Aug. 1999. 273 pages.

Gogolashvili et al., "New paramagnetic relaxation reagent for water-in-oil emulsions," Magn. Reson. Imaging (1994), vol. 12(2), pp. 299-300.

Goodchild et al., "Ionic Liquid-Modified Disposable Electrochemical Sensor Strip for Analysis of Fentanyl," Anal. Chem., Feb. 18, 2019, vol. 91, pp. 3747-3753.

Goodfellow et al., "Deep Learning (Adaptive Computation and Machine Learning series)", MIT press, 2016 800pp, ISBN: 0262035618, a Book Review in Genet Program Evolvable Mach (2018), published online Oct. 29, 2017, vol. 19: pp. 305-307.

Gruner, "The Crystal Structures of Talc and Pyrophyllite," Cryst. Mater., (1934), vol. 88, pp. 412-419.

Guyton et al., "Human Health Effects of Tetrachloroethylene: Key Findings and Scientific Issues," Environ. Health Perspect., Apr. 2014, vol. 122, pp. 325-334.

Haddad et al., "Detection and Quantitation of Trace Fentanyl in Heroin by Surface-Enhanced Raman Spectroscopy," Anal. Chem., Sep. 24, 2018, vol. 90, pp. 12678-12685.

Harper et al., "An overview of forensic drug testing methods and their suitability for harm reduction point-of-care services," Harm Reduction Journal, Jul. 31, 2017, vol. 14:52, pp. 1-13.

Hedegaard et al., "Drug Overdose Deaths in the United States, 1999-2016," U. S. Department of Health and Human Services, Centers for Disease Control and Prevention, NSHS Data Brief, No. 294, Dec. 2017. 8 pages. (https://www.cdc.gov/nchs/products/databriefs/db294.htm).

Herskowitz et al., "N-Hexane Neuropathy. A syndrome occurring as a result of industrial exposure," New Engl. J. Med., Jul. 8, 1971, vol. 285(2), pp. 82-85.

Hiolski, "Powerful detection technology for powerful new street drugs," Nov. 13, 2017, pp. 37-39.

Hodges et al., "Fourier Transform Raman Spectroscopy of Illicit Drugs," Journal of Raman Spectroscopy, Nov. 1989, vol. 20(11), pp. 745-749.

International Search Report and Written Opinion mailed Jun. 10, 2020, in the International Patent Application No. PCT/US2020/022924. 8 pages.

Jenkins et al., "A method for delivering smoked drug of abuse in humans: preliminary findings," NIDA Res. Monogr. (1994), vol. 141, p. 401.

(56) References Cited

OTHER PUBLICATIONS

Kanters et al., "The crystal and molecular structure of β-d-fructose, with emphasis on anomeric effect and hydrogen-bond interactions," Acta Crystallographica Section B, Mar. 1977, vol. 33(3), pp. 665-672.

Kashino et al., "The structure of Procaine," Acta Crystallographica Section B (1982), vol. B38, pp. 1868-1870.

Kranzler et al., "Evaluation of a point-of-care testing product for drugs of abuse; testing site is a key variable," Drug Alcohol Depend., Nov. 1995, vol. 40, pp. 55-62.

Krishna Murthy et al., "Structural studies of analgesics and their interactions. V. The crystal and molecular structure of metamizol monohydrate," Acta Crystallographica Section B, Mar. 1979, vol. 35(3), pp. 612-615.

Langkilde et al., "Quantitative FT-Raman analysis of two crystal forms of a pharmaceutical compound," Journal of Pharmaceutical and Biomedical Analysis, Mar. 1997, vol. 15(6), pp. 687-696.

Lin et al., "Relationships between amylopectin molecular structures and functional properties of different-sized fractions of normal and high-amylose maize starches," Food Hydrocoll., Jan. 2016, vol. 52, pp. 359-368.

Lockett et al., "Analyzing Forensic Evidence Based on Density with Magnetic Levitation," Journal of Forensic Sciences, Jan. 2013, vol. 58(1), pp. 40-45.

Matheys et al., "Magnetic Levitation as a Tool for Separation: Separating Cocrystals from Crystalline Phases of Individual Compounds," Crystal Growth & Design, Aug. 10, 2016, vol. 16, No. 9, pp. 5549-5553.

Mirica et al., "Measuring Densities of Solids and Liquids Using Magnetic Levitation: Fundamentals," J. Am. Chem. Soc., published online Jul. 2, 2009, vol. 131, pp. 10049-10058.

Mirica et al., Magnetic Levitation in the Analysis of Foods and Water, Journal of Agricultural and Food Chemistry, published online May 13, 2010, vol. 58, pp. 6565-6569; and Supporting Information, pp. S1-S20. 25 pages.

Morel et al. "Time-series averaging using constrained dynamic time warping with tolerance," Pattern Recognition, Feb. 2018, vol. 74, pp. 77-89.

Moros et al., "Nondestructive Direct Determination of Heroin in Seized Illicit Street Drugs by Diffuse Reflectance near-Infrared Spectroscopy," Anal. Chem., Oct. 1, 2008, vol. 80, pp. 7257-7265.

Nemiroski et al., "High-Sensitivity Measurement of Density by Magnetic Levitation," Analytical Chemistry, Jan. 27, 2016, vol. 88, pp. 2666-2674.

Nemiroski et al., "Tilted Magnetic Levitation Enables Measurement of the Complete Range of Densities of Materials with Low Magnetic Permeability," Journal of the American Chemical Society, Jan. 2016, vol. 138, pp. 1252-1257.

Nemitz et al., "Multi-functional sensing for swarm robots using time sequence classification: HoverBot, an example," Frontiers in Robotics and AI, May 17, 2018, vol. 5(55), pp. 1-13.

Ogawa et al., "Crystal Structure of Fentanyl Base," X-Ray Struct. Anal. Online (2009), vol. 25, pp. 83-84.

Peeters et al., "Crystal and molecular structure of N-[1-(2-phenylethyl)-4-piperidinylium]-N-phenylpropanamide (fentanyl) citrate-toluene solvate," J. Cryst. Mol. Struct., Jun. 1979, vol. 9, pp. 153-161.

Petitjean et al., "A global averaging method for dynamic time warping, with applications to clustering," Pattern Recognition, Mar. 2011, vol. 44(3), pp. 678-693.

Philp et al., "A review of chemical 'spot' tests: A presumptive illicit drug identification technique," Drug Test Anal., Jan. 2018, vol. 10, pp. 95-108.

Rannazzisi et al., "Practitioner's Manual: An Informational Outline of the Controlled Substances Act," U.S. Department of Justice, Drug Enforcement Administration, 2006 Edition, (https://www.deadiversion.usdoj.gov/pubs/manuals/pract/pract_manual012508.pdf). 67 pages.

Reynolds et al., "Crystal and molecular structure of the alkaloid papaverine hydrochloride," J. Cryst. Mol. Struct., Jul. 1974, vol. 4, pp. 213-225.

Roelfsema et al., "Lactose and Derivatives," Ullmann's Encyclopedia of Industrial Chemistry, 7th, Completely Revised Edition, vol. 20, Wiley, New York (2010). 12 pages.

Ruangyuttikarn et al.,"Detection of Fentanyl and its Analogs by Enzyme-Linked Immunosorbent Assay," J. Anal. Toxicol., May/Jun. 1990, vol. 14, pp. 160-164.

Sakoe et al. "Dynamic Programming Algorithm Optimization for Spoken Word Recognition, from IEEE 1978," Readings in Speech Recognition, Chapter 4.3, pp. 159-165. Morgan Kaufmann Publishers, Inc., San Mateo, CA, (1990). 13 pages.

Sands, "The crystal structure of dimethyl sulfone," Zeitschrift fur Kristallographie—Crystalline Materials (1963), vol. 119, pp. 245-251.

Scientific Working Group for the Analysis of Seized Drugs (SWGDRUG) Recommendations, U.S. Deparment of Justice Drug Enforcement Administration, Revision 6, Jul. 7, 2011. 72 pages. (http://www.swgdrug.org/documents/SWGDRUG%20Recommendations%206.pdf).

Simon et al., "Opioid Receptor Multiplicity: Isolation, Purification, and Chemical Characterization of Binding Sites," Chapter 1, pp. 3-9 from Opioids I, Handbook of Experimental Pharmacology, vol. 104/I, Springer Nature; 1st edition (Jan. 1, 1993)—Springer Science & Business Media (Dec. 6, 2012), Springer-Verlag, Berlin Germany. 9 pages.

Spicher et al., "The Evaluation of Portable Handheld Raman Systems for the Presumptive Identification of Narcotics: Thermo Scientific TruNarc and Chemring Detection Systems PGR-1064," Marshall University, Marshall University Forensic Science Center (2016), (https://www.marshall.edu/forensics/files/SpicherCristina_FINAL-Research-Paper_8_3_-2016.pdf). 38 pages.

Subramaniam et al., "Noncontact orientation of objects in three-dimensional space using magnetic levitation," PNAS, Sep. 9, 2014, vol. 111(36), pp. 12980-12985.

Tsumura et al., "False positives and false negatives with a cocaine-specific field test and modification of test protocol to reduce false decision," Forensic Science International, available online Jan. 18, 2005, vol. 155, pp. 158-164.

Turker et al., "Recent Advances in Magnetic Levitation: A Biological Approach from Diagnostics to Tissue Engineering," ACS Biomaterials Science & Engineering, Feb. 6, 2018, vol. 4, pp. 787-799.

Wang et al., "Development of a homogeneous immunoassay for the detection of fentanyl in urine," Forensic Sci. Int., Mar. 20, 2011, vol. 206, pp. 127-131.

Want et al., "Magnetic moment measurements of gadolinium, holmium and ytterbium tartrate trihydrate crystals," Journal of Alloys and Compounds (2008), vol. 448, pp. L5-L6, available online Jan. 11, 2007.

Xie et al., "An accurate and versatile density measurement device: Magnetic levitation," Sensors Actuators B: Chem., available online May 22, 2019, vol. 295, pp. 204-214.

Yaman et al., "Magnetic Force-Based Microfluidic Techniques for Cellular and Tissue Bioengineering," Front. bioeng. biotechnol., Dec. 19, 2018, vol. 6(192), pp. 1-29.

Zhang et al., "Single-Ring Magnetic Levitation Configuration for Object Manipulation and Density-Based Measurement," Analytical Chemistry, Jun. 27, 2018, vol. 90, pp. 9226-9233.

Zhao et al., "Label-Free Microfluidic Manipulation of Particles and Cells in Magnetic Liquids," Advanced Functional Materials, published online Apr. 14, 2016, vol. 26, pp. 3916-3932.

\* cited by examiner cocaine·HCl and levamisole·HCl fentanyl·HCl and dipyrone lidocaine·HCl and caffeine

MAGNETIC LEVITATION SYSTEM

CROSS-REFERENCE TO RELATED APPLICATIONS

This application is a U.S. National Stage application under 35 U.S.C. § 371 of International Application No. PCT/US2020/022924, filed on Mar. 16, 2020, which claims the benefit of and priority to U.S. Provisional Patent Application No. 62/819,382, filed Mar. 15, 2019, which is hereby incorporated by reference in its entirety.

STATEMENT REGARDING FEDERALLY SPONSORED RESEARCH OR DEVELOPMENT

This invention was made with government support under 1420570 awarded by the National Science Foundation; W911NF-18-2-0030 awarded by the U.S. Army Research Office; and DE-FG02-00ER45852 awarded by the U.S. Department of Energy. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described therein.

FIELD OF THE INVENTION

The present disclosure relates generally to the field of analytical chemistry. More particularly, the present disclosure relates to density analysis.

SUMMARY OF THE INVENTION

In one aspect, a magnetic levitation system includes:
a first and second magnets having surfaces of their like-poles facing each other; and
a container disposed between the first and second magnets' like poles and containing a solution including a paramagnetic complex in a non-aqueous solvent; where the paramagnetic complex includes a paramagnetic metal and at least one ligand that coordinates to the paramagnetic metal via electron donation.

In any one of the embodiments described herein, the paramagnetic complex has the structure

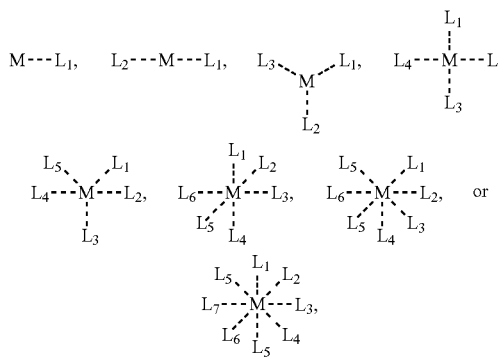

where M is a paramagnetic metal and $L_1, L_2, L_3, L_4, L_5, L_6, L_7$, and $L_8$ are ligands that coordinate to the paramagnetic metal via electron donation.

In any one of the embodiments described herein, $L_1, L_2, L_3, L_4, L_5, L_6, L_7$, and $L_8$ are independently selected from the group consisting of substituted or unsubstituted phosphine oxides, oxazoles, imidazoles, pyridines, diamines, bipyridines, phenanthrolines, diketonates, malonamides, malonates, β-ketoesters, β-ketoamides, carboxylates, dicarboxylates, and ethylenediaminetetraacetic acid.

In any one of the embodiments described herein, two or more of $L_1, L_2, L_3, L_4, L_5, L_6, L_7$, and $L_8$ are covalently bonded to a substituent group consisting of 1-20 carbon atoms.

In any one of the embodiments described herein, at least one of $L_1, L_2, L_3, L_4, L_5, L_6, L_7$, and $L_8$ includes

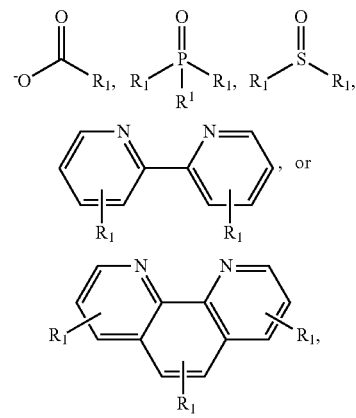

where each occurrence $R_1$ is independently H, $(C_1-C_{20})$alkyl, $(C_2-C_{20})$alkenyl, $(C_2-C_{20})$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

In any one of the embodiments described herein, the paramagnetic complex has the structure

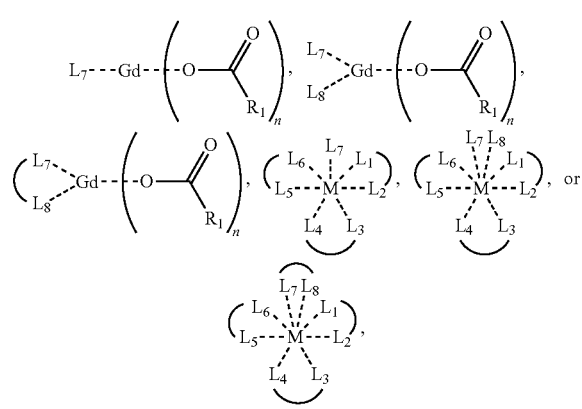

where n is an integer from 1-7 and where

denotes the group consisting of 1-20 carbon atoms.

In any one of the embodiments described herein,

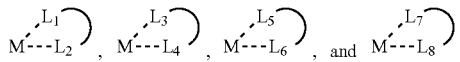

are independently selected from the group consisting of 2,2'-dipyridyl, optionally substituted with one or more $R_1$, 1,10-phenanthrenyl, optionally substituted with one or more $R_1$, and

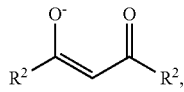

where each occurrence of $R_2$ is independently H, $(C_1-C_{20})$alkyl, $(C_2-C_{20})$alkenyl, $(C_2-C_{20})$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

In any one of the embodiments described herein, the paramagnetic complex has the structure,

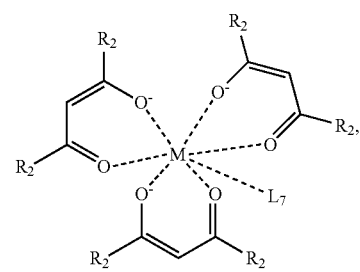

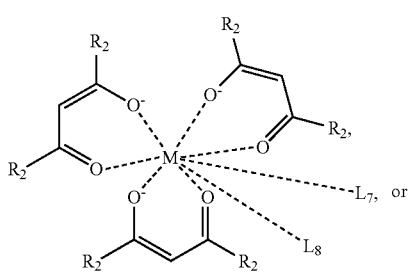

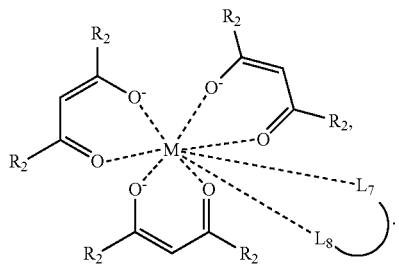

In any one of the embodiments described herein, the paramagnetic complex has the structure

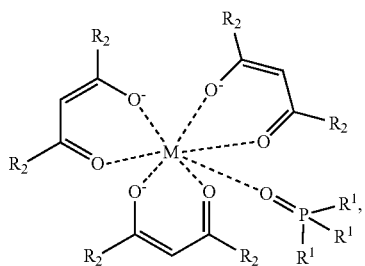

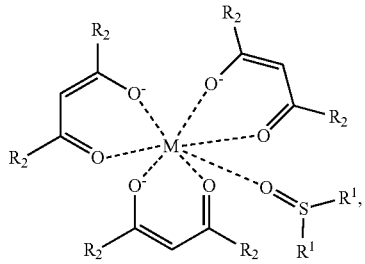

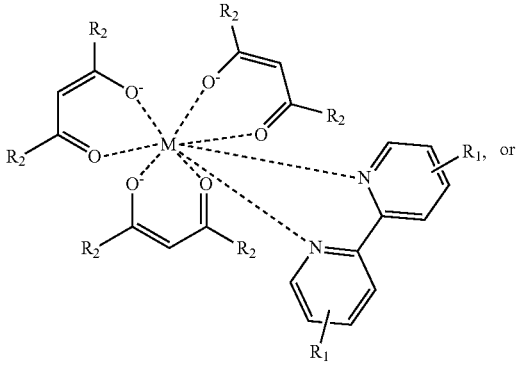

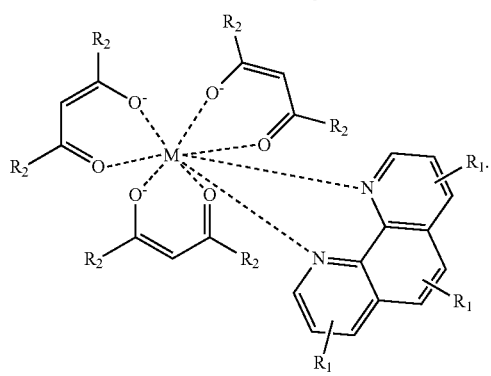

In any one of the embodiments described herein, each occurrence of $R_1$ and $R_2$ is independently $(C_1\text{-}C_{10})$alkyl or $(C_6\text{-}C_{10})$aryl.

In any one of the embodiments described herein, each occurrence of $R_1$ and $R_2$ is independently methyl, ethyl, propyl, butyl, pentyl, hexyl, heptyl, octyl, nonyl, decyl, phenyl, or isomers thereof.

In any one of the embodiments described herein, each occurrence of $R_1$ and $R_2$ is independently methyl, butyl, tert-butyl, octyl, or phenyl.

In any one of the embodiments described herein, M is selected from the group consisting of scandium, titanium, vanadium, chromium, manganese, iron, cobalt, nickel, cerium, praseodymium, neodymium, europium, gadolinium, terbium, dysprosium, copper, holmium, erbium, thulium, and lanthanum.

In any one of the embodiments described herein, M is gadolinium.

In any one of the embodiments described herein, the paramagnetic complex is

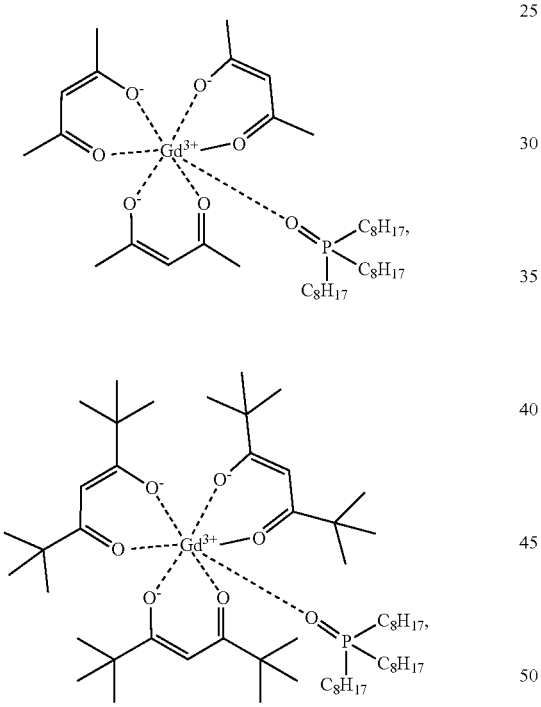

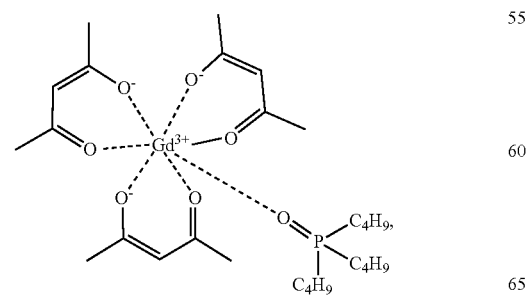

-continued

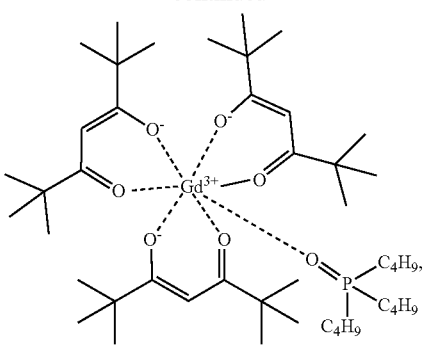

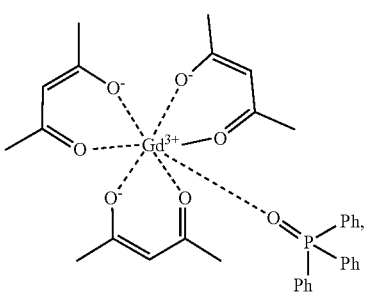

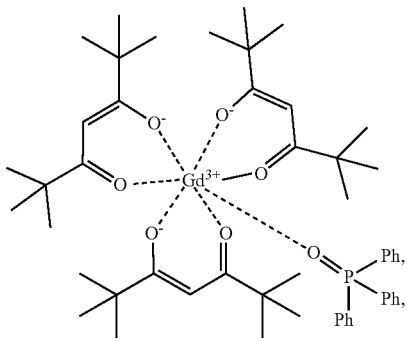

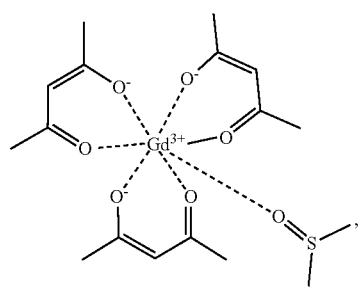

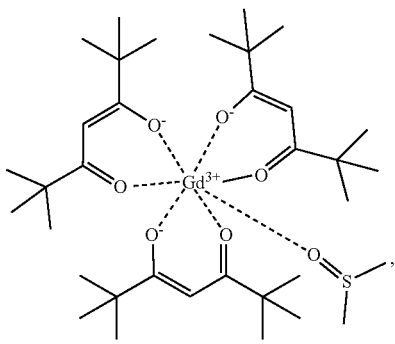

-continued

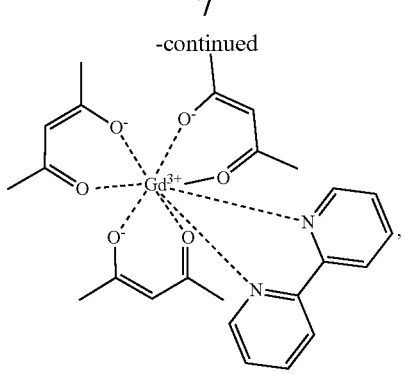

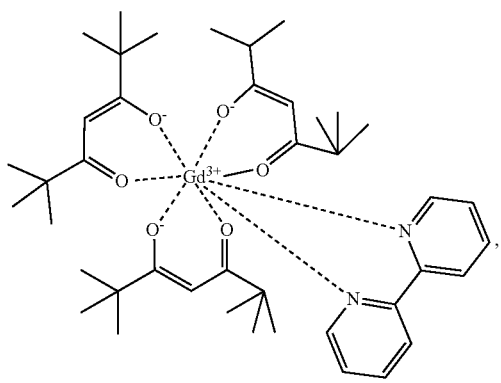

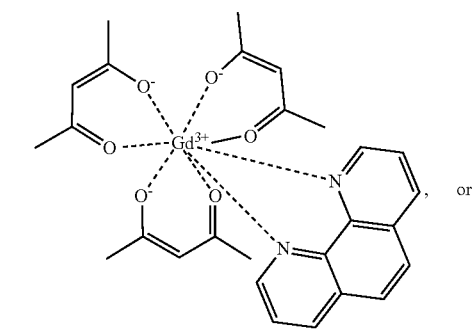

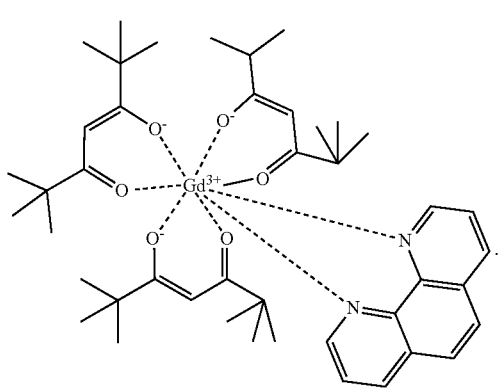

In any one of the embodiments described herein, the paramagnetic complex is

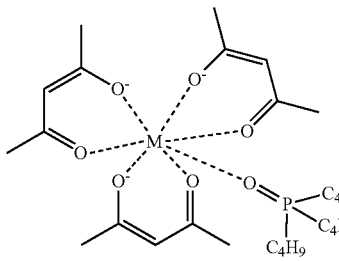

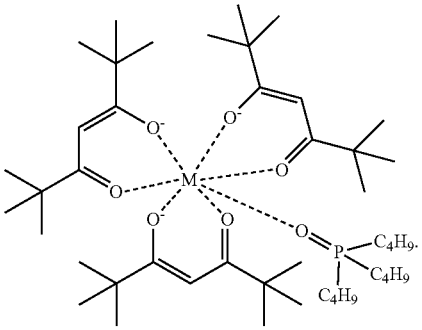

In any one of the embodiments described herein, the solvent is selected from the group consisting of acyclic and cyclic hydrocarbons, acyclic and cyclic halo- or per-halo hydrocarbons, aromatic hydrocarbons, acyclic and cyclic ethers, and acyclic and cyclic aldehydes, ketones, esters, amides, sulfides, sulfoxides, and sulfones, and a combination thereof.

In any one of the embodiments described herein, the solvent is pentane, hexane, heptane, octane, nonane, decane, undecane, dodecane, tetrachloroethylene, carbon tetrachloride, dichloromethane, trichloromethane, diethyl ether, tetrahydrofuran, ethyl acetate, butyl acetate, or a combination thereof.

In any one of the embodiments described herein, the solvent is hexane, tetrachloroethylene, or a combination thereof.

In any one of the embodiments described herein, the solvent is tetrachloroethylene.

In any one of the embodiments described herein, the system further includes a camera, or a light source to illuminate the container, or both.

In any one of the embodiments described herein, the container is an open or closed vessel capable of holding the solution.

In any one of the embodiments described herein, the container is made from a glass, a plastic, a polymer, a ceramic, one or more plant-based fibers in a polymer matrix, one or more plant-based fibers in a ceramic matrix, an aerogel, a gel including polar or apolar solvents, a non-ferromagnetic, non-ferrimagnetic, or non-paramagnetic metal, or a combination thereof.

In any one of the embodiments described herein, the container is a cuvette, jar, test tube, centrifuge tube, or capillary tube.

In any one of the embodiments described herein, the container is a cuvette.

In any one of the embodiments described herein, the first and second magnets are each independently selected from the group consisting of a permanent magnet, an electromagnet, and a superconducting magnet.

In any one of the embodiments described herein, the first and second magnets are permanent magnets.

In any one of the embodiments described herein, the first and second magnets are each independently neodymium magnets, samarium-cobalt magnets, ferrite magnets, or Alnico magnets.

In any one of the embodiments described herein, the first and second magnets are each independently shaped as a block, a cylinder, a sphere, a disc, or a ring.

In another aspect, a method of analyzing a sample including one or more solid compounds, the method including:

(a) providing the magnetic levitation system of any one of claims 1-29;

(b) depositing the sample in the solution; and (c) allowing each of the solid compounds in the sample to migrate to a position in the container indicative of its density.

In any one of the embodiments described herein, the method further includes (d) analyzing one or more of the solid compounds to determine or confirm its identity.

In any one of the embodiments described herein, step (d) includes positioning the container such that one or more of the compounds contact the wall of the container and analyzing said compound(s) through the wall of the container using a spectrometer.

In any one of the embodiments described herein, step (d) includes removing the one or more solid compounds from the container.

In any one of the embodiments described herein, the one or more solid compounds are removed using a pipette, a siphon, a spoon, a spatula, or a small basket.

In any one of the embodiments described herein, the analysis includes a technique selected from the group consisting of Fourier transform infrared spectroscopy with attenuated total reflectance, mass spectrometry, nuclear magnetic resonance spectroscopy, Raman spectroscopy, X-ray diffractometry, capillary electrophoresis, gas chromatography, ion-mobility spectrometry, liquid chromatography, microcrystalline tests, supercritical fluid chromatography, thin layer chromatography, ultraviolet/visible spectroscopy, microscopy, visual examination, colorimetric tests, fluorescence spectroscopy, immunoassays, melting point analysis, pharmaceutical package inserts, and combinations thereof.

In any one of the embodiments described herein, the technique includes a portable or handheld device.

In any one of the embodiments described herein, the technique is Fourier transform infrared spectroscopy with attenuated total reflectance, Raman spectroscopy, mass spectrometry, X-ray diffractometry, a colorimetric test, or a combination thereof.

In any one of the embodiments described herein, the Raman spectroscopy is conducted using a portable or handheld device.

In any one of the embodiments described herein, the sample is a crystalline or amorphous sample.

In any one of the embodiments described herein, the sample includes one or more controlled substances, adulterants, diluents, or a combination thereof.

In any one of the embodiments described herein, the sample includes fentanyl, acetyl fentanyl, benzyl fentanyl, carfentanyl, cocaine, heroin, oxycodone, methamphetamine, cannabinoids, lysergic acid diethylamide, methaqualone, methadone, hydromorphone, Ritalin, Adderall, peyote, 3,4-methylenedioxymethamphetamine, acetaminophen, caffeine, diltiazem, dipyrone/metamizole, lidocaine, hydroxyzine, levamisole, papaverine, procaine, phenacetin, dimethyl sulfone, D-fructose, D-glucose, α-lactose, D-mannitol, sodium carbonate, starch, including potato starch, sucrose, talc, quinine, butylated hydroxytoluene, hypromellose, polyethylene glycol, polyethylene oxide, magnesium stearate, titanium dioxide, an isomer thereof, a salt thereof, a combination thereof.

In any one of the embodiments described herein, the salt is a sodium, aluminum, potassium, calcium, hydrochloride, citrate, nitrate, sulfate, acetate phosphate, diphosphate, maleate, mesylate, tartrate, or gluconate salt.

In any one of the embodiments described herein, the salt is a hydrochloride salt.

In any one of the embodiments described herein, the sample includes a salt of fentanyl or caffeine.

In any one of the embodiments described herein, the one or more compounds are present in the sample between 0.01 and 100 weight percent.

In any one of the embodiments described herein, the one or more compounds are present in the sample between 0.01 and 10 weight percent.

In any one of the embodiments described herein, the method further includes:

(e) generating a profile of the position of the one or more compounds relative to the container; and (f) generating a database including a plurality of profiles, each of which corresponds to a known solid compound or a known mixture of solid compounds.

In any one of the embodiments described herein, the profile of the sample and the profiles of the database are determined at a plurality of time points after the sample is deposited in the solution in step (b).

In any one of the embodiments described herein, the method further includes:

(g) comparing the profile of the sample to the profiles in the database.

In any one of the embodiments described herein, step (g) further includes determining the identity of the compound based on the comparison.

In any one of the embodiments described herein, step (g) further includes: using a computer to calculate the distances between the generated profile of the sample and the profiles in the database to identify a profile in the database within a minimum distance to the generated profile; where the distance is a Euclidian or Mahalanobis distance.

In any one of the embodiments described herein, the profile in the database further includes the source of the known solid compound or the known mixture of solid compounds and step (g) further includes determining the source of the sample.

In any one of the embodiments described herein, step (g) further includes determining the particle size or the mixture of particle sizes of the compound.

In any one of the embodiments described herein, the profile in the database further includes a source of the compound and step (g) further includes determining the source of the sample.

In any one of the embodiments described herein, the method includes obtaining and processing spectroscopic, spectrometric, chromatographic, colorimetric, microscopic, photographic, or visual signals of the one or more solid compounds at a position in the container before, at predetermined times during migration, and after migration.

In any one of the embodiments described herein, the method includes obtaining and processing microscopic or photographic images of the one or more solid compounds at a position in the container before, at predetermined times during migration, and after migration.

In any one of the embodiments described herein, the light intensity of one or more portions of the image before, at predetermined times during migration, and after migration is measured.

In any one of the embodiments described herein, the signals, images, or light intensity measurements of the container are processed by using dynamic time warping, barycenter averaging, machine learning, or a combination thereof.

In any one of the embodiments described herein, the machine learning includes deep neural networks.

In any one of the embodiments described herein, the machine learning includes supervised deep learning to train a convolutional neural network on hundreds-to-thousands of signals, images, or light intensity measurements.

In any one of the embodiments described herein, the analysis of unknown mixtures includes inputting one or more generated signals, images, or light intensity measurements into the trained convolutional neural network and obtaining an output of the identity of the mixture.

BRIEF DESCRIPTION OF THE DRAWINGS

The invention is described with reference to the following figures, which are presented for the purpose of illustration only and are not intended to be limiting. In the Drawings.

DETAILED DESCRIPTION OF THE INVENTION

Figure 1A:
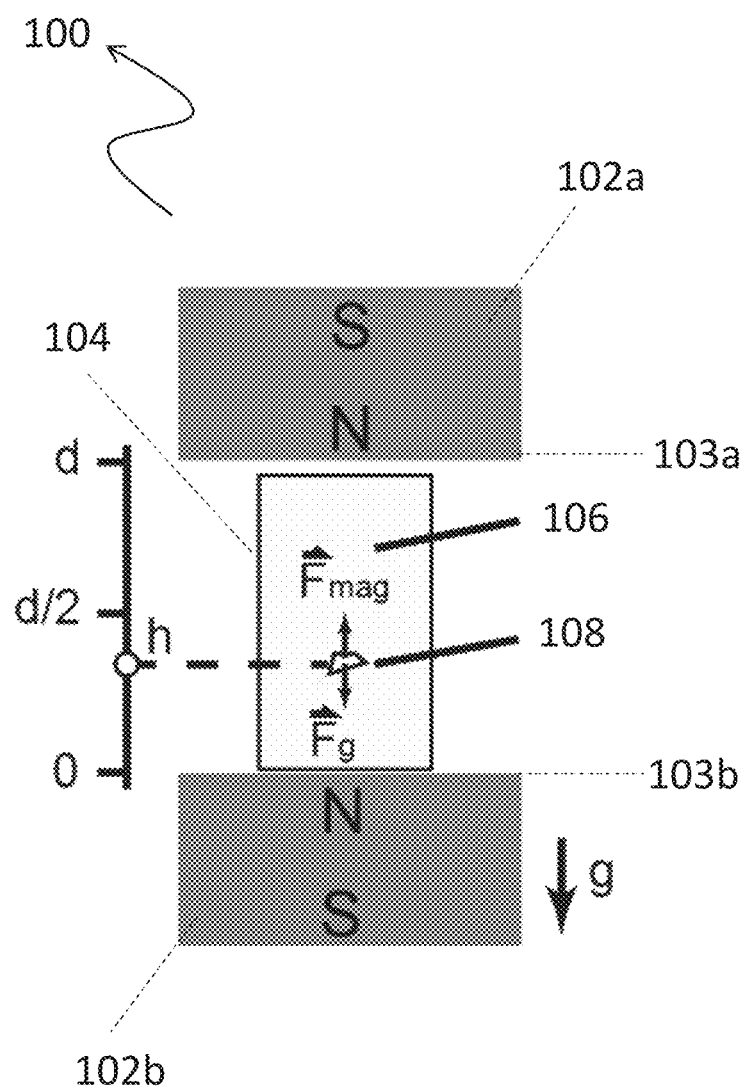
FIG. 1A shows a schematic diagram of a device for magneto-Archimedes levitation ("magnetic levitation" or "MagLev"), according to one or more embodiments.

Density can be useful to separate and characterize a wide range of materials. For example, a mixture of particles can be separated and identified based on their behavior in a uniform force gradient (e.g., viscous medium, centrifugal force, magnetic fields, and a combination thereof), which, in turn, is dependent upon their individual densities. Density can also be useful to separate, characterize, and identify both biological and non-biological materials. Density-based methods can be used to, for example, characterize materials, to separate, isolate, or fractionate sub-populations from complex mixtures, and to follow changes in density in systems (e.g., responses of biological cells to drug treatments, such as bacteria, and chemical reactions, such as polymerization).

Analytical methodologies—including simple centrifugation-based methods (e.g., Percoll gradient centrifugation) and more specialized techniques and types of instrumentation (e.g., methods based on pycnometers, density gradient columns, or vibrating tube densitometers)—are examples of the uses of density for analysis and separation. More complex approaches (e.g., microfluidics-based approaches using cantilever-based microresonators) are also expanding the uses of density.

Another technique that enables analysis and separation based on density is magneto-Archimedes levitation (also referred to as "magnetic levitation" or "MagLev"). Existing MagLev uses competing gravitational (buoyant) and magnetic forces to form an effectively continuous density gradient in an aqueous paramagnetic medium in a magnetic field. In some embodiments, a mixture of substances suspended, but not dissolved in, the aqueous paramagnetic medium separates into its component parts based on their densities in response to this gradient. In these embodiments, the existing configuration of MagLev-use of an aqueous paramagnetic medium-presents a challenge to separating or analyzing mixtures of substances in which one or more of its components are aqueous-soluble. Such mixtures include, but are not limited to, recreational drug compositions, pharmaceutical compositions, environmental samples, compositions from chemical manufacturers, compositions from manufacturers of polymers, and composition of food products or ingredients. To overcome this challenge, the inventors found that use of non-aqueous paramagnetic media including a paramagnetic metal complex soluble therein enables MagLev analysis of mixtures including aqueous-soluble substances.

MagLev System

The present invention is now described with reference to FIG. 1A. In some embodiments, a magnetic levitation system 100 is described, including: a first and second magnets (102a and 102b) having surfaces of their like poles 103a and 103b facing each other. A container 104 is disposed between the first and second magnets' (102a and 102b) like poles (103a and 103b) and contains a solution 106 including a paramagnetic complex in a non-aqueous solvent.

In some embodiments, the magnetic levitation system is described by reference to FIG. 2A. In these embodiments, the magnetic levitation system consists of a top magnet 200a and a bottom magnet 200b with their like poles, 202a and 202b, respectively, facing each other. A container 204 as described herein contains a paramagnetic gadolinium complex as described herein, a solvent as described herein, and a sample as described herein. In some embodiments, the container is a cuvette. In some embodiments, a ruler 206 is used to measure the height of one or more components of the sample in the cuvette. In some embodiments, molds 208 are used to hold the magnets 202a and 202b. In some embodiments, fasteners 210 are used to hold the magnets 202a and 202b, container 204, ruler 206, and molds 208 together.

Figure 22:
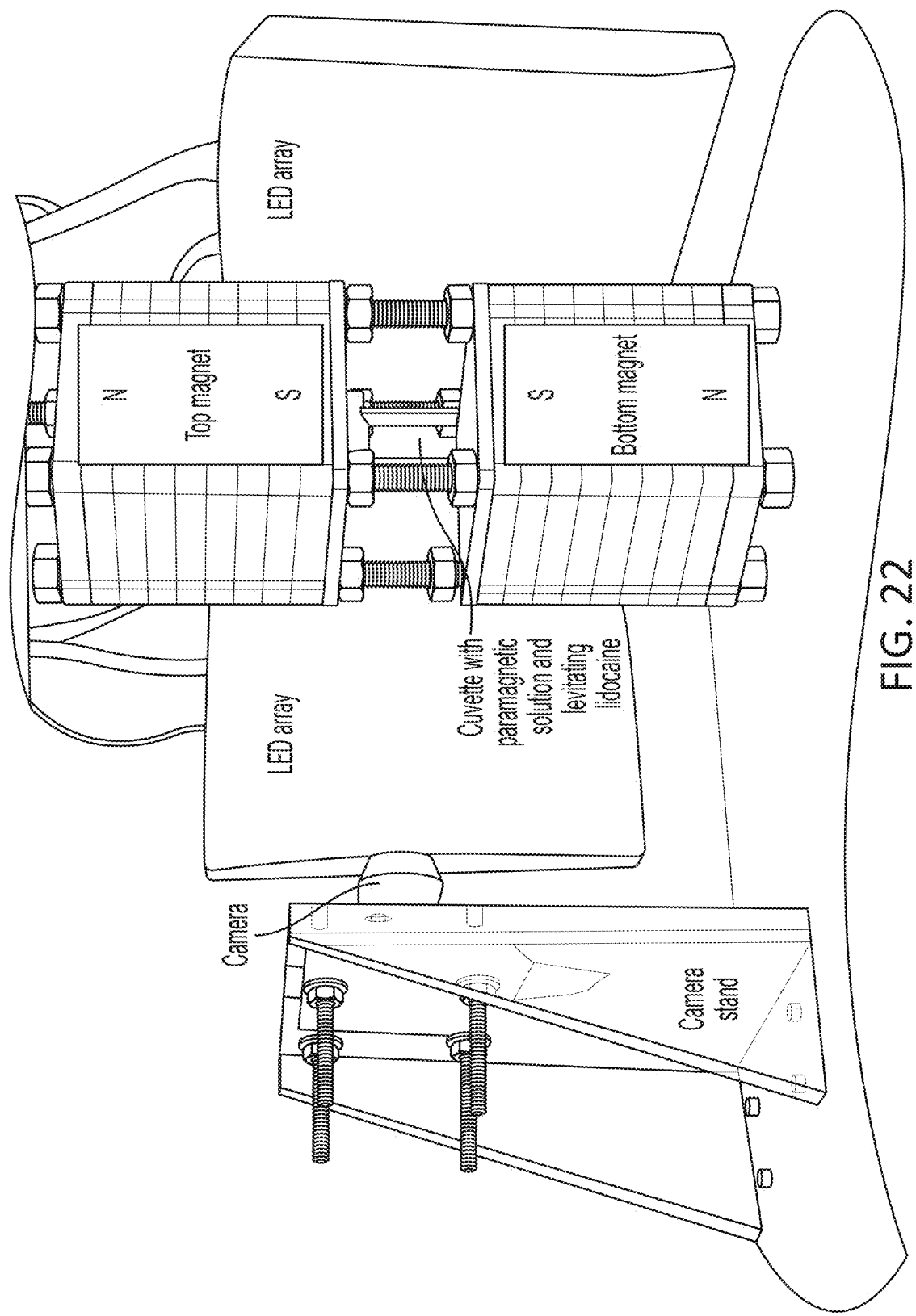
FIG. 22 shows a box with controlled cuvette illumination for imaging of samples separated in the MagLev device, according to one or more embodiments.

In some embodiments, the magnetic levitation system is described in FIG. 22, and further includes a camera and a light source for illumination of the container (cuvette).

In some embodiments, the container is any closed or open vessel, and constructed of any material that is capable of holding the paramagnetic medium. Non-limiting examples of materials include glass, plastic, and a non-magnetic/non-paramagnetic metal. Non-limiting examples of the container include cuvettes, jars, test tubes, centrifuge tubes, and capillary tubes.

In some embodiments, the first and/or second magnets are permanent magnets. In some embodiments, the first and/or second magnets are neodymium ("NdFeB") magnets. In some embodiments, the first and/or second magnets are samarium-cobalt ("SmCo") magnets. In some embodiments, the first and/or second magnets are ferrite magnets consisting of iron(III) oxide blended with one or more additional elements, such as barium, manganese, nickel, and zinc. In some embodiments, the first and/or second magnets are Alnico magnets consisting of aluminum, nickel, and cobalt alloys. In some embodiments, the first and/or second magnets are electromagnets. In some embodiments, the first and/or second magnets are superconductive electromagnets.

In some embodiments, the first and/or second magnets are shaped as blocks, cylinders, spheres, discs, rings, or other geometrical shapes.

MagLev System in Non-Aqueous Solutions

In certain embodiments, MagLev analysis of mixtures including aqueous-soluble substances are suspended in non-aqueous solution that include certain complexes.

In some embodiments, the complex has the structure $M(-L)_x$, where M is a paramagnetic metal, each L is independently a same or different ligand that coordinates to the metal via electron donation, and x is an integer from 1-8. In some embodiments, the complex has the structure

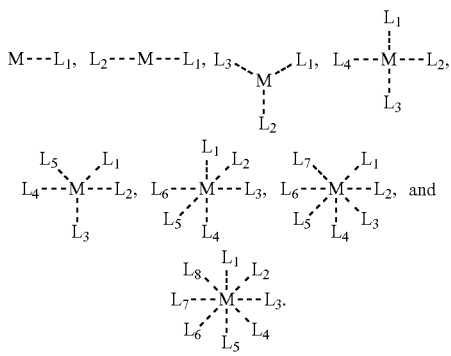

In addition to the above complexes, any other combination of $L_1$-$L_8$ are contemplated.

In some embodiments, certain of $L_1$-$L_8$ may be joined together by covalent bonding to a substituent group consisting of 1-20 carbon atoms, forming one or more multi-dentate ligands. Non-limiting examples of complexes with multi-dentate ligands include

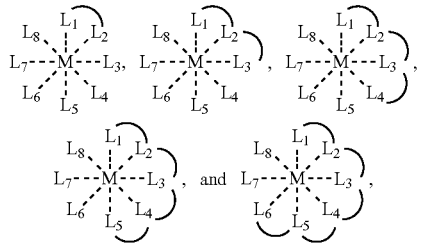

where the complex has a bi-dentate $L_1$-$L_2$ ligand, a tri-dentate $L_1$-$L_3$ ligand, a tetra-dentate $L_1$-$L_4$ ligand, a penta-dentate $L_1$-$L_5$ ligand, and a hexa-dentate $L_1$-$L_6$ ligand, respectively. The symbol

denotes the substituent group consisting of 1-20 carbon atoms. In addition to the structures shown above, any combination of mono- and multi-dentate ligands is contemplated.

Non-limiting examples of M include scandium, titanium, vanadium, chromium, manganese, iron, cobalt, nickel, cerium, praseodymium, neodymium, europium, gadolinium, terbium, dysprosium, copper, holmium, erbium, thulium, and lanthanum.

In some embodiments, at least one of $L_1$-$L_8$ includes electron-donating elements, electron-donating groups including said electron-donating elements, or combinations thereof. Non-limiting examples of electron-donating elements include oxygen, nitrogen, sulfur, and the like. Non-limiting examples of electron-donating groups include oxazoles, imidazoles, phosphine oxides (e.g., trioctylphosphine oxide, tributylphosphine oxide, and triphenylphosphine oxide), pyridines, bipyridines, phenanthrolines, diketones, diketonates, diamines, carboxylates (e.g., 2-methylvalerate and ethylenediaminetetraacetic acid), and the like.

In some embodiments, MagLev is used to separate one or more components of a mixture based on density. In certain embodiments, MagLev is used to separate one or more components of a mixture that is dissolvable in an aqueous solvent based on density. In some embodiments, the mixture can be suspended in a non-aqueous paramagnetic medium. In these embodiments, when this mixture is placed in a non-aqueous paramagnetic solution between two or more magnets with their like-poles facing each other, the components of the mixture will occupy different positions in the paramagnetic solution according to their density. In some embodiments, by comparing the levitation height of a particular substance in a particular paramagnetic solution to, for example, a table or database of levitation heights of substances in that paramagnetic solution, the identity of the substance can be determined. In other embodiments, alternatively or additionally, the separated components can be isolated from the paramagnetic solution and subjected to further analysis.

In other embodiments, MagLev, unlike some of the methods discussed above, is, for example, applicable to a wide range of samples, is highly portable, is relatively inexpensive, and provides relatively fast separation. Therefore, MagLev may be useful for analysis of samples in a wide range of settings. Non-limiting examples of such settings can include academic and industrial research, development, and manufacturing, including in the pharmaceutical and materials science fields, environmental testing, such as testing for pollutants and other contaminants, and law enforcement, such as forensic analysis. In some embodiments, MagLev can be used for forensic analysis of powdered mixtures of illicit drugs, adulterants, and/or diluents. In some embodiments, the separated substances are also readily retrievable from the paramagnetic medium by, for example, pipet, which highlights the added advantage of MagLev for both separation and analysis of mixtures.

In some embodiments, the exemplary advantages of MagLev make it an attractive means for analyzing mixtures of illicit drugs by, for example, forensic analysts in field settings. Small (e.g., <50 mg) samples of mixtures can be challenging to separate or characterize (e.g., determine the identities of the components thereof) because of the relatively low concentration or weight percent of the components of the mixture. Large mixtures (e.g., >50 mg), too, can be challenging to separate or characterize where one or more components of the mixture are present in low concentration or weight percent (e.g., <10 wt %). Therefore, in some embodiments, MagLev can be particularly useful for separation and identification of the components present in a complex mixture at dilute concentrations or low weight percent, including, but not limited to, small samples of illicit drugs that are diluted by adulterants and other dilutants.

In some embodiments, identifying illicit drugs are challenging because existing conventional paramagnetic solutions useful for MagLev are aqueous, and most illicit drugs are water-soluble. Moreover, existing conventional paramagnetic complexes useful for MagLev are not soluble in non-aqueous solvents. Applicants have surprisingly found that these challenges can be overcome by using certain paramagnetic complexes that are soluble in non-aqueous solvents. In some embodiments, the paramagnetic complex includes a scandium, titanium, vanadium, chromium, manganese, iron, cobalt, nickel, cerium, praseodymium, neodymium, europium, gadolinium, terbium, dysprosium, copper, holmium, erbium, thulium, or lanthanum complexe, each including at least one phosphine oxide, carboxylate, or diketonate ligand. In some embodiments, the paramagnetic complex includes a gadolinium complex including at least one phosphine oxide, carboxylate, or diketonate ligand, each containing electron-donating elements (e.g., oxygen and nitrogen) or groups (e.g., oxazoles, imidazoles, phosphine oxides, pyridines, bipyridines, and phenanthrolines.

Certain Paramagnetic Complexes

In certain embodiments, at least one of $L_1$-$L_8$ includes

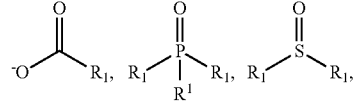

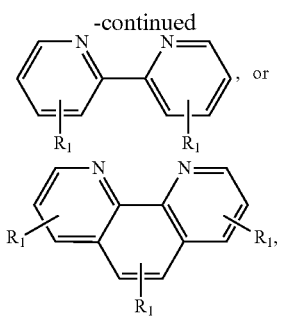

where each occurrence $R_1$ is independently H, $(C_1-C_{20})$alkyl, $(C_2-C_2M)$alkenyl, $(C_2-C_2M)$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

In some embodiments, the paramagnetic complex has the structure

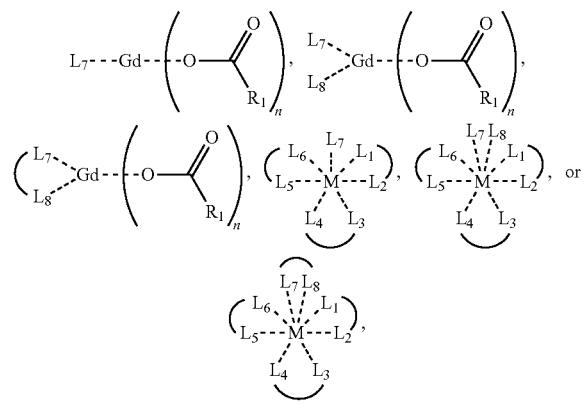

where n is an integer from 1-7 and where

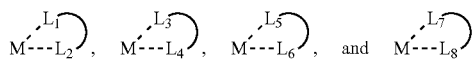

denotes the group consisting of 1-20 carbon atoms.

In some embodiments,

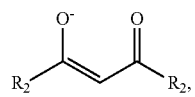

are independently selected from the group consisting of 2,2'-dipyridyl, optionally substituted with one or more $R_1$, 1,10-phenanthrenyl, optionally substituted with one or more $R_1$, and

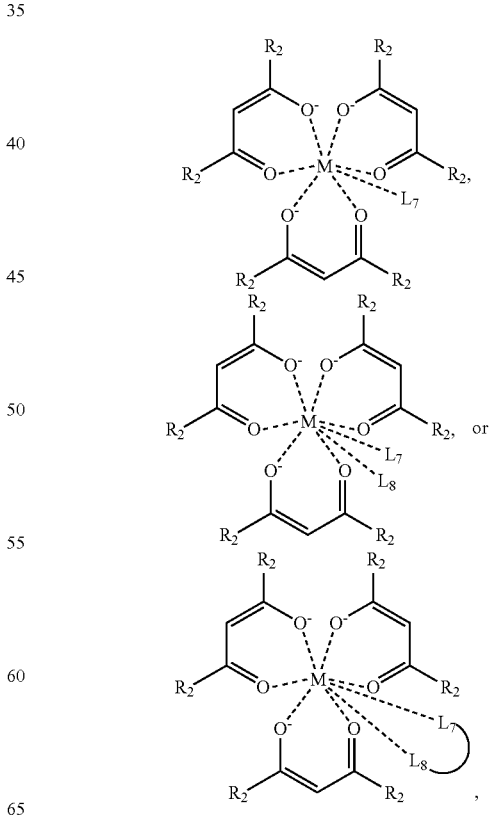

where each occurrence of $R_2$ is independently H, $(C_1-C_{20})$alkyl, $(C_2-C_{20})$alkenyl, $(C_2-C_{20})$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

As described herein, non-limiting examples of alkyl groups include methyl, ethyl, propyl, isopropyl, n-butyl, t-butyl, isobutyl pentyl, hexyl, isohexyl, heptyl, 4,4-dimethylpentyl, octyl, 2,2,4-trimethylpentyl, nonyl, decyl, undecyl, dodecyl, and the like. Non-limiting examples of alkenyl groups include ethenyl, allyl, propenyl, 2-propenyl, (E)-but-2-enyl, (Z)-but-2-enyl, 2-methy(E)-but-2-enyl, 2-methy(Z)-but-2-enyl, 2,3-dimethyl-but-2-enyl, (Z)-pent-2-enyl, (E)-pent-1-enyl, (Z)-hex-1-enyl, (E)-pent-2-enyl, (Z)-hex-2-enyl, (E)-hex-2-enyl, (Z)-hex-1-enyl, (E)-hex-1-enyl, (Z)-hex-3-enyl, (E)-hex-3-enyl, and (E)-hex-1,3-dienyl. Non-limiting examples of alkynyl groups include ethynyl, prop-1-ynyl, prop-2-ynyl, but-1-ynyl, but-2-ynyl, pent-1-ynyl, pent-2-ynyl, hex-1-ynyl, hex-2-ynyl, and hex-3-ynyl. Non-limiting examples of cycloalkyl groups include cyclopropyl, cyclobutyl, cyclopentyl, cyclohexyl, and cycloheptyl.

Non-limiting examples of aryls include phenyl, biphenyl and naphthyl. Non-limiting examples of heteroaryls include pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, oxazolyl, quinolinyl, isoquinolinyl, indolyl, benzothiazolyl, benzoxazolyl, benzoxadiazolyl, benzothienyl, benzimidazolyl, benzofuryl, and the like.

In some embodiments, the paramagnetic complex has the structure, is defined as above.

In some embodiments, the paramagnetic complex has the structure

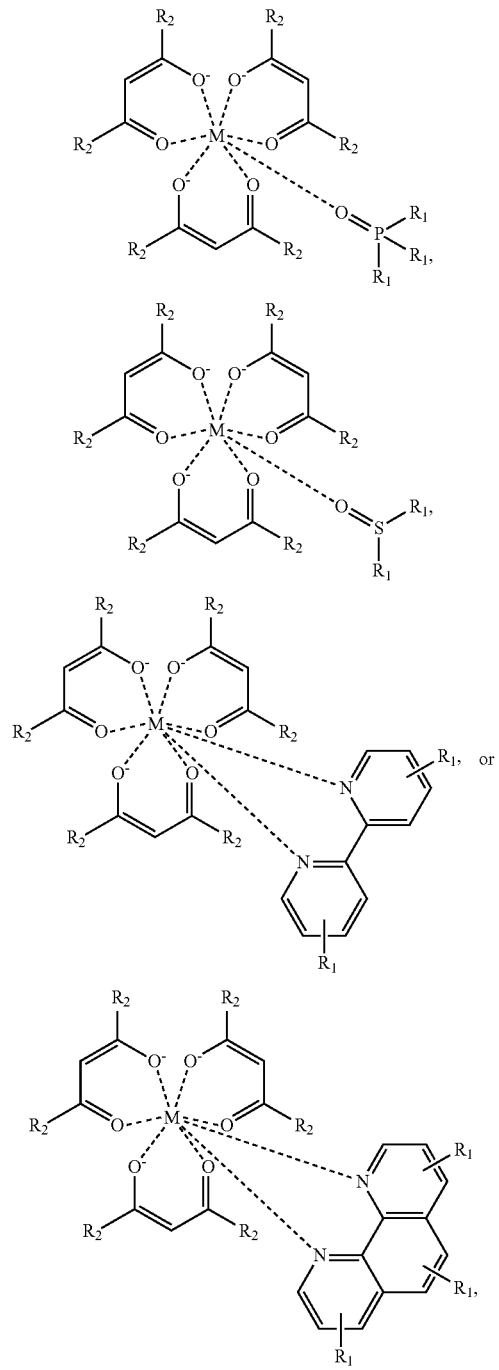

where $R_1$ and $R_2$ are defined as above.

In some embodiments, each occurrence of $R_1$ and $R_2$ is independently $(C_1\text{-}C_{10})$alkyl or $(C_6\text{-}C_{10})$aryl. In some embodiments, each occurrence of $R_1$ and $R_2$ is independently methyl, ethyl, propyl, butyl, pentyl, hexyl, heptyl, octyl, nonyl, decyl, phenyl, or isomers thereof. In some embodiments, each occurrence of $R_1$ and $R_2$ is independently methyl, butyl, tert-butyl, octyl, or phenyl.

In some embodiments, M is gadolinium.

In some embodiments, the paramagnetic complex is

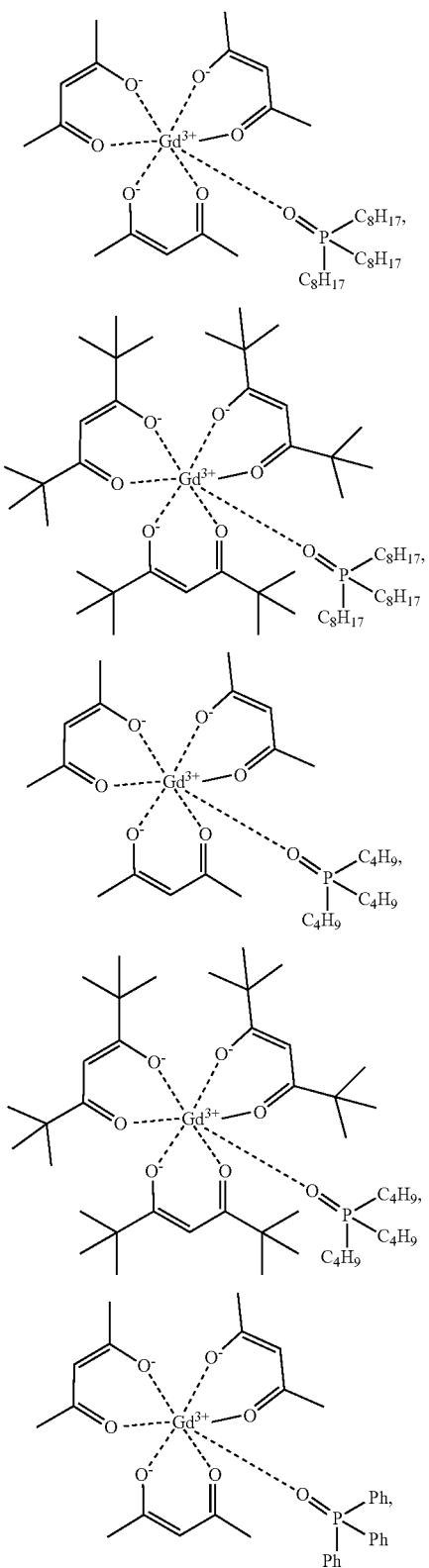

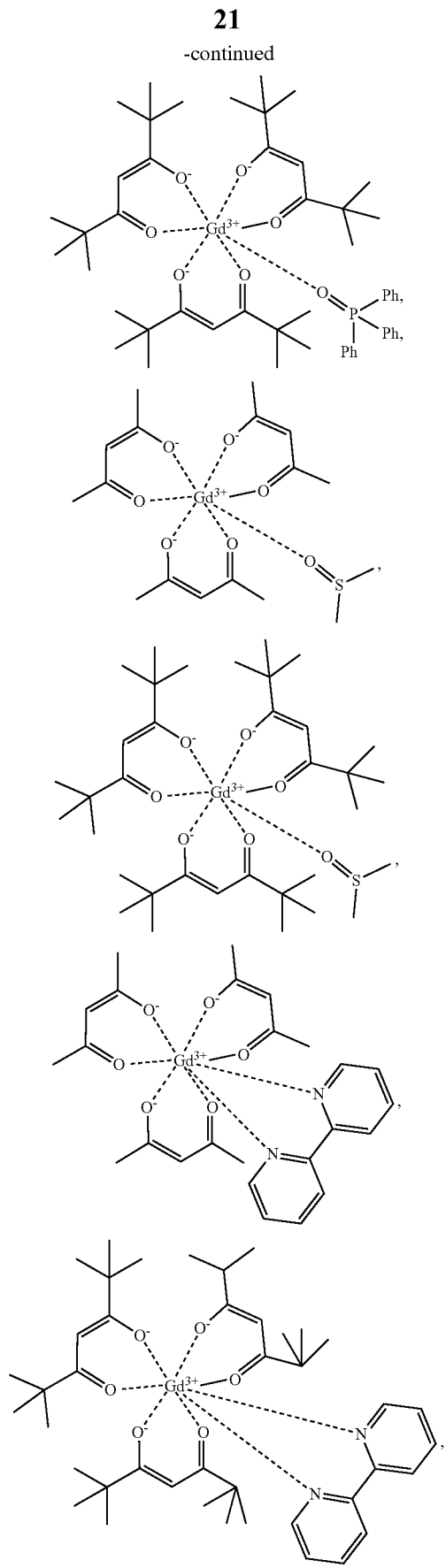

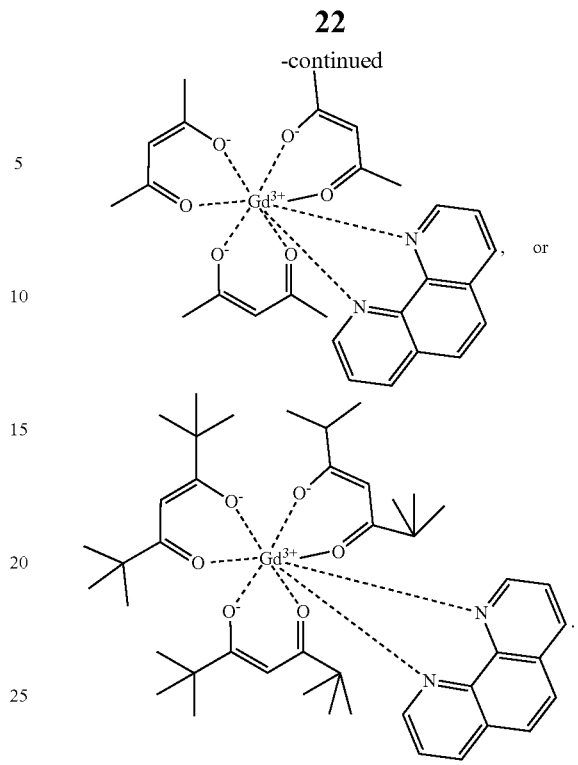

In some embodiments, the paramagnetic complex is

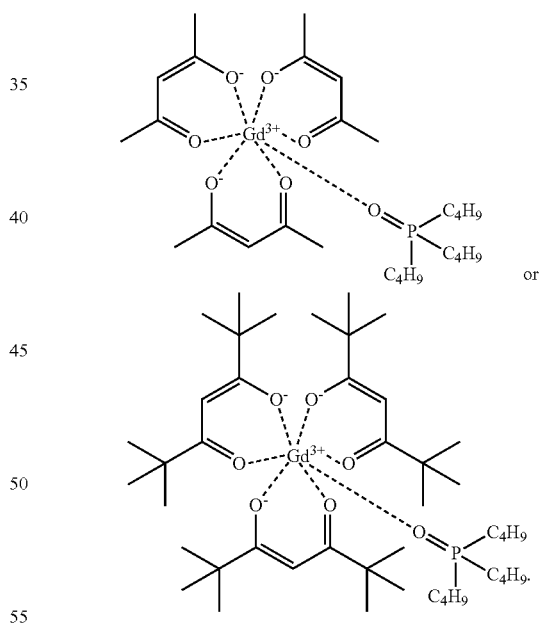

In some embodiments, the solvent is a non-aqueous solvent. Non-limiting examples of non-aqueous solvents include acyclic and cyclic hydrocarbons, acyclic and cyclic halo- or per-halo hydrocarbons, aromatic hydrocarbons, acyclic and cyclic ethers, and acyclic and cyclic aldehydes, ketones, esters, and amides. In some embodiments, the solvent is pentane, hexane, heptane, octane, nonane, decane, undecane, dodecane, carbon tetrachloride, tetrachloroethylene, dichloromethane, trichloromethane, ethers (e.g., diethyl ether and tetrahydrofuran), and esters (e.g., ethyl acetate, and butyl acetate), including all isomers and a combinations thereof. In some embodiments, the solvent is hexane, tetrachloroethylene, or a combination thereof. In some embodiments, the solvent is tetrachloroethylene.

In some embodiments, the solvent is an aqueous or protic solvent. Non-limiting examples of aqueous or protic solvents include water, acyclic and cyclic alcohols, amines, thiols, carbonates, sulfoxides, and carboxylic acids.

Analytical Methods Using Position Analysis

In another aspect, a method of analyzing a sample including one or more solid compounds is described, including:
(a) providing the magnetic levitation system of any one of the preceding embodiments;
(b) depositing the sample in the solution including the paramagnetic gadolinium complex; and
(c) allowing each of the solid compounds in the sample to migrate to a position in the container indicative of its density.

In some embodiments, the sample can be an amorphous, crystalline, or powdered sample. In some embodiments, the sample includes controlled substances, adulterants, and diluents that are found in pharmaceuticals and recreational drug products.

In some embodiments, the one or more solid compounds are present in the sample 108 at between 0.01 and 100 weight percent. In some embodiments, the one or more solid compounds are present in the sample at 0.01, 0.05, 0.1, 0.5, 1, 5, 10, 15, 20, 30, 40, 50, 60, 70, 80, 90, or 100 weight percent, or within a range of the weight percentage bounded by any two values described herein. In some embodiments, the one or more compounds are present in the sample between 0.01 and 10 weight percent.

Non-limiting examples of the one or more solid compounds in the sample are fentanyl, acetyl fentanyl, benzyl fentanyl, carfentanyl, cocaine, heroin, oxycodone, methamphetamine, cannabinoids, lysergic acid diethylamide, methaqualone, methadone, hydromorphone, Ritalin, Adderall, peyote, 3,4-methylenedioxymethamphetamine, acetaminophen, caffeine, diltiazem, dipyrone/metamizole, lidocaine, hydroxyzine, levamisole, papaverine, procaine, phenacetin, dimethyl sulfone, D-fructose, D-glucose, α-lactose, D-mannitol, sodium carbonate, starch, including potato starch, sucrose, talc, quinine, butylated hydroxytoluene, hypromellose, polyethylene glycol, polyethylene oxide, magnesium stearate, titanium dioxide and other colorants, and isomers and mixtures thereof. In some embodiments, the one or more solid compounds present in the sample include fentanyl-HCl and/or caffeine. In some embodiments, the one or more solid compounds, including those listed here, are present in the sample in free-base or salt form. Non-limiting examples of salt forms include sodium, aluminum, potassium, calcium, hydrochloride, citrate, nitrate, sulfate, acetate phosphate, diphosphate, maleate, mesylate, tartrate, and gluconate salts. In some embodiments, the salt is a hydrochloride salt.

In some embodiments, the method further includes
(d) analyzing one or more of the solid compounds to determine or confirm its identity In some embodiments, the method of analyzing a sample including one or more solid compounds optionally includes positioning the sample container such that one or more of the levitated components contacts the wall of the container, followed by analyzing said component(s) through the wall of the container using a portable spectrometer. In some embodiments, the portable spectrometer includes a Raman spectrometer.

In some embodiments, the method of analyzing a sample including one or more solid compounds optionally includes isolating the one or more solid compounds from the paramagnetic solution after migration. In some embodiments, isolation is conducted by removing the one or more solid compounds using, for example, a pipette, a siphon, a spoon, a spatula, or a small basket.

In some embodiments, the one or more solid compounds are analyzed by other techniques after isolation from the paramagnetic solution 106. Non-limiting examples of such techniques include infrared spectroscopy, including Fourier transform infrared spectroscopy with attenuated total reflectance ("FTIR-ATR"), mass spectrometry, nuclear magnetic resonance spectroscopy ("NMR"), Raman spectroscopy, X-ray diffractometry, capillary electrophoresis, gas chromatography, ion-mobility spectrometry, liquid chromatography, microcrystalline tests, supercritical fluid chromatography, thin layer chromatography, ultraviolet/visible spectroscopy, macroscopic (visual) examination, colorimetric tests, fluorescence spectroscopy, immunoassays, melting point analysis, and pharmaceutical identifiers (package inserts). In some embodiments, the technique is FTIR-ATR. In some embodiments, the technique is Raman spectroscopy. In some embodiments the technique is mass spectrometry. In some embodiments, the technique is X-ray diffractometry. In some embodiments, the technique is a colorimetric test. In some embodiments, the technique uses a portable or handheld device.

In some embodiments, the method of analyzing a sample including one or more solid compounds further includes:
(e) generating a profile of the position of the one or more compounds relative to the container; and
(f) generating a database including a plurality of profiles, each of which corresponds to a known solid compound or a known mixture of solid compounds.

In some embodiments, the profile of the sample and the profiles of the database are determined at a plurality of time points after the sample is deposited in the solution in step (b).

In some embodiments, the MagLev device is described by FIG. 22. In these embodiments, the Maglev device includes a box, a light source for controlled illumination of the container, and a camera for imaging sample separation in the MagLev device at different time points.

In some embodiments, the method of analyzing a sample including one or more solid compounds further includes:
(g) comparing the generated profile of the sample to the profiles in the database.

In some embodiments, step (g) further includes determining the particle size or the mixture of particle sizes of the one or more solid compounds.

In some embodiments, the step of comparing the generated profile of the sample to the profiles in the database includes determining and/or confirming the identity of the one or more solid compounds, or determining and/or confirming the source of the one or more solid compounds, or determining and/or confirming the particle size or the mixture of particle sizes of the one or more compounds, based on the comparison.

In some embodiments, the step of comparing the profile of the sample to the profiles in the database further includes using a computer to calculate the distances between the generated profile of the sample and the profiles in the database to identify a profile in the database within a minimum distance to the generated profile. Non-limiting examples of the distance are the Mahalanobis or Euclidian distances.

In some embodiments, dynamic time warping ("DTW") is used to measure the similarity between profiles of the sample generated at a plurality of time points. In some embodiments, DTW is used to measure the similarity between profiles of the sample generated at a plurality of time points to profiles in the database generated at a plurality of time points. In some embodiments, the profiles of the sample and the profiles in the database are averaged and DTW used to measure the similarity between the average profile of the sample and the average profiles in the database.

In some embodiments, the profile consists of an image of the container. In some embodiments, DTW is used to compare the generated image of the container to images in the database. In some embodiments, images are recorded at a plurality of time points, optionally averaged, and DTW used to compare the generated images/average image to images/average images in the database. In some embodiments, the light intensity as a function of position in the container is measured to determine the profile. In these embodiments, the light intensity at a position of the container including only paramagnetic solution is different than the light intensity at a position of the container where one or more compounds is present. In some embodiments, DTW is used to compare the generated light intensity profile with the light intensity profiles in the database. In some embodiments, light intensity profiles are generated at a plurality of time points, optionally averaged, and DTW used to compare the generated light intensity profiles/average profile to the generated light intensity profiles/average profiles in the database.

In some embodiments, DTW finds point correspondences between generated and database profiles by warping them in the time domain. In some embodiments, DTW computes the set of point correspondences that minimizes the cumulative distance between the sequences.

Figure 23:
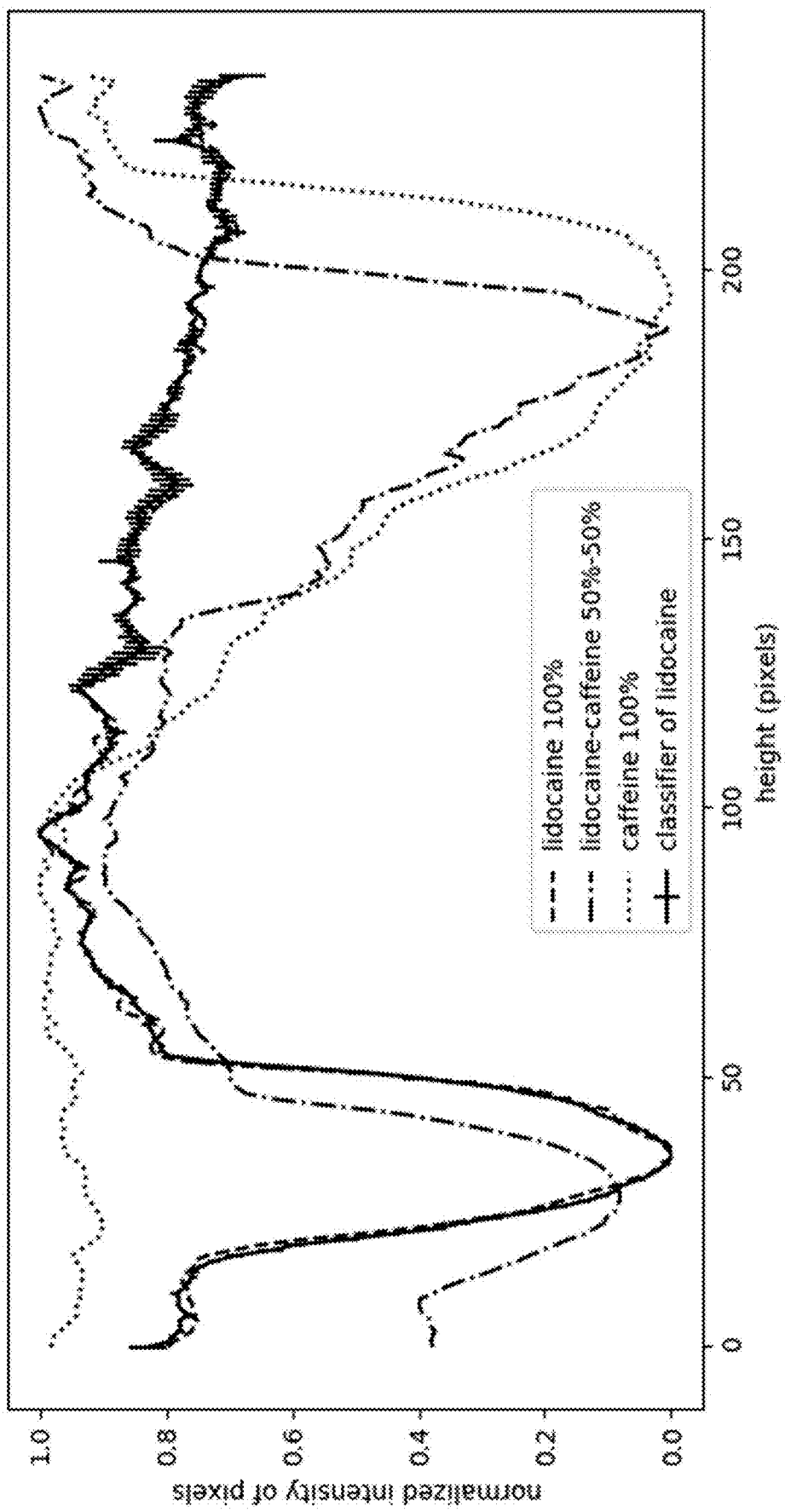
FIG. 23 shows the classifier for a sample containing 100 wt % lidocaine·HCl, according to one or more embodiments.
Figure 24:
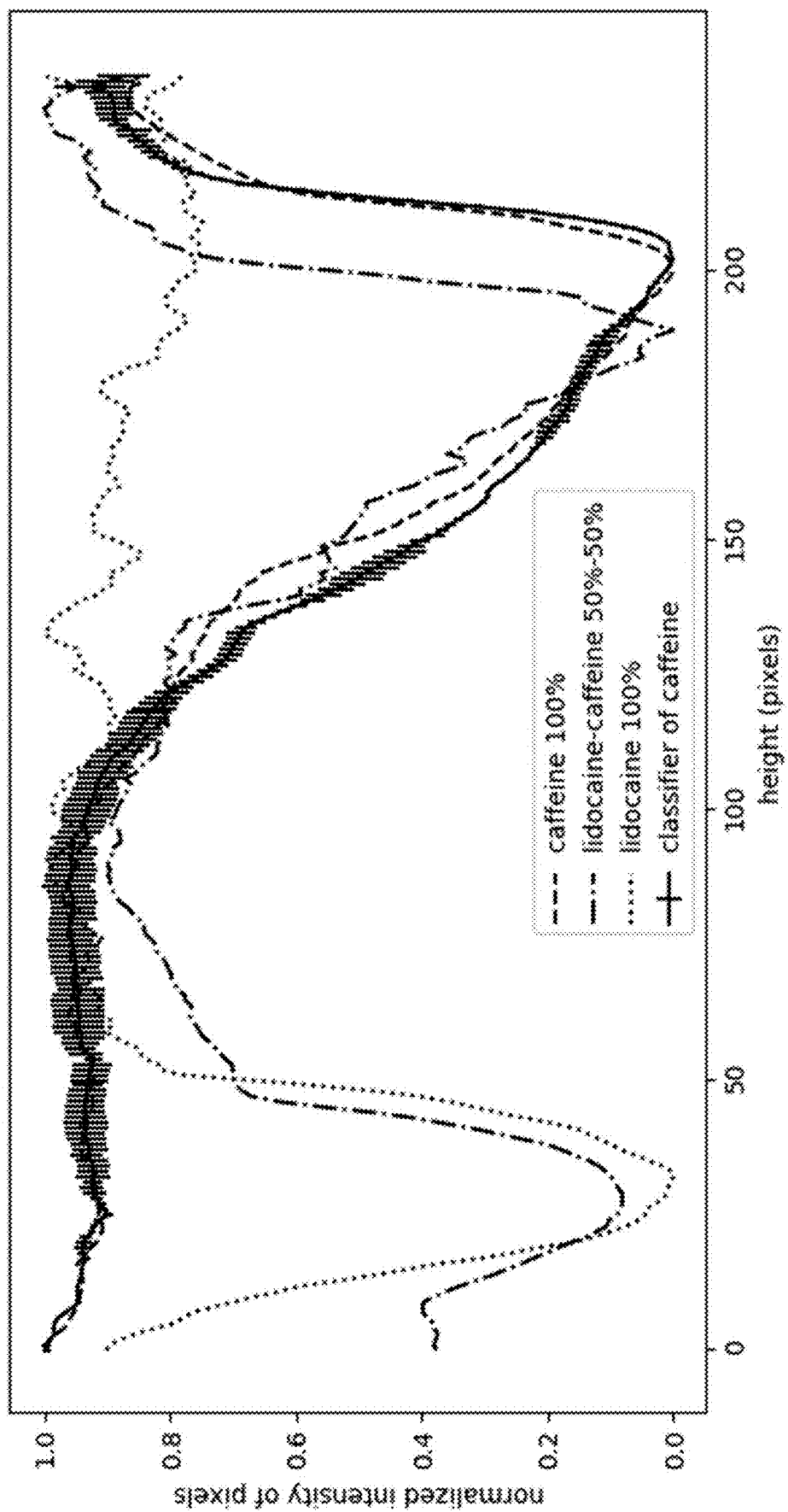
FIG. 24 shows the classifier for a sample containing 100 wt % lidocaine·HCl, according to one or more embodiments.
Figure 25:
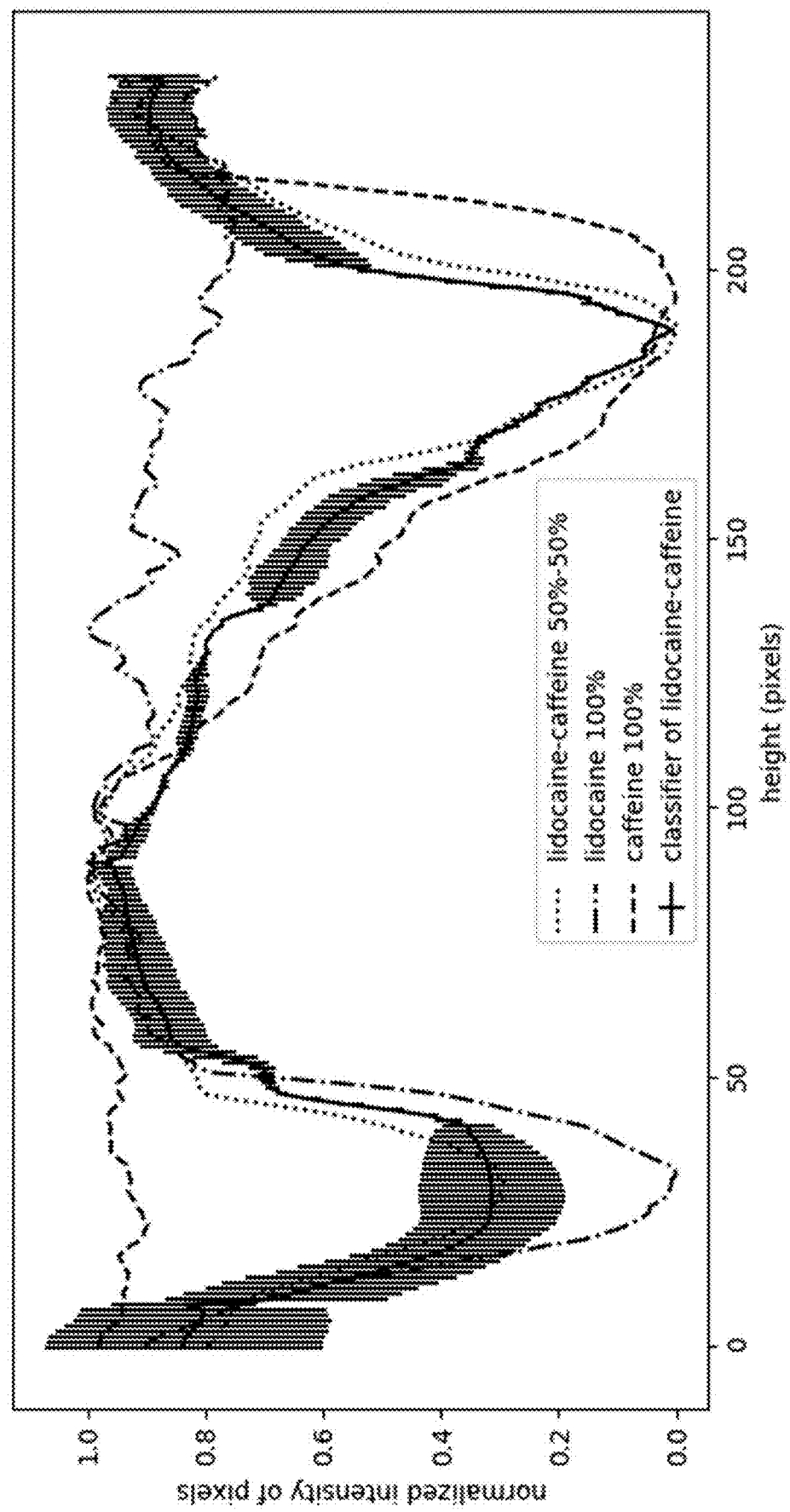
FIG. 25 shows the classifier for a sample that contains 50 wt % lidocaine·HCl and 50 wt % caffeine, according to one or more embodiments.

In some embodiments, the averaging process is non-trivial when performed on variable-length signals. Therefore, in some embodiments, DTW barycenter averaging ("DBA") was used to compute the average profile, including profiles consisting of images and light intensities, and the standard deviation. For example, FIGS. 23-25 show the measured light intensity for 50 mg powder samples containing 100 wt % lidocaine HCl, 50-50 wt % lidocaine HCl and caffeine, and 100 wt % caffeine as a function of the height of the "cloud" of that sample levitating in a MagLev device, according to some embodiments. This data was used to calculate, using DBA, a "classifier" curve for lidocaine (FIG. 23), caffeine (FIG. 24), and a 50/50 (wt %) lidocaine-caffeine mixture (FIG. 25), according to some embodiments. Error bars in the classifier plots correspond to the standard deviations after averaging ten different separations, according to some embodiments. In some embodiments, unknown mixtures can be compared to the class representation, including by calculating their Mahalanobis distances.

Classifying Unknown Powdered Mixtures

In some embodiments, an unknown mixed powder sample can be analyzed by calculating the similarity between the profile, optionally averaged over a plurality of time points, (i.e., position of the one or more compounds relative to the container) of an unknown sample and the profiles, optionally averaged over a plurality of time points, of known compounds or mixtures in the database. In some embodiments, the closest similarity between the unknown profile and a known profile in the database is used to identify the unknown mixture. As used herein, the similarity between the unknown profile and each known profile refers to the distance (e.g., Mahalanobis distance) as described above.

In some embodiments, if the similarity measurement does not reach a minimum distance, the event will be labelled as unknown. In some embodiments, the minimum distance (e.g., Mahalanobis distance), is a few (e.g., 10 s) standard deviations. Otherwise, in other embodiments, the unknown will be identified according to the greatest similarity.

In some embodiments, mixtures are detected that were previously identified and possess a database profile. In some embodiments, combinations of substances, such as, for example, lidocaine and caffeine, represent new representations. In some embodiments, this method may be especially useful for identification of samples that come from the same batch as a sample that has previously been classified, and to find samples that are of the same composition (i.e., same recipe), but not necessarily the same batch.

In some embodiments, the comparison between generated profiles and profiles in the database uses machine learning. In some embodiments, the machine learning includes deep neural networks, such as, for example, convolutional neural networks. In some embodiments, supervised deep learning, a subset of methods within machine learning, is used to identify known constellations of mixtures. In these embodiments, the convolutional neural network ("CNN") is trained on hundreds-to-thousands of parameters, from datasets of labeled data (various mixtures of drugs) using cloud services, such as IBM Watson, since, in some embodiments, training of such networks can be computationally involved. In some embodiments, the analysis of unknown mixtures consists of inserting a new image into the trained neural network which will output the maximum-likelihood class. The CNN can be extended with any number of known mixtures; this approach requires, in some embodiments, large numbers of labeled data (e.g., images from mixtures of drugs in MagLev).

In yet another aspect, a kit is described, including:
a first and second magnets as described in any one of the previous embodiments;
a container as described in any one of the previous embodiments;
a paramagnetic gadolinium complex as described in any one of the previous embodiments, including at least one phosphine oxide ligand; and
instructions for assembling a magnetic levitation system as described in any one of the previous embodiments. In some embodiments, the kit further includes the solvent as described in any one of the previous embodiments. In some embodiments, the instructions for assembling a magnetic levitation system include placing the first and second magnets such that the surfaces of their like-poles are facing each other. In some embodiments, the instructions for assembling a magnetic levitation system further include placing a container the first and second magnets' like poles. In some embodiments, the instructions for assembling a magnetic levitation system further include adding, to the container, a solution including the paramagnetic gadolinium complex in the solvent as described in any of the embodiments disclosed herein. In some embodiments, the instructions for assembling a magnetic levitation system further include depositing a sample including one or more solid compounds in the solution including the paramagnetic gadolinium complex; and allowing each of the solid compounds in the sample to migrate to a position in the container indicative of its density.

EXAMPLES

Example 1: MagLev Theory

In some embodiments, a diamagnetic object (e.g., a crystal or a particle from a mixture of powdered drugs)

achieves a stable levitation height in a paramagnetic solution in an applied magnetic field (e.g., a linear field gradient) when the magnetic force, $\vec{F}_{mag}$, the object experiences (as a result of the interaction between the paramagnetic suspending solution and the applied magnetic field) counterbalances its gravitational force, $\vec{F}_g$, (corrected for the effect of buoyancy; see FIG. 1A). In some embodiments, Equation 1 gives the levitation height, h (m), of the centroid (volumetric center) of the sample with respect to the surface of the bottom magnet.

$$h = \frac{(\rho - \rho_{medium})g\mu_o d^2}{(\chi - \chi_{medium})4B_o^2} + \frac{d}{2} \quad \text{(Equation 1)}$$

In some embodiments, $\rho$ (g cm$^{-3}$) is the density of the sample, $\rho_{medium}$ (g cm$^{-3}$) is the density of the paramagnetic solution, $\chi$ (unitless) is the magnetic susceptibility of the sample, $\chi_{medium}$ (unitless) is the magnetic susceptibility of the paramagnetic solution, g (9.8 m s$^{-2}$) is the constant of gravitational acceleration, $\mu_o$ ($4\pi \times 10^{-7}$ N·A$^{-2}$) is the magnetic permeability of the free space, $B_o$(T) is the strength of the magnetic field at the center of the top surface of the bottom magnets, and d (m) is the distance of separation between the two like-poles-facing magnets.

Figure 1B:
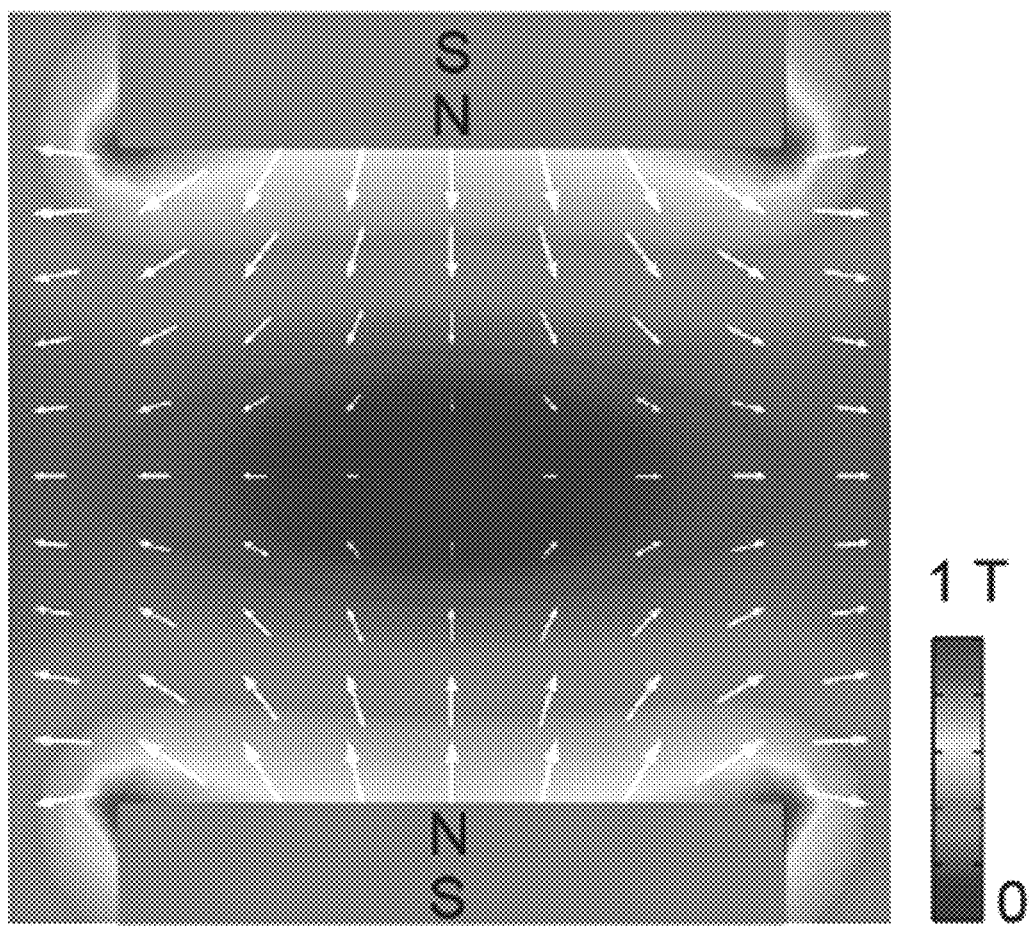
FIG. 1B shows the magnetic field between the magnets of the MagLev device, according to one or more embodiments.
Figure 1C:
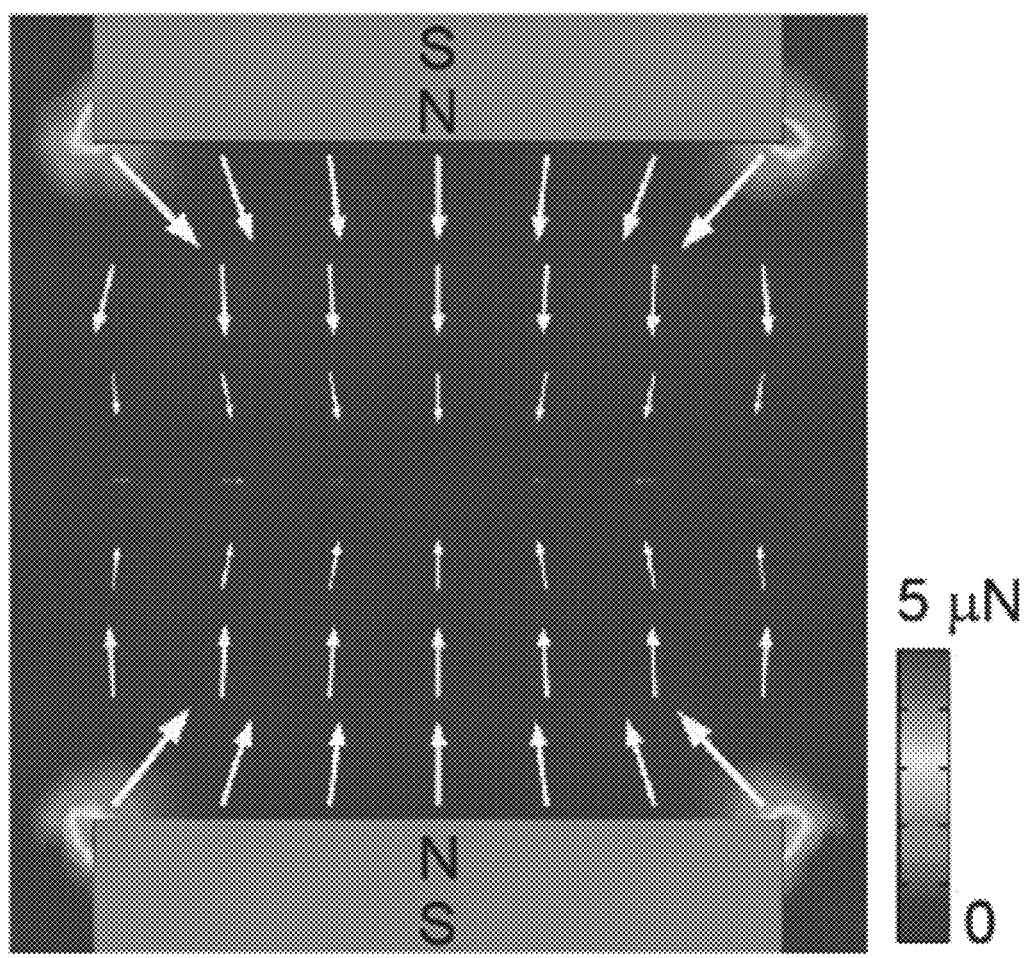
FIG. 1C shows the magnetic force a sample particle experiences when suspended in a paramagnetic solution and placed in the magnetic field of FIG. 1B, according to one or more embodiments.

FIG. 1A shows a schematic diagram of the relevant forces during MagLev of powdered mixtures of illicit drugs, according to some embodiments. FIG. 1B shows the magnetic field, B, between the magnets (distance of separation 25 mm) of the MagLev device simulated using COMSOL Multiphysics, according to some embodiments. The plot shows the strength of the magnetic field and the white arrows indicate the strength and direction (from N to S) of the magnetic field at the locations of the arrows, according to some embodiments. FIG. 1C shows the magnetic force-plotted as the logarithm of the magnitude of the force, $$\propto \log|F_{mag}| = \log\left|\frac{(\chi_{sample} - \chi_{medium})}{\mu_o}V(\vec{B}\cdot\nabla)\vec{B}\right|$$

a sample particle (modeled using a cubic crystal having a side of 100 μm) experiences when suspended in a paramagnetic solution (0.5 M Gd(DPM)$_3$TOPO) and placed in the magnetic field shown in FIG. 1B, according to some embodiments. The white arrows indicate the strength and direction of the magnetic force acting on the sample at the locations of the arrows, according to some embodiments. In some embodiments, the magnetic force the sample experiences is the result of the attractive interaction of the applied magnetic field and the paramagnetic solution in which the diamagnetic sample is suspended. In comparison, in some embodiments, the repulsive interaction between the magnetic field and the diamagnetic sample is orders of magnitude smaller, and, thus, can be neglected.

Example 2: Construction of the MagLev Device

The MagLev device dimensions and weight were 205×45×45 mm and 700 g, respectively). The MagLev device consisted of two NdFeB magnets (Neodymium Magnets N42 Block; dimensions: 25.4×25.4×50.8 mm; appliedmagnets.com), with like-poles facing each other, with a 25.5 mm face-to-face separation resulting in a 0.51 T magnetic field (as measured with a DC gauss-meter; model GM1-ST; AlphaLab, Inc.) at the surface of the magnets (see FIG. 2A). The magnets were mechanically secured in a stand made from (i) acrylonitrile-butadiene-styrene-plastic ("ABS" plastic) parts that were designed with computer-aided design (Solidworks™) and printed with a 3D printer (Stratasys Fortus 250mc); (ii) four super-corrosion-resistant 316 stainless steel rods (8" long, ¼"-20 thread size, McMaster-Carr); (iii) 16 stainless steel hex nuts (¼"-20 thread size, McMaster-Carr), and (iv) 8 stainless steel cap nuts (¼"-20 thread size, McMaster-Carr). In some embodiments, the position of the hex nuts along the rods can be adjusted to change the distance between the magnets. In some embodiments, the metal parts interact weakly with the magnets, and, therefore, cause minimal disturbances to the magnetic field between the two like-poles.

Figure 2A:
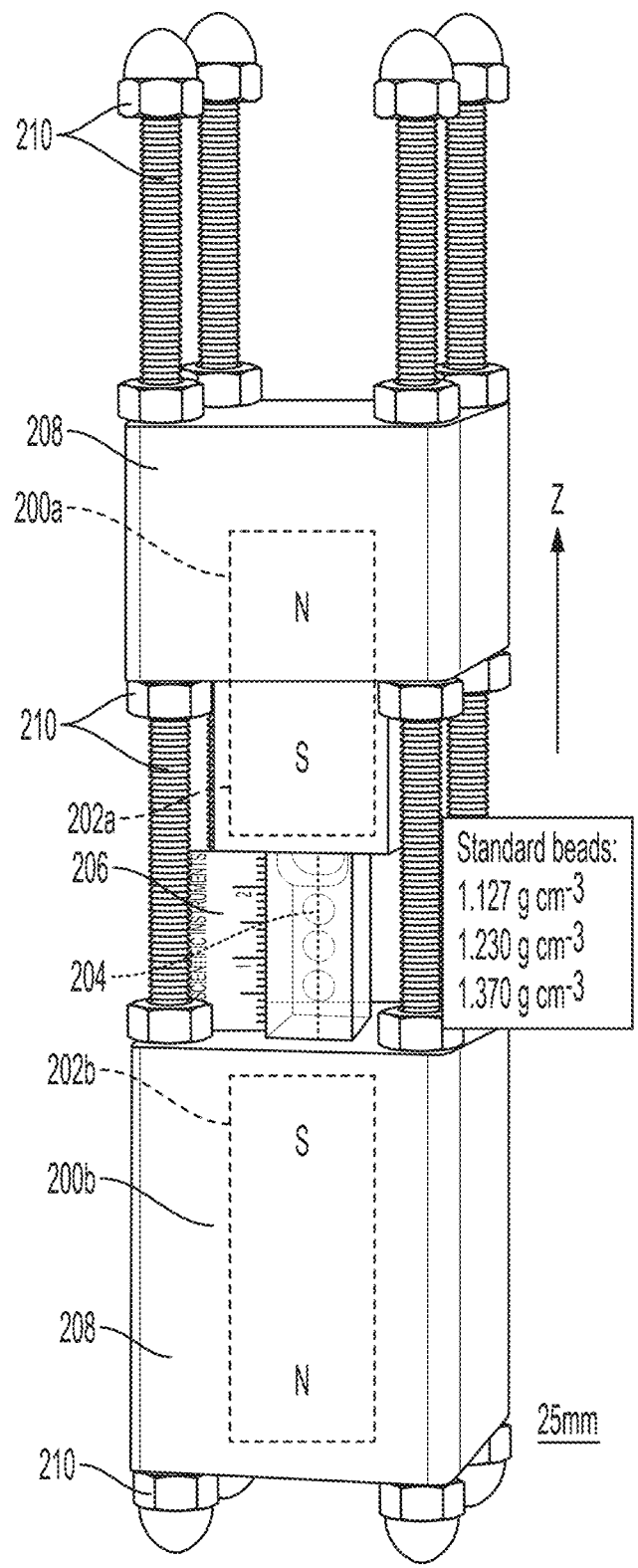
FIG. 2A shows a MagLev device, according to one or more embodiments.
Figure 2B:
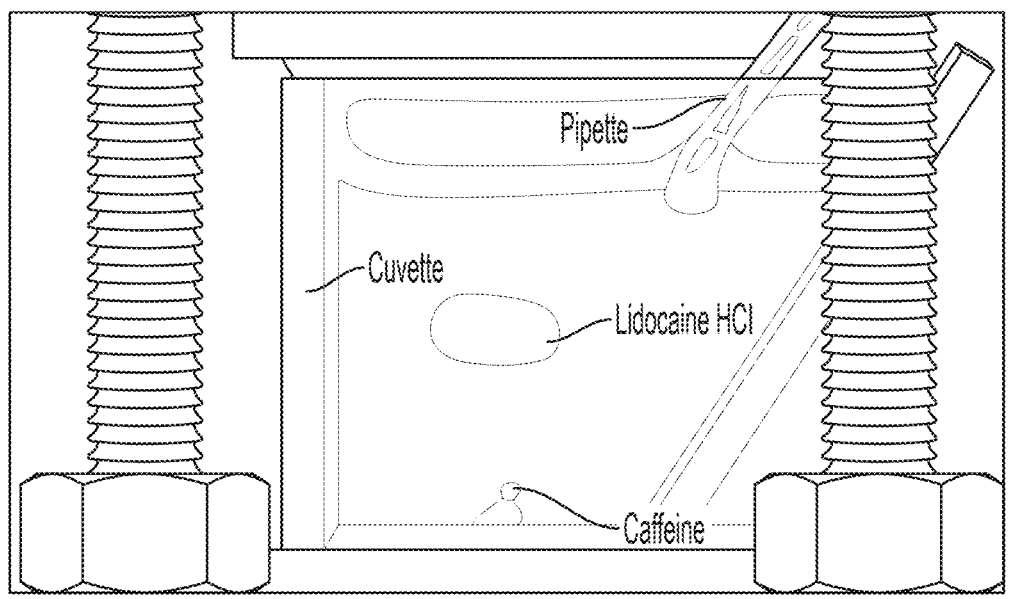
FIG. 2B shows a custom-made plastic cuvette filled with paramagnetic solution sitting in the MagLev device of FIG. 2A, according to one or more embodiments.

FIG. 2A shows that the Maglev device consisted of two magnets (dashed rectangles) with like-poles facing each other, according to some embodiments. The magnets were mechanically secured using plastic parts, and steel rods, and nuts. The glass beads levitated in a paramagnetic solution. The axis of the magnetic centerline is illustrated by the black dotted line (parallel to the z-direction) between the two magnets, according to some embodiments. FIG. 2B shows a custom-made plastic cuvette filled with paramagnetic solution sitting in the MagLev device, according to some embodiments. The shape of the cuvette allowed access with a Pasteur pipette from the side of the magnet to extract the separated compounds. A 50 mg mixture consisting of 95 wt % lidocaine·HCl and 5 wt % caffeine after 30 minutes of separation is shown in the cuvette, according to some embodiments. The paramagnetic solution in FIG. 2A and FIG. 2B contained Gd(DPM)$_3$TOPO (450 mM) dissolved in a mixture of 23 vol % hexane and 77 vol % tetrachloroethylene. The face-to-face separation between the magnets was 25 mm. The images were uniformly post-processed for contrast and clarity.

Example 3: Synthesis of the Gd(DPM)$_3$TOPO-Chelate Complex

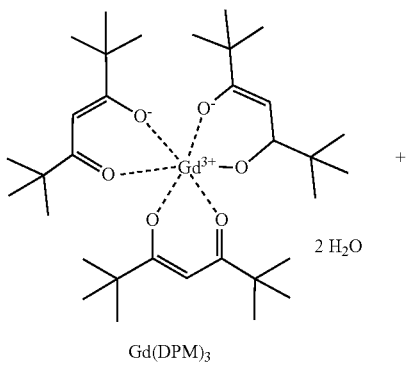

Gd(DPM)$_3$

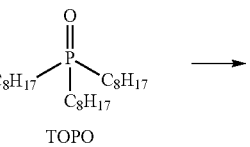

TOPO

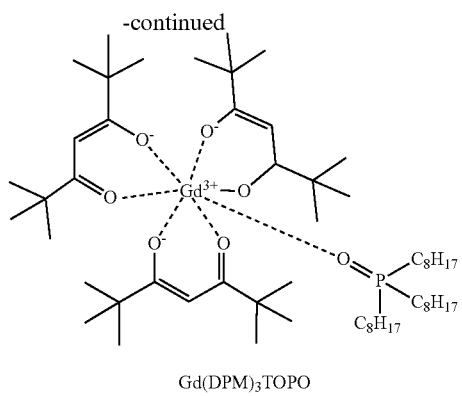

Gd(DPM)₃TOPO

Tris(dipivaloylmethanato) gadolinium(III) (Gd(DPM)₃; 2.0 g, 2.7 mmol; Alfa Aesar) was suspended in hexanes or n-heptane (20 mL; 10 mL per g of starting material) at room temperature. Trioctylphosphine oxide (TOPO; 1.0 g, 2.7 mmol; Sigma-Aldrich) was added to form a colorless suspension, which became a clear solution within 10-30 minutes (depending on batch size). The solution was stirred at room temperature (22° C.) for approximately 18 hours. The solvent was removed on a rotary evaporator (60° C. bath temperature) at reduced pressure (first at 100-25 mbar, then at 10-3 mbar) to obtain the Gd(DPM)₃TOPO complex as a pale yellow, viscous oil (2.88 g, 2.67 mmol) with a density of approximately 1.1 g/cm³. This synthesis was successfully performed starting with 1-30 g of Gd(DPM)₃. The yellow color intensified with larger scales and higher concentrations. The compound was characterized with Fourier transform infrared attenuated total reflectance ("FTIR-ATR") spectroscopy (see FIG. 3).

Figure 3:
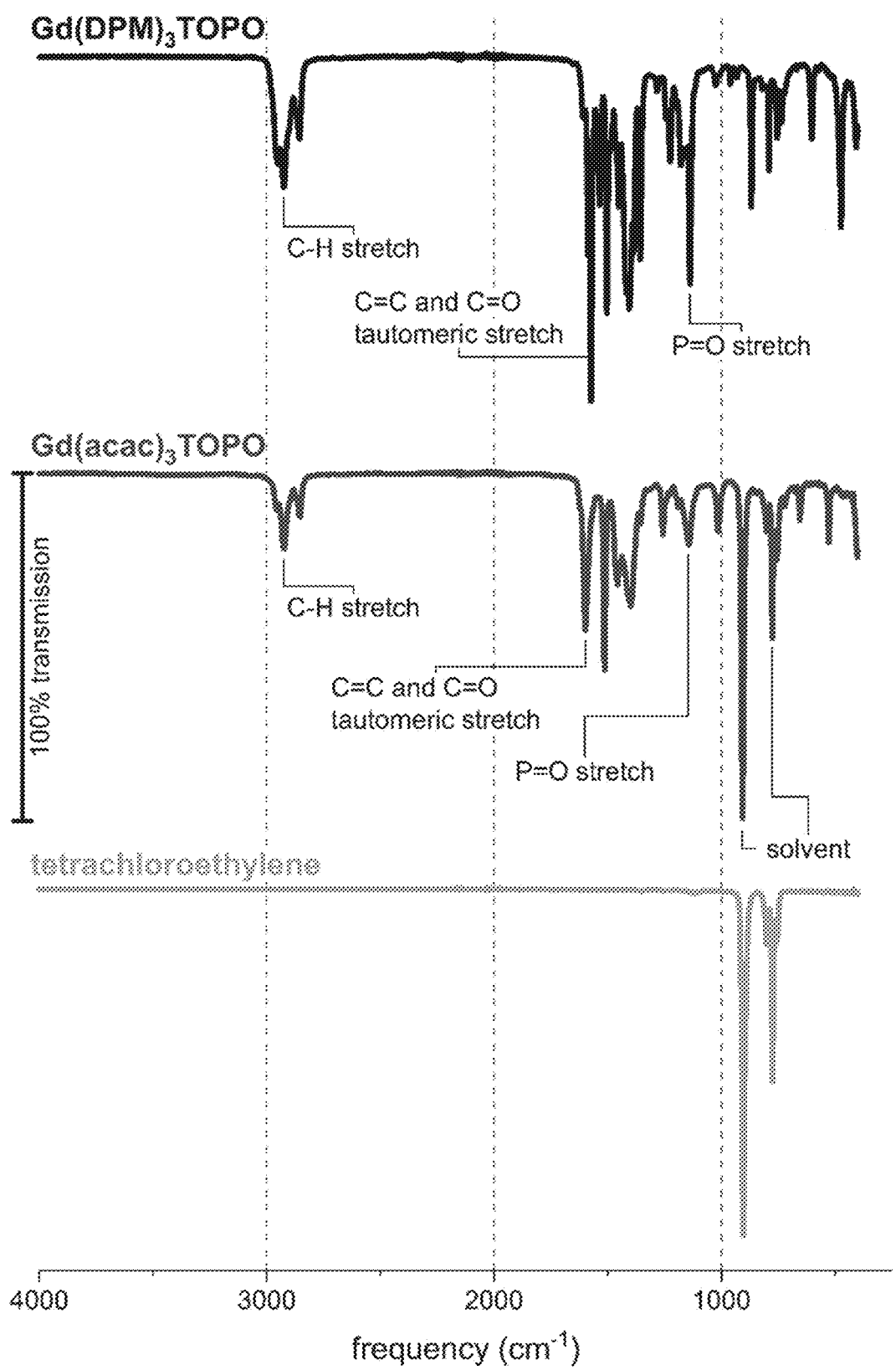
FIG. 3 shows FTIR-ATR spectra of $Gd(DPM)_3TOPO$ and $Gd(acac)_3TOPO$, according to one or more embodiments.

FIG. 3 shows FTIR-ATR spectra of Gd(DPM)₃TOPO and Gd(acac)₃TOPO (synthesis described in Example 4), according to some embodiments. The solvent tetrachloroethylene was present for the Gd(acac)₃TOPO compound. IR-ATR (Gd(DPM)₃TOPO): 2924 cm⁻¹ (C—H stretch, m), 1573 cm⁻¹ (C═C and C═O tautomeric stretch, vs) 1137 cm⁻¹ (P═O stretch, s). IR-ATR (Gd(acac)₃TOPO in tetrachloroethylene): 2923 cm⁻¹ (C—H stretch, m), 1598 cm⁻¹ (C═C and C═O tautomeric stretch, s), 1142 cm⁻¹ (P═O stretch, m), 906 cm⁻¹ and 776 cm⁻¹ (tetrachloroethylene solvent, s).

FTIR-ATR (Bruker Platinum) spectra of Gd(DPM)₃ TOPO (900 mM) and Gd(acac)₃TOPO (1100 mM in tetrachloroethylene) were recorded by placing a drop of chelate on the ATR diamond window (air set as blank). The spectrum of tetrachlorochloroethylene was measured as a control (air set as blank). Spectra were recorded from 4000-400 cm⁻¹ at a resolution of 1 cm⁻¹ with 64 sample and background scans (see FIG. 3). The spectra of the Gd(DPM)₃ TOPO and Gd(acac)₃TOPO chelates before and after filtering through activated charcoal showed no significant difference, which suggested that the complexes were relatively pure after synthesis.

The compound was stable for more than one month at 22° C. in a capped and air-tight bottle when stored at room temperature in ambient air. In some cases, precipitation occurred after extended storage. The precipitate made the Gd(DPM)₃TOPO oil appear opaque and, in some embodiments, can be removed by diluting the compound with hexane to 450 mM and filtering the solution through polyether sulfone syringe filters (0.2 μm, Thermo Fisher Scientific, Inc.).

Example 4: Synthesis of the Gd(acac)₃TOPO-Chelate Complex

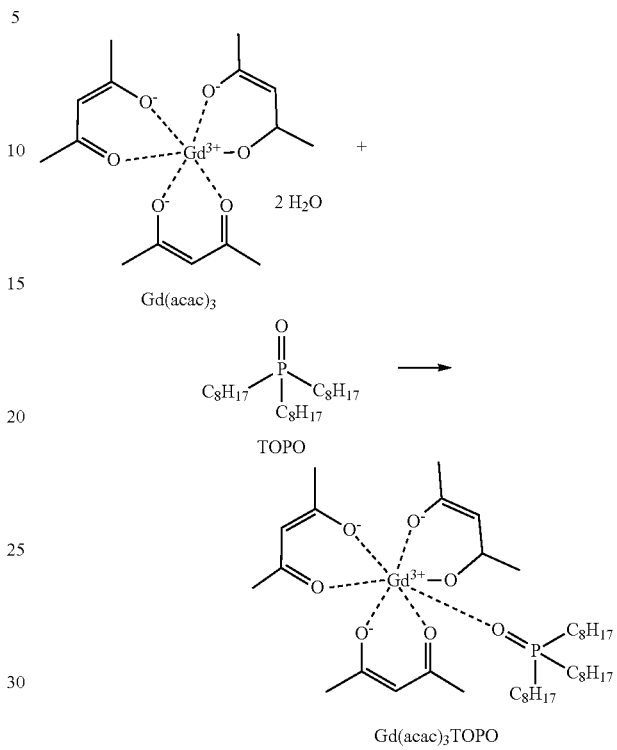

Gadolinium(III) acetylacetonate (Gd(acac)₃; 2.3 g, 5.0 mmol) was added to a 50 mL round-bottomed flask attached to a vacuum outlet and TOPO (2.0 g, 5.2 mmol) was added as a powder. The temperature of this solid mixture was slowly raised to 100° C. and kept constant for five minutes. The TOPO melted and solubilized the Gd(acac)₃. Heating was stopped and a vacuum (150 mbar) was applied for 2 minutes. In some embodiments, heating for longer periods led to significant darkening of the solution and formation of insoluble precipitates (e.g., inorganic polymers). Also, in some embodiments, rapid heating led to overheating, and hence, in these embodiments, the heating step was conducted slowly (over approximately 5 minutes). This mixture was cooled to 30-40° C. and 1,2-dichloroethylene (4.5 mL) was added. The solution looked turbid. The small amount of insoluble precipitate was removed by filtration using a polysulfone syringe filter (0.4 μm pore size). In some cases, filter paper did not work, as pressure was required to filter the relatively viscous solution. This solution was cooled to room temperature to give a faint yellow solution with a density of approximately 1.3 g/cm³. Treatment with active charcoal did not lead to significant improvement in the color of the solution. The compound was characterized with FTTR-ATR (see FIG. 3).

Gadolinium(III) diethylenetriamine triacetic acid didecyldiacetamide, C11-DTTA, molecular weight 1107 g mol⁻¹) was also synthesized. This compound is a hexadentate chelate with at least two free coordination sites on gadolinium(III), which may be occupied by water. In the absence of stronger ligands, this complex dissolved in the organic solvents at concentrations up to approximately 0.4 M. However, in some cases, above a concentration of 0.2 M, the increased viscosity of the solutions (higher viscosity than glycerol) impeded the separation of particles, and, in these cases, caused a large increase in the time required for separation with MagLev.

Example 5: Determination of Magnetic Susceptibility for the Paramagnetic Complexes The magnetic susceptibilities of the gadolinium chelate complexes were determined using the Evans method. In some embodiments, the magnetic susceptibilities for small molecules can be calculated from experimental data using Equation 2:

$$\chi_c = \frac{3\Delta f}{4\pi F c} \quad \text{(Equation 2)}$$

where $\chi_c$ is the magnetic susceptibility (m$^3$ mol$^{-1}$) of the compound, $\Delta f$ is the observed difference in chemical shift in $^1$H-NMR (Hz), F the frequency of the NMR spectrometer (Hz), and c is the concentration (mol m$^{-3}$) of the paramagnetic substance.

TABLE 1

Calculation of the magnetic susceptibilities of the Gd-chelate complexes using the Evans method (Equation 2). The values were in agreement with previously reported magnetic susceptibilities for gadolinium chelate complexes. The density of the solution was assumed to be the same as the deuterated chloroform solvent because of the low concentration (1.4-1.6 wt %) of the paramagnetic complexes.

| Description | Unit | Gd(DPM)$_3$TOPO | Gd(acac)$_3$TOPO | Solvent (CDCl$_3$) |
|---|---|---|---|---|
| Mass | g | 0.0151 | 0.0124 | |
| Molecular weight | g mol$^{-1}$ | 1093.7 | 841.2 | |
| No. of moles | mol | 1.38 × 10$^{-5}$ | 1.47 × 10$^{-5}$ | |
| Density | kg m$^{-3}$ | — | — | 1500 |
| Volume | m$^3$ | — | — | 0.6 × 10$^{-6}$ |
| Concentration (c) | mol m$^{-3}$ | 23.0 | 24.6 | |
| Difference in chemical shift of CHCl$_3$ in $^1$H-NMR (FIG. S7 & S8) | ppm | 2.03 | 1.97 | |
| Difference in chemical shift of CHCl$_3$ in $^1$H-NMR ($\Delta f$) (conversion from ppm) | Hz | 1218 | 1188 | |
| NMR instrument frequency (F) | Hz | 600 × 10$^6$ | 600 × 10$^6$ | |
| Temperature | K | 298 | 296 | |
| Magnetic susceptibility ($\chi_c$): | m$^3$ mol$^{-1}$ | 2.10 × 10$^{-8}$ | 1.90 × 10$^{-8}$ | |

The differences in chemical shifts ($\Delta f$) that were caused by the paramagnetic complexes were recorded using $^1$H NMR (see FIG. 5 and FIG. 6) in a solvent mixture of chloroform (40 µL) and deuterated chloroform (2 mL). Coaxial inserts were made from cylindrical glass capillaries with an inner diameter of 0.8 mm (Corning© 9530-2 PYREX© 100 mm capillary melting point tube) that were filled with the solvent mixture (without any paramagnetic complex) and sealed in both ends using a flame. Gd(DPM)$_3$TOPO (15.09 mg) and Gd(acac)$_3$TOPO (12.40 mg) were dissolved separately in 0.6 mL of the solvent mixture and placed in NMR tubes (Thin Wall Precision NMR Sample Tube, Ø 5 mm, 17.8 cm length). The sealed capillary tubes were placed at the bottom of the NMR tubes, and the $^1$H NMR spectra (Agilent DD2 600 MHz NMR spectrometer) were recorded using a standard pulse program with 64 scans and 2 seconds relaxation time. The temperature was also recorded.

Figure 5:
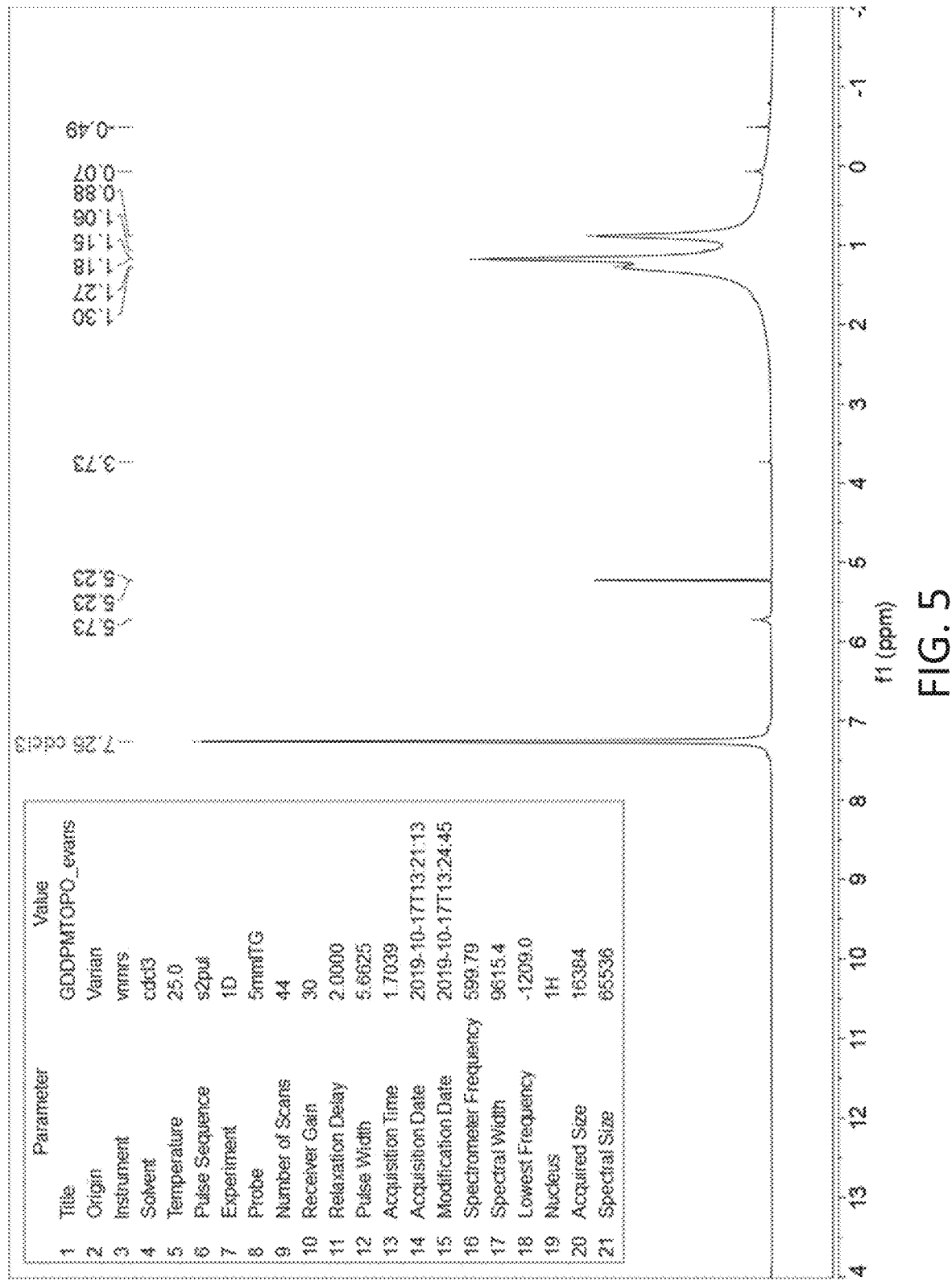
FIG. 5 shows a $^1H$ NMR spectrum of $Gd(DPM)_3TOPO$ used to measure its magnetic susceptibility, according to one or more embodiments.

FIG. 5 shows the $^1$H NMR spectrum of 1.6 wt % Gd(DPM)$_3$TOPO in deuterated chloroform (CDCl$_3$) containing 2% v/v chloroform (CHCl$_3$), according to some embodiments. A sealed, coaxial insert contained the solvent mixture, but no solute. The magnetic susceptibility of the gadolinium chelate complex was calculated from the difference in chemical shift between the resonances of CHCl$_3$ in the coaxial insert (at 7.26 ppm, labeled '*') and the CHCl$_3$ in the paramagnetic solution (at 5.23 ppm, labeled '**').

Figure 6:
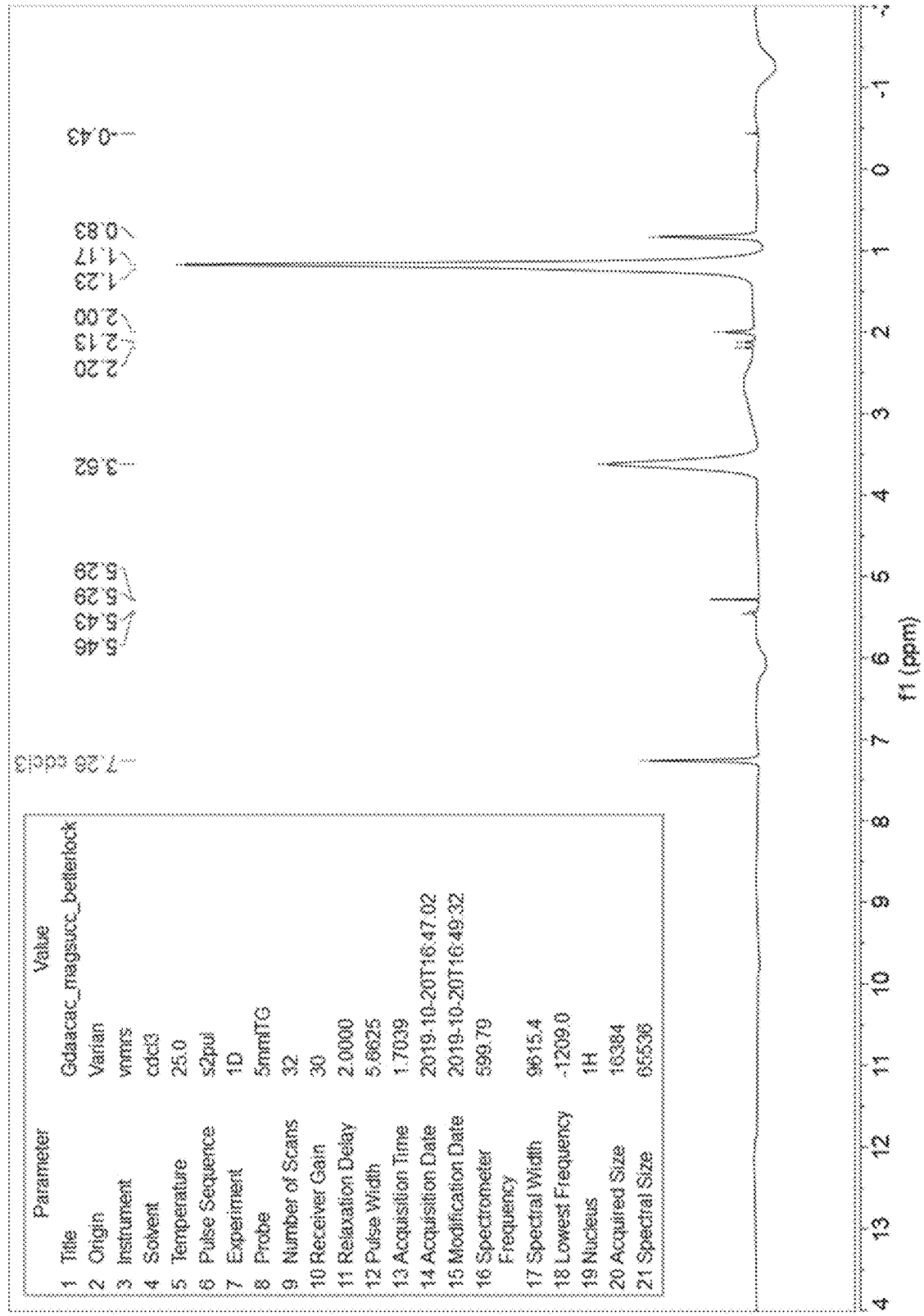
FIG. 6 shows a $^1H$ NMR spectrum of $Gd(acac)_3TOPO$ used to measure its magnetic susceptibility, according to one or more embodiments.

FIG. 6 shows the $^1$H NMR spectrum of 1.4 wt % Gd(acac)$_3$TOPO in deuterated chloroform (CDCl$_3$) containing 2% v/v chloroform (CHCl$_3$), according to some embodiments. A sealed, coaxial insert contained the solvent mixture, but no solute. The magnetic susceptibility of the gadolinium chelate complex was calculated from the difference in chemical shift between the resonances of CHCl$_3$ in the coaxial insert (at 7.26 ppm, labeled '*') and the CHCl$_3$ in the paramagnetic solution (at 5.29 ppm, labeled '**').

Example 6: Performance of the Gd(DPM)$_3$TOPO as a Paramagnetic Solution for MagLev Separation The Gd(DPM)$_3$TOPO was obtained from the synthesis shown in Example 3 as a viscous oil, which was fully soluble in hexane, heptane, octane, decane, and tetrachloroethylene within the range of concentrations tested (34-900 mM). The compound was soluble in other non-polar organic solvents as well—e.g., carbon tetrachloride and cyclohexane. Solutions based on these solvents were all able to levitate powders (see, e.g., FIG. 4). Solutions with a concentration of up to 450 mM Gd(DPM)$_3$TOPO had a sufficiently low viscosity to allow for fast equilibration of the powders in the MagLev device. Gd(DPM)$_3$TOPO solutions of higher concentration (>450 mM) became markedly more viscous, increasing the time of the separation. The diluted Gd(DPM)$_3$TOPO solution (450 mM; 23 vol % hexane and 77 vol % tetrachloroethylene) had density of 1.20 g cm$^{-3}$ at 23° C. The density was calculated (ρ=g/mL) by weighing 5 mL of the paramagnetic solution.

Figure 4:
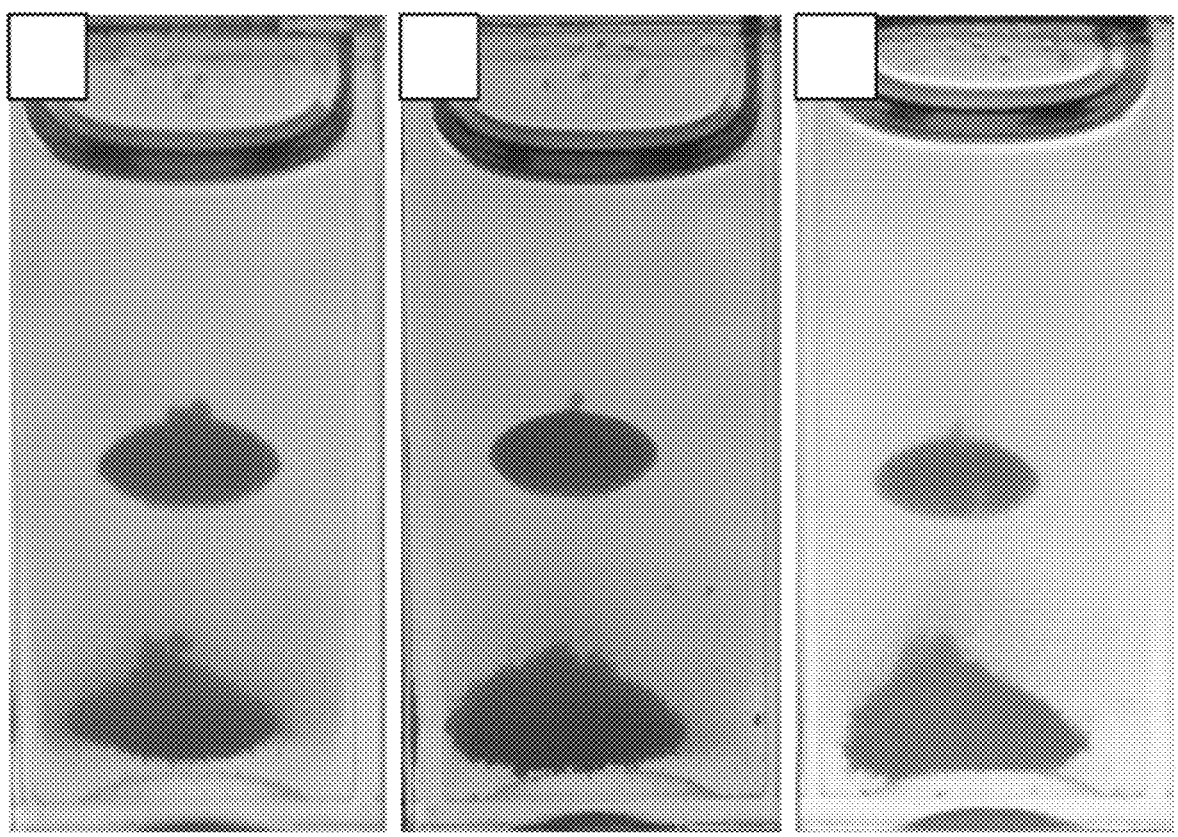
FIG. 4 shows separation of powdered mixtures of lidocaine·HCl and caffeine, according to one or more embodiments.

FIG. 4 shows separation of powdered mixtures (50:50 wt %; 45-50 mg) of lidocaine·HCl (top cloud) and caffeine (lower cloud) with MagLev using paramagnetic solutions with Gd(DPM)$_3$TOPO (450 mM) dissolved in solvent mixtures of tetrachloroethylene in combination with different n-alkanes.

Example 7: Safety and Handling of the Paramagnetic Solution

The combination of hexane and tetrachloroethylene as solvents for the paramagnetic solutions were chosen because of their large difference in density (0.65 versus 1.62 g cm$^{-3}$). This difference allowed for adjustment of the density of the paramagnetic solution by changing the proportion of the solvents. A halogenated solvent was chosen because it is a non-polar organic solvent that has sufficiently high density (>1.5 g cm$^{-3}$). Both solvents are non-polar and are fully miscible with each other, and were also fully miscible with the two types of non-polar gadolinium complexes (i.e., Gd(DPM)₃TOPO and Gd(acac)₃TOPO) used. There were other beneficial properties of theses solvents: (i) They have boiling points that are significantly higher than room temperature (e.g., n-hexane: 69° C. (other suitable n-alkanes was explored, see FIG. 4); and tetrachloroethylene: 121° C.), but they evaporated in a few minutes after the compounds were extracted from the MagLev device and placed on a filter paper. (ii) They have a low ability to solubilize polar substances (such as the salts of the drugs investigated). (iii) They have low chemical reactivity.

The toxicities of the solvents used in the paramagnetic solution were acceptable if handled with the correct safety procedures. The U.S. Hazardous Materials Identification System ("HMIS") ranks hexane as a "moderate hazard", and tetrachloroethylene as a "serious health hazard" for human health (the scale ranges from "minimum hazard" to "severe hazard").

Hexane is a flammable solvent used in, for example, glues, food-oil extraction, and chromatography. Inhalation of hexane in air for short periods of time can cause mild effects on the central nervous system, including, for example, dizziness, giddiness, slight nausea, and headache. Longer time periods of exposure (e.g., inhalation or contact) to hexane is associated with effects on the nervous system, for example, nerve damage in humans.

Tetrachloroethylene is a nonflammable solvent that is used, for example, as a solvent in commercial dry-cleaning. The effect of chronic exposure to tetrachloroethylene can be severe, and the solvent is a suspected carcinogen. Precautions should be taken to avoid inhaling the fumes of the tetrachloroethylene and to avoid absorption the solvent through the skin. Tetrachloroethylene and carbon tetrachloride both are rated (HMIS) as "severe hazards" to human health, however, carbon tetrachloride is a more potent liver toxin.

In some embodiments, precaution should be taken to reduce the amount of evaporation of solvent from the paramagnetic solution. In some embodiments, the faster evaporation of the low-density hexane solvent relative to the high-density tetrachloroethylene solvent and the gadolinium chelate complexes can result in an increase in the density of the paramagnetic solution. In some embodiments, the change in density can interfere with the density calibration of the MagLev device. In some embodiments, the evaporation of the solvents can be minimized by reducing the time of the separation and by covering the top of the cuvette with aluminum foil. In some embodiments, the hexane can also be replaced with solvents with a higher boiling point, such as heptane (98° C.), octane (125° C.), nonane (151° C., or decane (174° C.) to reduce the rate of evaporation of the solvent. For examples of separation of powders using MagLev with different n-alkanes, see FIG. 4.

Example 8: Image Processing

Images were edited using Adobe Lightroom. The white balance was manually set, selecting a spot in the darkest and brightest areas of the image for the calibration of the extremes, respectively. Edits were performed uniformly over the entire area shown in the figures, and with identical settings for every image of the series in FIG. 11A and FIG. 3B. The following parameters were manipulated: color (RGB or monochrome), exposure, contrast, brightness (of highlights, shadows, whites, and blacks), clarity, dehazing, vibrance, and saturation. Unedited images are shown in some figures—white balance and exposure as set by the Nikon DSLR cameras used.

Example 9: Powdered Illicit Drugs, Adulterants, and Diluents

All illicit drugs were produced internally by the Drug Enforcement Administration ("DEA") for use as reference materials, except for the heroin-HCl, which came from a seized sample of South American origin. All experiments with illicit drugs were performed at facilities associated with the DEA. All adulterants and diluents were procured from Sigma-Aldrich, except the following: diltiazem hydrochloride (from EMD Millipore), D-mannitol (from Lancaster Synthesis, Inc.), papaverine·HCl (from ICN Biomedicals), and sucrose (from EMP Millipore).

TABLE 2

Trade names, structures, and IUPAC names of compounds.

| Group | Cpd. No. | Trade Name | Structure | CAS No. | IUPAC Nomenclature |
|---|---|---|---|---|---|
| Active compounds | 3 | Fentanyl•HCl | | 1443-54-5 | N-phenyl-N-[1-(2-phenylethyl)piperidin-4-yl]propanamide hydrochloride |
| | 4 | Acetyl fentanyl•HCl | | 117332-89-5 | N-phenyl-N-[1-(2-phenethyl)piperidin-4-yl]acetamide hydrochloride |

TABLE 2-continued

Trade names, structures, and IUPAC names of compounds.

| Group | Cpd. No. | Trade Name | Structure | CAS No. | IUPAC Nomenclature |
|---|---|---|---|---|---|
| | 5 | Benzyl fentanyl•HCl | | 5156-58-1 | N-(1-benzylpiperidin-4-yl)-N-phenyl-propanamide hydrochloride |
| | 6 | Carfentanyl•HCl | | 59708-52-0 (for base) | Methyl 1-(2-phenylethyl)-4-[phenyl(propanoyl)amino]piperidine-4-carboxylate hydrochloride |
| | 7 | Cocaine•HCl | | 53-21-4 | methyl (1S,3S,4R,5R)-3-benzoyloxy-8-methyl-8-azabicyclo[3.2.1]octane-4-carboxylate hydrochloride |
| | 8 | Heroin•HCl | | 5893-91-4 | [(4R,4aR,7S,7aR,12bS)-9-acetyloxy-3-methyl-2,4,4a,7,7a,13-hexahydro-1H-4,12-methanobenzofuro[3,2-e]isoquinoline-7-yl] acetate hydrochloride |
| | 9 | Oxycodone•HCl | | 124-90-3 | (4R,4aS,7aR,12bS)-4a-hydroxy-9-methoxy-3-methyl-2,3,4,4a,5,6-hexahydro-1H-4,12-methanobenzofuro[3,2-e]isoquinolin-7(7aH)-one hydrochloride |
| | 10 | Methamphetamine HCl | | 51-57-0 | N-methyl-1-phenylpropan-2-amine hydrochloride |
| Adulterants | 11 | Acetaminophen | | 103-90-2 | N-(4-hydroxyphenyl)acetamide |

TABLE 2-continued

Trade names, structures, and IUPAC names of compounds.

| Group | Cpd. No. | Trade Name | Structure | CAS No. | IUPAC Nomenclature |
|---|---|---|---|---|---|
|  | 12 | Caffeine |  | 58-08-2 | 1,3,7-trimethylpurine-2,6-dione |
|  | 13 | Diltiazem•HCl |  | 33286-22-5 | [(2S,3S)-5-[2-(dimethylamino)ethyl]-2-(4-methoxyphenyl)-4-oxo-2,3-dihydro-1,5-benzothiazepin-3-yl] acetate hydrochloride |
|  | 14 | Dipyrone/metamizole |  | 5907-38-0 | Sodium [(1,5-dimethyl-3-oxo-2-phenylpyrazol-4-yl)-methylamino] methanesulfonate |
|  | 15 | Lidocaine•HCl |  | 73-78-9 | 2-(diethylamino)-N-(2,6-dimethylphenyl) acetamide hydrochloride |
|  | 16 | Hydroxyzine•2HCl |  | 2192-20-3 | 2-[2-[4-[(4-chlorophenyl)-phenylmethyl]piperazin-1-yl]ethoxy]ethanol dihydrochloride |
|  | 17 | Levamisole•HCl |  | 16595-80-5 | (6S)-6-phenyl-2,3,5,6-tetrahydroimidazo[2,1-b][1,3]thiazole hydrochloride |
|  | 18 | Papaverine•HCl (not an adulterant per se—it is a byproduct of the heroin manufacturing process) |  | 61-25-6 | 1-[(3,4-dimethoxyphenyl) methyl]-6,7-dimethoxyisoquinoline hydrochloride |

TABLE 2-continued

Trade names, structures, and IUPAC names of compounds.

| Group | Cpd. No. | Trade Name | Structure | CAS No. | IUPAC Nomenclature |
|---|---|---|---|---|---|
| | 19 | Pro-caine•HCl | | 51-05-8 | 2-(diethylamino)ethyl 4-aminobenzoate hydrochloride |
| | 20 | Phenacetin | | 62-44-2 | N-(4-ethoxyphenyl)acetamide |
| Diluents | 21 | Dimethyl sulfone | | 67-71-0 | (methanesulfonyl)methane |
| | 22 | D-Fructose | | 57-48-7 | D-Fructose |
| | 23 | D-Glucose | | 50-99-7 | D-Glucose |
| | 24 | α-Lactose | | 63-42-3 | β-D-galactopyranosyl-(1→4)-D-glucose |
| | 25 | D-Mannitol | | 69-65-8 | (2R,3R,4R,5R)-hexane-1,2,3,4,5,6-hexol |
| | 26 | Sodium carbonate | | 497-19-8 | Sodium carbonate |
| | 27 | Starch from potato | A mixture of the polysaccharides amylose and amylopectin. | 9005-25-8 | Mixture of compounds |
| | 28 | Sucrose | | 57-50-1 | β-D-Fructofuranosyl α-D-glucopyranoside |

TABLE 2-continued

Trade names, structures, and IUPAC names of compounds.

| Group | Cpd. No. | Trade Name | Structure | CAS No. | IUPAC Nomenclature |
|---|---|---|---|---|---|
| | 29 | Talc | $Mg_3Si_4O_{10}(OH)_2$ | 14807-96-6 | Dioxosilane oxomagnesium hydrate |

TABLE 3

The most common range of purity of illicit drugs at the retail level, and the most frequent adulterant and diluents associated with each type of drug. Note that oxycodone is a prescription drug, all other compounds are drugs from illicit sources.

| Active Compound | Common range of drug content (wt %) | Most common adulterants and diluents |
|---|---|---|
| Fentanyl | US: N/A. The average is reported to be 5.1 wt %. Europe: N/A | Fentanyl is commonly found in mixtures sold as opioids, heroin, or cocaine. Fentanyl in often mixed with sugars. |
| Heroin | US: 6-60% Europe: 15-41% | US: quinine, caffeine, diltiazem, lactose, and mannitol Europe: caffeine and acetaminophen, and lactose. |
| Oxycodone | US: The content of oxycodone-HCl in OxyContin varies (8-30%) for different suppliers and dosing. | US: butylated hydroxytoluene, hypromellose, polyethylene glycol, polyethylene oxide, magnesium stearate, titanium dioxide, and compounds that gives the tablets color. |
| Cocaine | US: 39-65% Europe: 18-33% | US: levamisole, phenacetin, lidocaine, starch, and sodium carbonate. Europe: phenacetin, levamisole, caffeine, diltiazem, hydroxyzine and lidocaine. |
| Methamphetamine | US: 90-96% Europe: 36-70% | US and Europe: dimethyl sulfone, caffeine, sugars, and acetaminophen. |

Example 10: Measurement of Density of Powders with MagLev

Disposable UV-grade methacrylate cuvettes (product no. Z188018, Sigma Aldrich, outer dimensions 12.7×12.7×45 mm, inner dimensions: 10×10×45 mm) were cut with a band saw to a height of 25 mm (approximately 2.5 mL capacity) to fit between the faces of the two magnets. This particular type of plastic cuvette showed good resistance to repeated exposures to the non-polar paramagnetic solutions used. The density gradient was mapped to obtain a standard curve, by recording the height of the levitating glass bead density standards (American Density Materials, Inc.) of known densities, with a ruler for reference of distance (see FIG. 7A). The powdered mixtures (300-1000 mg) were prepared by weighing and adding the individual compounds to a 10 mL glass vial and shaking and inverting it by hand for 5 minutes. From these powdered mixtures, samples with weights between 2-50 mg were extracted and added to the cuvette with the paramagnetic solution. The separation of the particles was imaged using a DSLR camera (Canon EOS Rebel T6i with a Canon EF 50 mm f/1.8 STM lens) for single time-point experiments and time-lapse imaging, with a ruler placed next to the cuvette as a reference of position. The levitating powders were illuminated with an external light source. The position of the middle of the centroid of the levitating fractions was used to find the density of the levitating compound from the standard curves.

The time of separation for the powders depended mainly on the following five reasons: (i) The sample size, because large amounts of powder took longer to separate than small samples. (ii) The particle size, because small particles took longer time to separate than large ones. (iii) The concentration of gadolinium(III) in the paramagnetic solution, because a higher concentration of $Gd^{3+}$ resulted in faster separation. (iv) The viscosity of the paramagnetic solution, because an increase in viscous drag on the particles resulted in slower separation. (v) The magnetic field strength, because higher magnetic field strength resulted in faster separation.

Figure 7A:
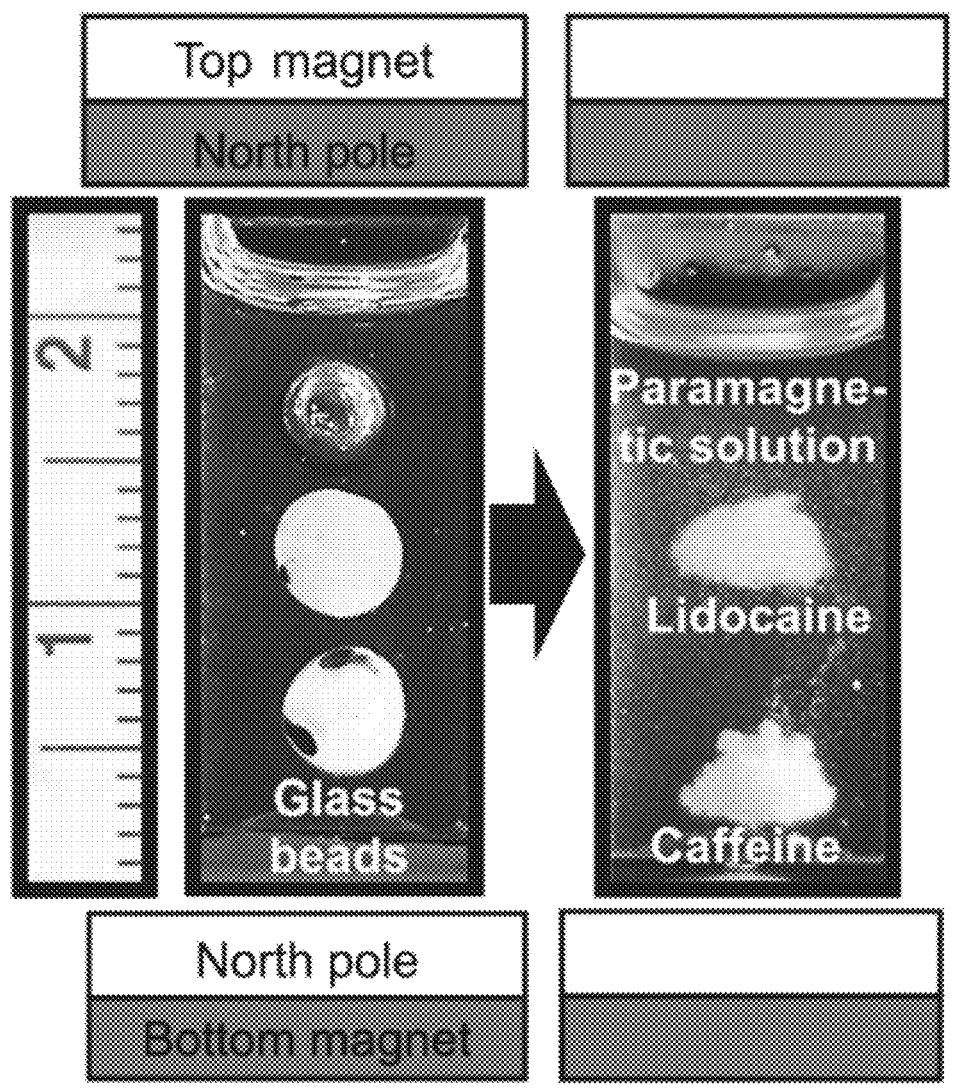
FIG. 7A shows calibration of a MagLev device and its use to determine the density of levitating fractions, according to one or more embodiments.
Figure 7B:
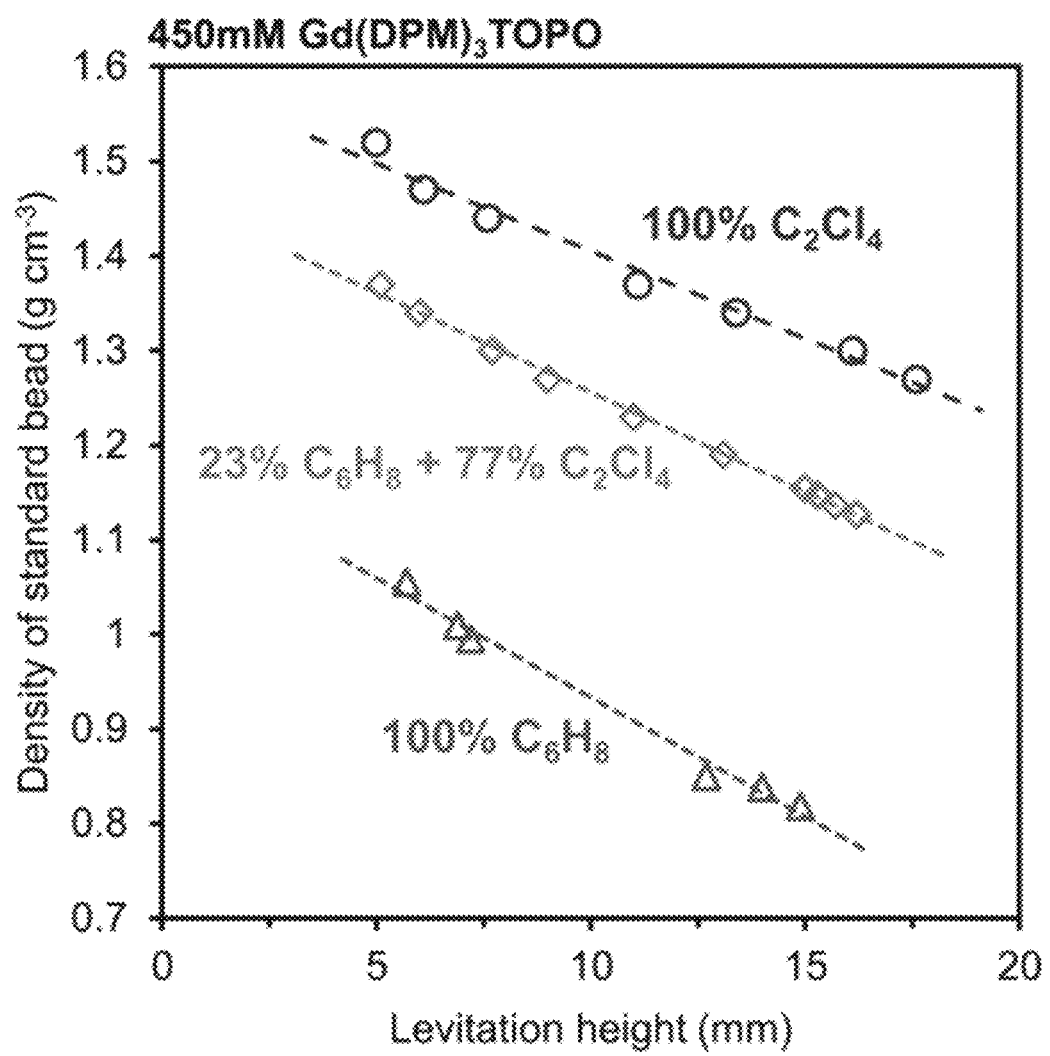
FIG. 7B shows standard curves measured with glass bead density standards in solutions of $Gd(DPM)_3TOPO$, according to one or more embodiments.
Figure 7C:
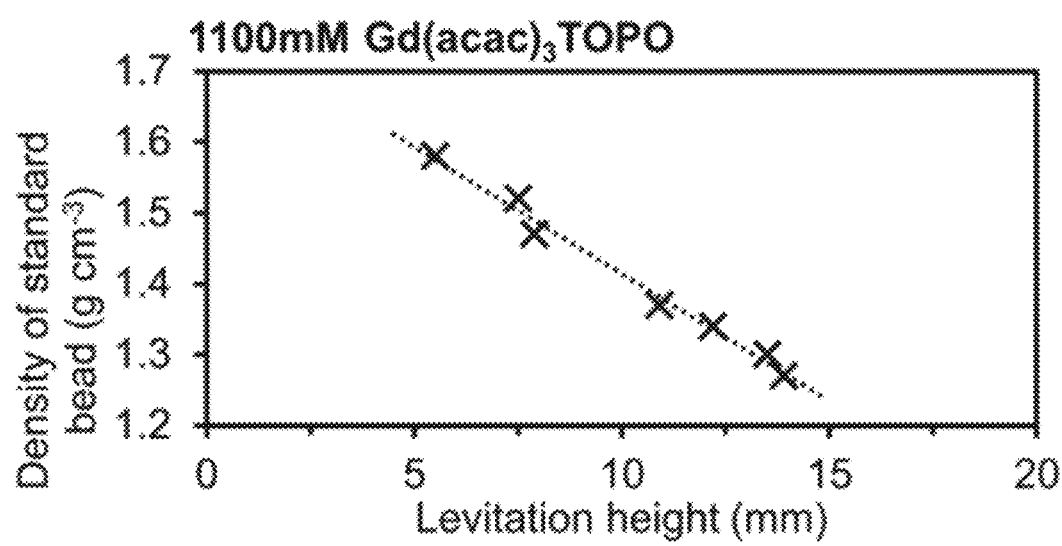
FIG. 7C shows the standard curve measured with glass bead density standards in a solution of $Gd(acac)_3TOPO$, according to one or more embodiments.

FIG. 7A shows the MagLev device was calibrated by measuring the position of glass beads of known density (with a ruler for reference). The standard curve was used to find the density of levitating fractions (i.e., here, obtained from lidocaine·HCl and caffeine) in the MagLev device. FIG. 7B shows standard curves measured with glass bead density standards in solutions of $Gd(DPM)_3TOPO$ (450 mM) dissolved in solvent mixtures of different composition (vol %); $C_2H_8$ (hexane); $C_2Cl_4$ (tetrachloroethylene). FIG. 7C shows the standard curve measured with glass bead density standards in a solution of $Gd(acac)_3TOPO$ (1100 mM; as obtained from the synthesis in tetrachloroethylene, without further dilution).

Example 11: Density-Based Separation of Powders Using MagLev

A custom larger cuvette was made (see FIG. 2B and FIG. 8) that allowed access to the levitating powders with a pipette from the side of the MagLev after the powders had equilibrated. The custom cuvette was made by laser cutting (VersaLASER VL-300, Universal Laser Systems, Inc.) transparent poly(methyl methacrylate) ("PMMA") sheets (2 mm thick, McMaster-Carr) and by gluing the sheets together using acrylic adhesive (Weld-On #3 Adhesive, SCIGRIP). Pasteur pipettes were used to extract the different fractions of powders that had separated in the MagLev device (see FIG. 9). Each fraction was suction filtered on a grade 3 Whatman filter paper, and (at the same time) rinsed with hexane to remove any residues of the $Gd(DPM)_3TOPO$.

Powders of compounds of larger particle size (e.g., fentanyl, acetyl-fentanyl, benzyl fentanyl, and heroin) reached their equilibrium positions in the paramagnetic solution faster than compounds of smaller particle size. Compounds present as small particles (e.g., cocaine, methamphetamine, and lactose) moved more slowly in the paramagnetic solution (consistent with Stoke's law).

Figure 8:
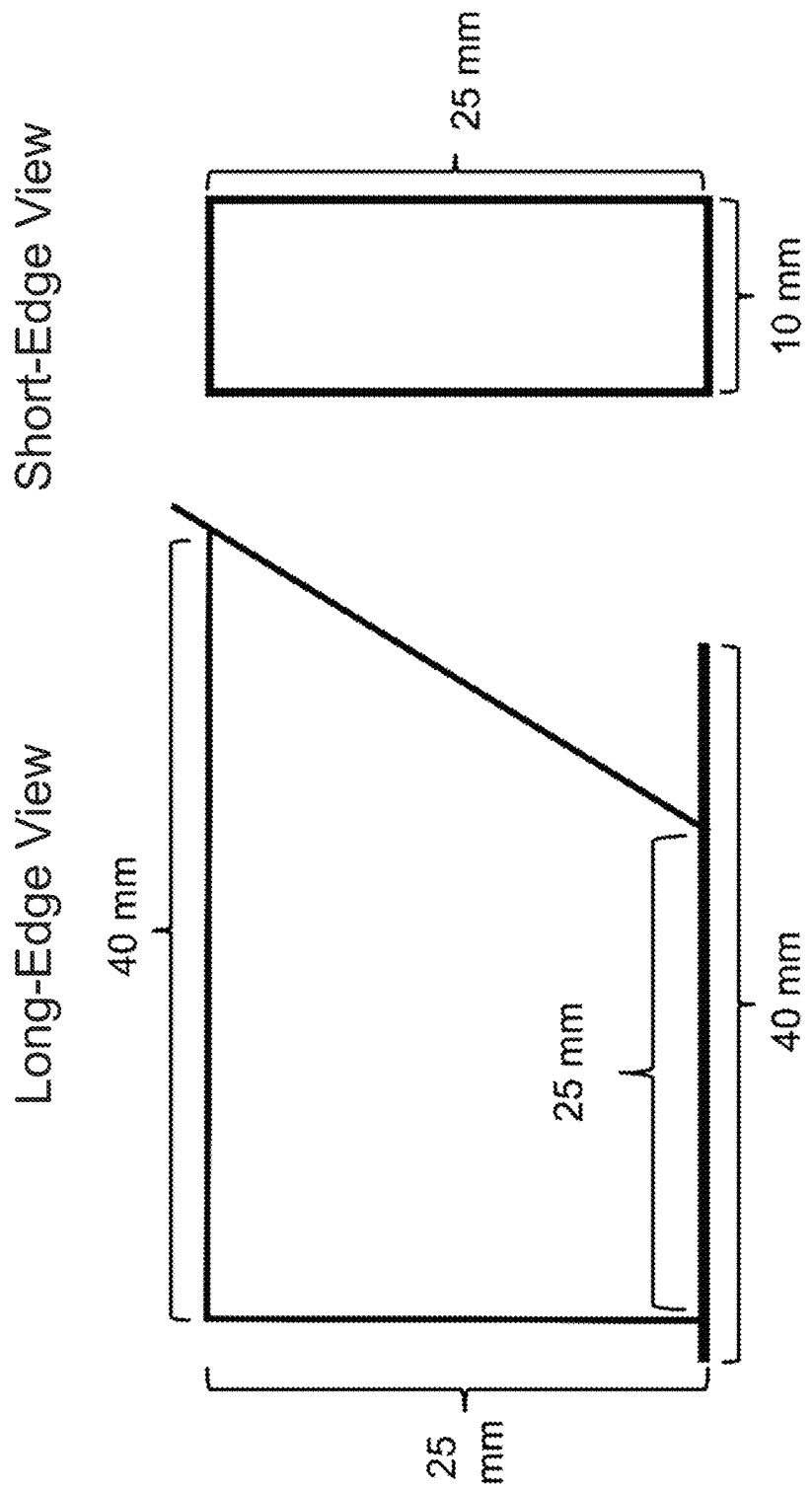
FIG. 8 shows a schematic diagram of a custom cuvette, according to one or more embodiments.

FIG. 8 shows a schematic diagram of the custom cuvette with dimensions viewed from the long edge and short edge, according to some embodiments.

Figure 9:
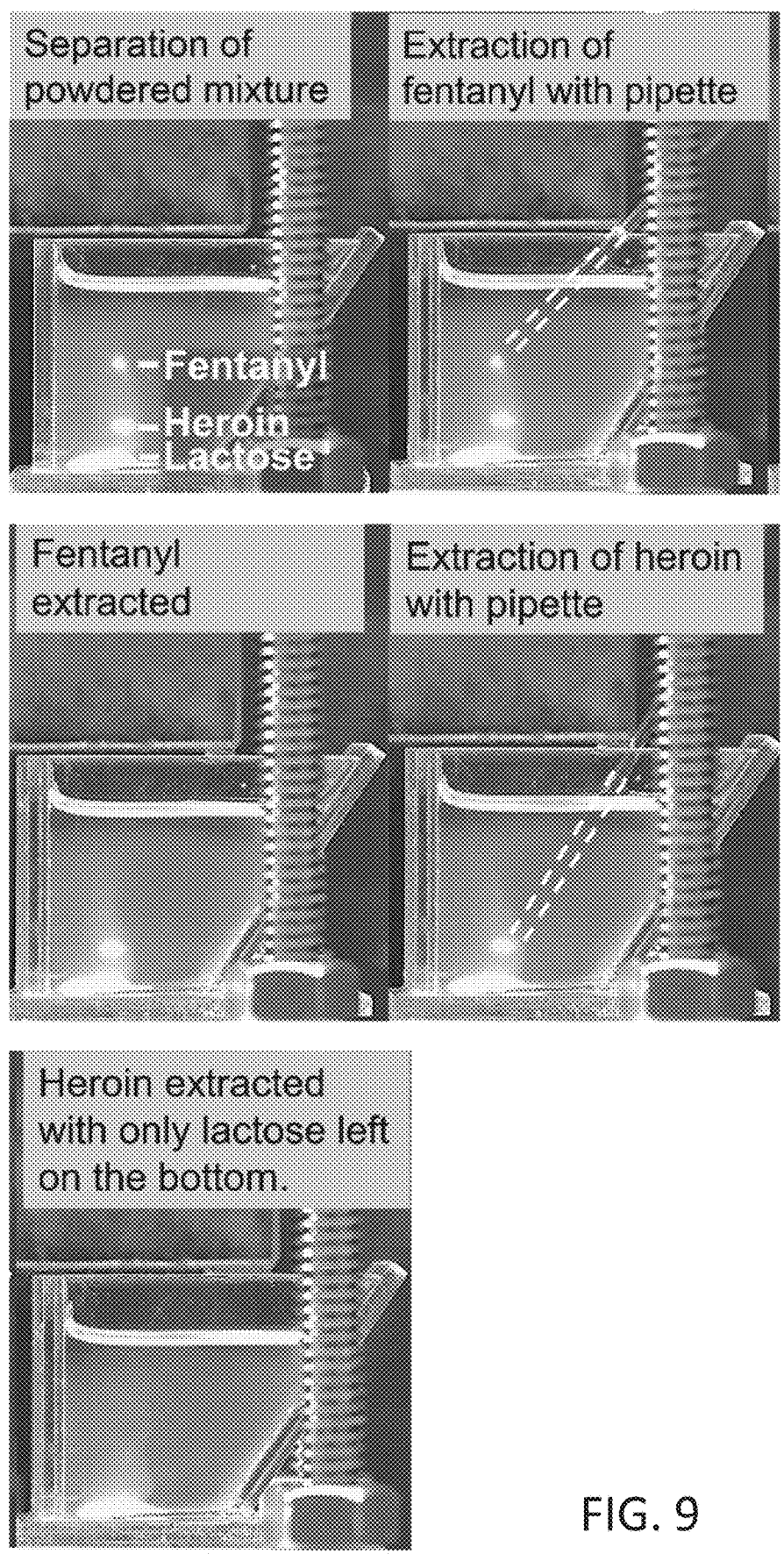
FIG. 9 shows separation and extraction of the separate fractions of a powdered mixture of fentanyl-laced heroin in a MagLev device, according to one or more embodiments.

FIG. 9 shows separation and extraction of the separate fractions of a powdered mixture (50 mg) of fentanyl-laced heroin in a MagLev device, according to some embodiments. The powdered mixture consisted of fentanyl·HCl (1.3 wt %), heroin HCl (2.6 wt %), and α-lactose (96 wt %—bottom of the cuvette). The mixture was allowed to separate for 30 minutes before the different fractions were extracted with a Pasteur pipette (dashed white lines). The lactose did not levitate and sank to the bottom of the cuvette. The geometric shape of the cuvette (height: 25 mm) facilitated the insertion of the pipette without disturbing the levitated solids. The paramagnetic solution consisted of Gd(DPM)$_3$TOPO (450 mM) dissolved in a mixture of 23 vol % hexane and 77 vol % tetrachloroethylene. The images were uniformly post-processed for contrast and clarity.

Example 12: A Model System Based on Lidocaine·HCl and Caffeine

All experiments with active compounds were performed at a DEA facility that had the necessary approvals and infrastructure for handling of such compounds. Active compounds were associated with significant legal oversight, permits, safety precautions, and limits on the type and amount of compound that can be procured. The bulk of the method development of the MagLev separation took place at Harvard University, which does not have approval to work with schedule I and II drugs.

TABLE 4

Requirements for handling of schedule I and II drugs in the U.S.

| | Schedule I* | Schedule II** |
|---|---|---|
| Registration | Required | Required |
| Receiving Records | Order Forms | Order Forms |
| Prescriptions | No | Written prescription |
| Refills | No | No |
| Distribution Between Registrants | DEA order forms | DEA order forms |
| Security | Locked cabinet or other secure storage | Locked cabinet or other secure storage |
| Theft or Significant Loss | Report and complete DEA form | Report and complete DEA form |

*Definition of Schedule I compounds (U.S.): Drugs, compounds, and chemicals without any currently accepted use in medicine, and with a high potential for abuse, e.g., cannabis, lysergic acid diethylamide (LSD), methaqualone, peyote, heroin, and 3,4-methylenedioxymeth-amphetamine (ecstasy).
**Definition of Schedule II compounds (U.S.): Drugs, compounds, and chemicals with a high potential for abuse, and a high risk of users developing strong psychological/physical dependence, e.g., fentanyl, cocaine, methamphetamine,hydromorphone, methadone, oxycodone, methadone, Ritalin, and Adderall.

To facilitate the development of the methodology and the investigation of the dynamics of the separation in the MagLev device, a model system was developed that does not contain controlled compounds. The model system consisted of a binary mixture of two compounds, lidocaine·HCl and caffeine, both of which are minimally regulated (along with additional benefits) compared to active compounds (chemistry laboratories can buy them without special approval). This model system was chosen for the following reasons: (i) The two compounds were water-soluble and, thus, they mimicked many active compounds; (ii) hydrochlorides, such as lidocaine·HCl, were the common salt forms found in seized mixtures of powdered illicit drugs; (iii) both compounds were commonly found as adulterants in powdered mixtures of illicit drugs; (iv) laboratories could procure them without special permits and documentation; (v) they had distinctly different densities; (vi) their particle sizes were different when observed by eye; (vii) they were inexpensive (Sigma Aldrich: lidocaine·HCl, Prod. #: PHR1257-500MG, $127 per gram; caffeine, Prod. #: C0750-5G, $4 per gram); and (viii) their toxicity was acceptable; i.e., a dust mask was sufficient protection to avoid inhalation of particles when the dried powders were handled (which is important in the case of lidocaine·HCl).

Example 13: Scanning Electron Microscopy Imaging of Powders

To obtain SEM images (see FIG. 12C), a small amount (<1 mg) of powdered of lidocaine·HCl and caffeine were dispensed (on separate SEM stubs) with a spatula directly onto carbon tape (Ted Pella, 16086-12) that had been manually applied to standard SEM stubs (Ted Pella, 16111). The powders were gently pressed with a spatula into the carbon tape to promote adhesion. Field emission electron microscopy was performed on a Zeiss Ultra Plus FESEM using the in-lens detector at an imaging voltage of 0.8 kV and the SE2 secondary electron detector at an imaging voltage of 6.5 kV. ImageJ was used to analyze the size of the crystals in the images.

Example 14: $^1$H NMR Analysis of Fractions of Powders Separated by MagLev

A mixture of lidocaine·HCl and caffeine (50:50 wt %) was levitated in the MagLev device until the powders reached their equilibrium levitation heights. The powders were carefully extracted from the cuvette using Pasteur pipettes (guided by pivoting of the hand) and collected by suction filtration on a grade 3 Whatman filter paper. The residue was washed three times with 40 mL portions of solvent (hexane), air-dried, and gently scraped off the filter paper with a spatula and stored in an air-tight glass vial (e.g., up to five days) until characterized. For $^1$H NMR, 3 mg of the residue was dissolved in 0.6 mL of DMSO-d$_6$ and transferred to a NMR tube for NMR analysis. $^1$H NMR spectra (see FIG. 12E) were recorded on an Agilent DD2 600 MHz NMR spectrometer, using standard pulse programs.

Example 15: FTIR-ATR Analysis of Fractions of Powders Separated by MagLev

The powdered samples that contained powdered lidocaine·HCl and caffeine (same washing procedure as for the $^1$H-NMR analysis) were analyzed in their dry, powdered state with FTIR (see FIG. 12F) with an ATR diamond window (Bruker Platinum, Bruker). Spectra were measured between 4000-400 cm$^{-1}$ at a resolution of 1 cm$^{-1}$ with 64 sample and background scans. The samples that contained fentanyl·HCl and α-lactose (same washing procedure as for the $^1$H-NMR analysis of lidocaine and caffeine) were analyzed with an FTIR-ATR (Nicolet iS19 FTIR with a smart Golden Gate ATR, Thermo-fisher) between 4000-455 cm$^{-1}$ at a resolution of 4 cm$^{-1}$ with 64 sample and background scans. The pure compounds (controls) were analyzed without first exposing them to any paramagnetic solutions.

Example 16: Analysis of Powders Containing Illicit Drugs Using MagLev

MagLev enabled the separation of powdered mixtures of illicit drugs (e.g., cocaine, methamphetamine, heroin, fentanyl and its analogs), adulterants, and diluents based on density, and allowed the presumptive identification of individual components. In some embodiments, small samples (mass <50 mg), with low weight percentages of illicit drugs, present a particular challenge to analysis for forensic chemists. The MagLev device—a cuvette containing a solution of paramagnetic gadolinium(III) chelate in a non-polar solvent, placed between two like-poles-facing NdFeB magnets—allowed separation of seven relevant compounds simultaneously. In particular, initial separation with MagLev, followed by characterization by FTTR-ATR, enabled identification of fentanyl in a sample of fentanyl-laced heroin (1.3 wt % fentanyl, 2.6 wt % heroin, and 96.1 wt % lactose). MagLev allowed identification of unknown powders in mixtures and enabled confirmatory identification based on structure-specific techniques.

The abuse of drugs is a major public health problem, with fatalities attributed to overdoses numbering 7,600 in the E.U. (78% involving opioids) and 70,000 in the U.S. (86% opioids) in 2017. A potent subgroup of these compounds are the synthetic opioids (mainly fentanyl and its analogs) that were involved in 30,000 deaths in the U.S. In some embodiments, "opioids" are defined as molecules that interact with the opioid receptors in neural and intestinal cells. In some embodiments, "opiates" are opioids of natural or semi-natural origin.

Fentanyl—a painkiller and anesthetic that is widely used in medicine—has particular relevance in law enforcement because it is the predominant synthetic opioid found in seized samples of drugs of abuse. Fentanyl and its analogs can be orders of magnitude more potent than natural opioids; for example, the activities of these compounds in suppression of pain, relative to morphine, are: morphine (potency≡1×), oxycodone (1.8×), acetyl fentanyl (16×), fentanyl (100×), and carfentanyl, (10,000×). These compounds are mainly used as additives in products that are marketed recreational, or "street", drugs, such as, for example, "heroin" and "cocaine". An addict may typically use 0.3-1.0 mg of fentanyl to achieve a high; a dose of 2.0-5.0 mg may cause death. In the U.S. (2017), the DEA found that the average content of fentanyl in drugs obtained from street-level retail was 5.1 wt % (with a total range of 0.1-97.8 wt % for all confiscated drugs). Fentanyl hydrochloride is a prominent fentanyl salt in seized samples, while the citrate salt is found in a minority of confiscated drugs.

To moderate potency, and to increase profit margins, drugs are commonly diluted with adulterants, i.e., semi-active compounds that are added to enhance the effect of the drugs or simply mimic their properties. For example, because drug users test the bitterness of mixtures to judge the content of heroin, acetaminophen and caffeine are added to maintain the bitterness of the mixture when heroin—which is bitter—is diluted. Diluents (non-active compounds, such as lactose, dimethyl sulfone, and glucose) are added to lower the concentration of the drug, and to make it easier to handle and use.

To identify a drug according to forensic standards of analysis, two to three different analytical methods can be used. Techniques with molecular specificity—X-ray diffractometry and IR, NMR, Raman, and mass spectrometry—are given the highest ranking. GC-MS is the workhorse in modern forensic drug laboratories (e.g., in most U.S. federal, state, and municipal laboratories—depending on the state), but the cost, the lack of portable systems, and the technical skill needed to handle this instrument prohibit large-scale use in the field. Most separations (capillary electrophoresis, gas chromatography, liquid chromatography, and other less-molecularly-specific techniques) are considered intermediate in value for identification. Other methods that provide more limited information about the molecular structure are in the third, lowest, category. When an appropriate combination of methods is used to confirm the presence of a compound (e.g., at least two techniques, with one from category A and the second from categories A, B, or C, or, alternatively, three techniques if at least two are from category B and the additional technique is from B or C), and when the sampling procedure adheres to defined protocols, the presence of the compound can be considered to have been identified. This level of identification is referred to as "confirmatory identification."

TABLE 5

Recommended techniques for identification of illicit drugs, according to some embodiments. The methods were ranked in categories according to the ability to identify the specific molecular structures. The categorization is defined by the international forensic organization Scientific Working Group for the Analysis of Seized Drugs ("SWGDRUG"). Category A techniques provided structural information about molecules. Category B techniques measured chemical or physical information, and Category C offered general information, or class information, about the compounds that are present.

| | |
|---|---|
| Category A (Highest selectivity for molecular structure) | Infrared Spectroscopy<br>Mass Spectrometry<br>Nuclear Magnetic Resonance Spectroscopy<br>Raman Spectroscopy<br>X-ray Diffractometry |
| Category B (Intermediate Selectivity) | Capillary Electrophoresis<br>Gas Chromatography<br>Ion-Mobility Spectrometry<br>Liquid-Chromatography<br>Microcrystalline Tests*<br>Supercritical Fluid Chromatography<br>Thin-Layer Chromatography<br>Ultraviolet/Visible Spectroscopy (full spectrum)<br>Macroscopic Examination (Cannabis only)<br>Microscopic Examination (Cannabis only) |
| Category C (Lowest Selectivity) | Color Tests<br>Fluorescence Spectroscopy<br>Immunoassay<br>Melting Point<br>Pharmaceutical Identifiers (i.e., information on packaging) |

*Chemical tests based on the addition of chemical reagents that form characteristic types of microcrystals when a specific drug is present. The crystals are identified by observation with light microscopy.

In some embodiments, in the U.S., in confirmatory identification can only be performed by an expert (e.g., a forensic chemist). In some instances, a police officer cannot be admitted as an expert witnesses in court for chemistry or forensics and, therefore, the "opinion" of the police officer cannot be entered as fact. Thus, a measurement performed by a law enforcement officer with a confirmatory technique is assigned a standing similar to that of a presumptive technique. However, the use of techniques of high molecular specificity by law enforcement officers have the benefit of reducing the number of false positive and negatives that are inherent to most other presumptive identification techniques.

In some embodiments, MagLev has the potential to be used for presumptive identification, based on compound density. In some embodiments, presumptive identification is the lowest level of specificity (Category C in Table 5), but encompasses the most common group of analytical methods used to screen compounds in the field (outside of an analytical laboratory). Immunoassays and colorimetric tests are other examples; these techniques provide weak evidence of molecular identity, but are easily used in resource-limited circumstances (e.g., border inspection stations and mail-sorting facilities). MagLev has, however, the potential to enable more specific techniques because of its ability to separate dilute compounds in mixtures of powders. In some embodiments, MagLev has the potential to be used by forensic organizations for analysis of seized illicit drugs.

MagLev was used to determine three characteristics of a powdered sample: (i) the minimum number of compounds present in the sample, (ii) the densities of these separately levitating compounds (or mixtures of overlapping compounds) (see FIGS. 10A-C and FIGS. 11A-B), and (iii) qualitatively, an estimate of the relative amounts of these compounds (see FIG. 12D). To finish the presumptive identification, the densities measured for the levitating fractions were compared with reference materials (pure compounds) using a look-up table (see Table 6). MagLev generated more information from the same sample than most techniques used for presumptive identification and measured the density of multiple compounds, including those present in small amounts, for a range of chemical structures in a one-step procedure. MagLev both allowed for the separation and isolation of the compounds present in a mixture, and facilitated an increase in the specificity of more detailed spectroscopic methods.

TABLE 6

The densities of different active compounds, adulterants, and diluents found in mixtures of illicit powdered drugs, according to some embodiments. The densities represent the values reported in literature, and measured with the MagLev device as described in some embodiments herein. N/A = not available.

| | Compound | Density reported in literature (g cm$^{-3}$) | Density measured with MagLev* (g cm$^{-3}$) | %-difference in density measured with Maglev relative to reported values** |
|---|---|---|---|---|
| Active compounds | Fentanyl•HCl | N/A | 1.19 | N/A |
| | Fentanyl citrate | 1.23 | N/A | N/A |
| | Fentanyl base | 1.16 | N/A | N/A |
| | Acetyl fentanyl•HCl | N/A | 1.18 | N/A |
| | Benzyl fentanyl•HCl | N/A | 1.14 | N/A |
| | Cocaine•HCl | 1.34 | 1.32 | 5.6 |
| | Heroin•HCl | 1.38 | 1.34 | -2.9 |
| | Methamphetamine•HCl | 0.91 | 1.10 | 20.1 |
| Adulterants | Acetaminophen | 1.29 | 1.27 | -1.6 |
| | Caffeine | 1.39 | 1.36 | -2.2 |
| | Diltiazem•HCl | 1.24 | 1.30 | 4.8 |
| | Dipyrone/ Metamizole sodium | 1.39 | 1.38 | -0.7 |
| | Lidocaine•HCl | 1.20 | 1.19 | -0.8 |
| | Hydroxyzine•2HCl | 1.24 | 1.22 | -1.6 |
| | Levamisole•HCl | 1.31 | 1.45 | 10.7 |
| | Papaverine•HCl*** | 1.33 | 1.30 | -2.2 |
| | Procaine•HCl | 1.16 | 1.23 | 6.0 |
| | Phenacetin | 1.24 | 1.21 | -2.41 |
| Diluents | Dimethyl sulfone | 1.44 | 1.43 | -0.7 |
| | β-D-(-)-Fructose | 1.6 | 1.58 | -2.5 |
| | D-(+)-Glucose | 1.54 | 1.51 | -1.9 |
| | α-Lactose | 1.54 | 1.50 | -2.6 |
| | D-Mannitol | 1.51 | 1.51 | 0 |
| | Sodium carbonate | 2.54 | >1.77 | N/A |
| | Starch from potato | 1.5 | 1.48 | -2.6 |
| | Sucrose | 1.59 | 1.58 | -0.6 |
| | Talc | 2.82 | >1.55 | N/A |

*The densities of the compounds were determined by recording the height (distance above the bottom magnet) that each levitating fraction levitated between the two magnets. The middle of the centroid formed by each levitating cloud was defined as the height of levitation of that particular fraction. The recorded height was converted to a value of density using an experimentally determined standard curve.
** The discrepancies in densities between the values reported in literature and measured with MagLev can, in some embodiments, be caused by different factors. For example, in some embodiments, X-ray diffractometry is often performed on single crystals that are perfectly crystalline; illicit drug samples are known to contain compounds that are not perfectly crystalline. In addition, the densities measured with MagLev were determined from levitating clouds that typically consisted of several hundred particles that in some cases were crystalline or amorphous (or a mixture of both states), or in different states of hydration or crystal polymorphism, etc.
*** Papaverine is technically a product of heroin manufacturing, not an adulterant or diluent.

In some embodiments, determining the composition of illicit drugs in the field faces at least four hurdles: (i) the technical and procedural training required to ensure correct handling of the sample, (ii) access to appropriate instruments, (iii) the risk of exposure to the drugs, and (iv) the highly variable composition of the drug mixtures. For these and other reasons, seized samples are often not analyzed for their constituents in the field, but only later at a local law enforcement facility, or at a well-equipped and competently staffed central laboratory. Shipping to, and analysis in, central laboratories can introduce long delays in the identification of molecular constituents of mixtures of drugs (e.g., backlogs in analysis are common).

In some embodiments, mixtures of illicit drugs can contain a wide range of compounds. With this in mind, separation of active compounds (with a range of chemical properties) commonly found in samples seized by law enforcement was conducted, including the hydrochloride salts of fentanyl, acetyl fentanyl, cocaine, heroin, and methamphetamine (see FIGS. 10A-C and FIGS. 11A-B). Five relevant powdered mixtures were separated, each composed of commonly encountered active compounds, adulterants, or diluents (see FIG. 10A and FIGS. 11A-B). Although cocaine-HCl (1.32 g cm$^{-3}$) and heroin-HCl (1.34 g cm$^{-3}$) did not separate completely under the conditions described here (see FIG. 11A and Table 6), their separation by density can be improved by changing a number of parameters.

In some embodiments, the synthetic opioids can be especially challenging to detect due to their high potency, which enables (and requires) high dilution (≤5 wt %) of the active components and, thus, makes the analyses of these opioids in small samples (≤50 mg) particularly difficult. For example, a fentanyl compound may be present only as a few crystals in a 50 mg sample.

Existing portable methods for detection of fentanyl include colorimetric tests, microcrystalline tests, electrochemistry, immunochemistry, near-infrared spectroscopy, surface-enhanced Raman spectroscopy, Raman spectroscopy, and FTIR spectroscopy. Common portable methods currently used in the field by law enforcement personnel for general detection of drugs are colorimetric tests, handheld Raman (e.g., Thermo Scientific TruNarc or Chemring Detection Systems PGR-1064), and FTIR (e.g., Thermo Scientific TruDefender FTXi and Smiths Detection HazMatTD Elite). Both Raman and FTIR-ATR (which are considered more sensitive and accurate than colorimetric tests) have limits-of-detection of approximately 5 wt %, and are therefore not sensitive enough to detect dilute drugs directly in the mixtures of illicit drugs, adulterants, and diluents.

MagLev was used to separate, and to measure the density and abundance of, compounds in mixtures of powdered illicit drugs (e.g., fentanyl, heroin, cocaine, and methamphetamine hydrochlorides), together with adulterants and diluents. This analysis focused on the psychoactive components in these mixtures of drugs (i.e., the "active" compounds). Fentanyl and its analogs were of particular interest, for which MagLev was used as a technique that both provides presumptive (i.e., tentative) identification of the compounds (based on density) and facilitates subsequent identification by other techniques. Combining MagLev (to separate mixtures, and to allow presumptive identification) and molecular spectroscopy (using whichever technique is most appropriate) for molecular identification provided a method of confirming the identity of drugs in mixtures (see FIGS. 1A-C and FIGS. 11A-B). These methods were particularly useful when analytical methods must be rapid and simple (e.g., in screening at forensic laboratories, and in the field) and the active compound is dilute (0.1-5.0 wt %), as is often the case for fentanyl and its analogs in street-level drugs. In some embodiments, dilution of powders is defined as the process of mixing one or more powders with each other to achieve a reduction of the relative content of one or more compounds (and, consequently, to increase the volume of the drug-containing mixture to facilitate handling). The type of MagLev device used in some embodiments is shown in FIG. 2A.

Figure 10A:
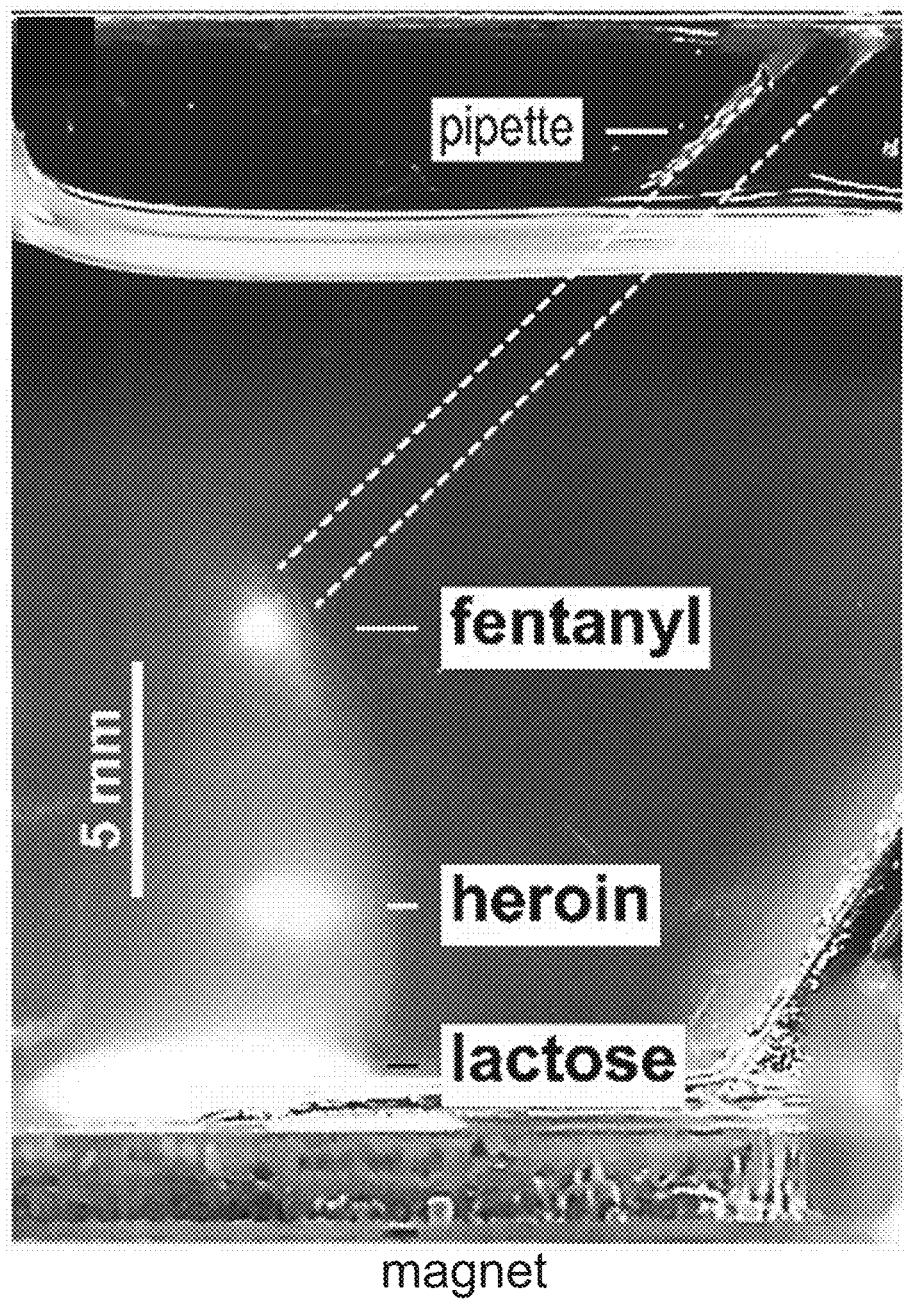
FIG. 10A shows an image taken after 30 minutes of separation by MagLev of a powdered mixture of fentanyl-containing heroin, according to one or more embodiments.
Figure 10B:
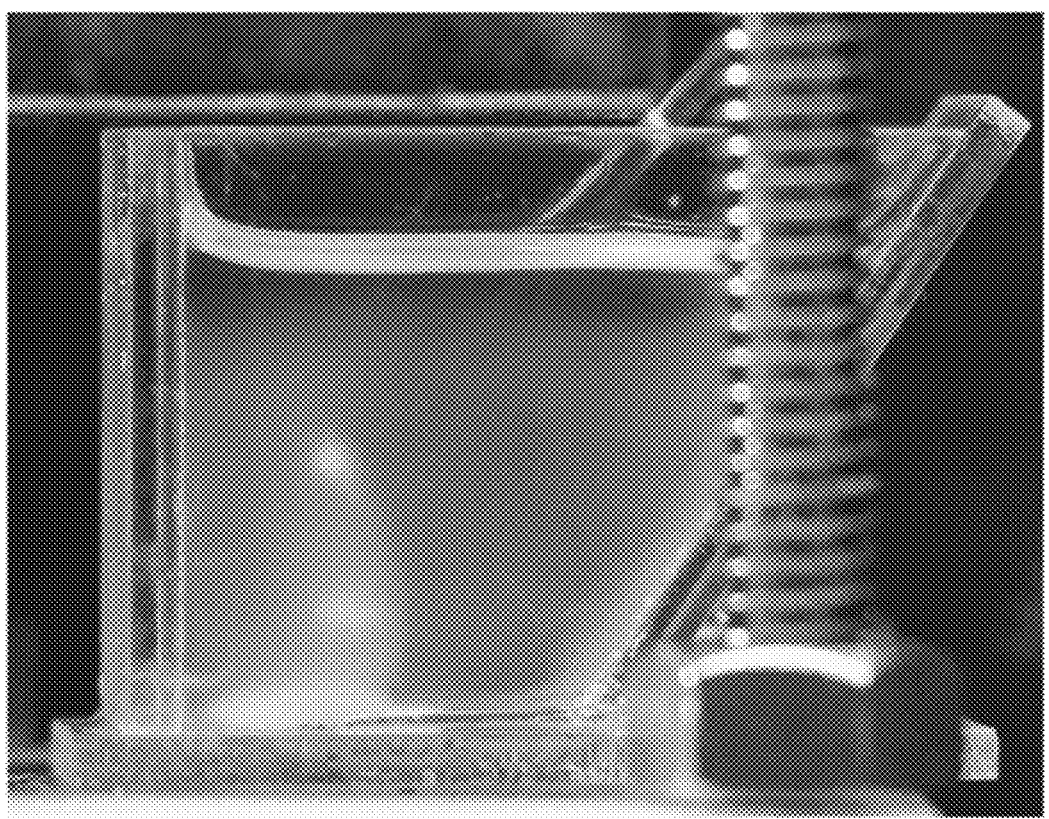
FIG. 10B shows the unprocessed image of FIG. 10A, according to one or more embodiments.
Figure 10C:
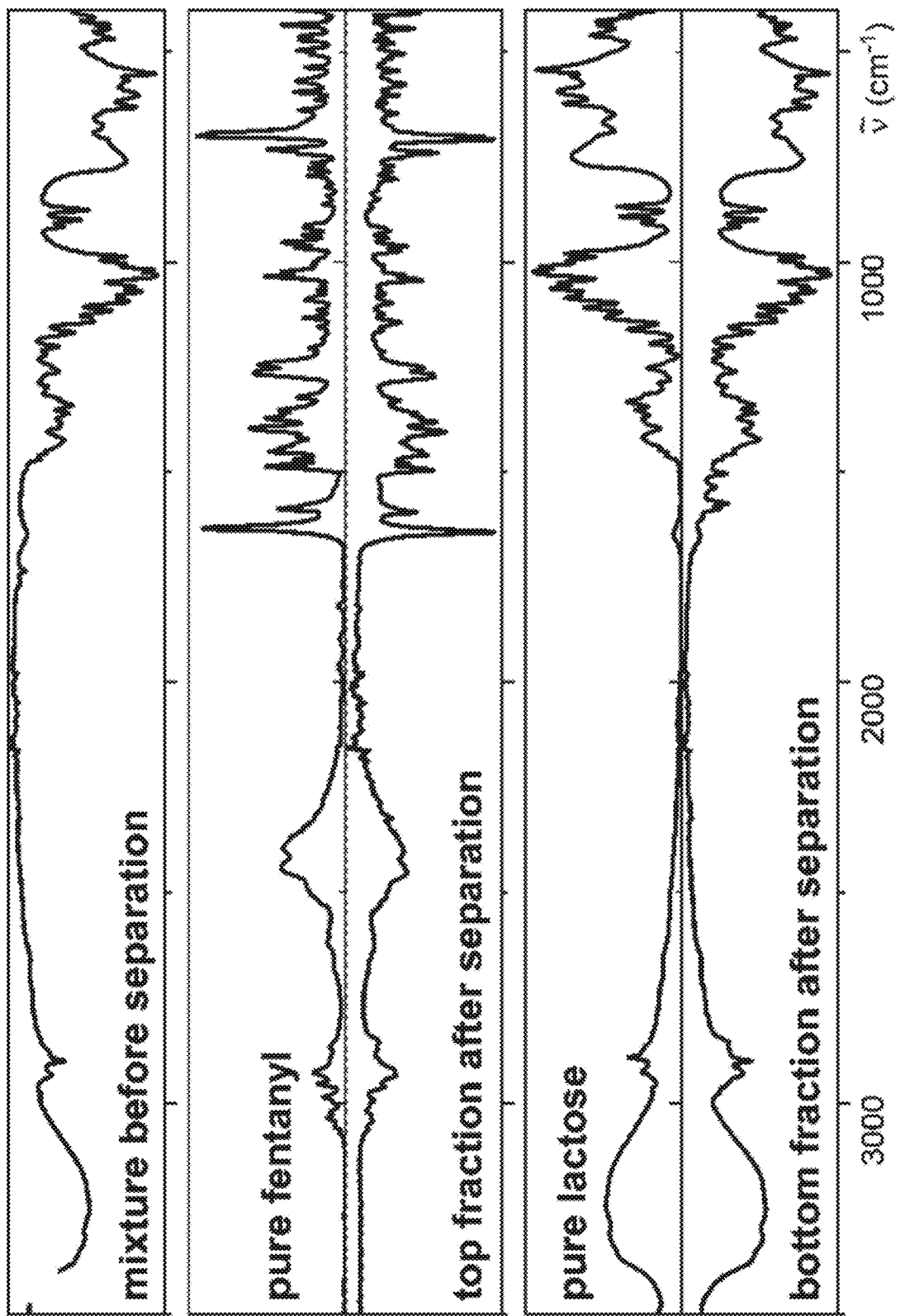
FIG. 10C shows FTIR-ATR spectra measured for the powdered mixture of FIG. 10A pre- and post-separation, according to one or more embodiments.

FIG. 10A shows successful separation, presumptive identification, and confirmatory identification of dilute fentanyl, in a mixture of heroin and a diluent (lactose), according to some embodiments. An image was taken after 30 minutes of separation by MagLev of a powdered mixture of fentanyl-containing heroin (fentanyl·HCl (1.3 wt %), heroin HCl (2.6 wt %), and α-lactose (96.1 wt %)). The separation was performed in a custom-made cuvette (shaped to allow easy entry of a pipette) filled with a paramagnetic solution of Gd(DPM)$_3$TOPO (450 mM) in a mixture of 23 vol % hexane and 77 vol % tetrachloroethylene. The image was uniformly post-processed for contrast and clarity; the original image is shown in FIG. 10B. To generate FIG. 10C, the separated fractions were extracted using a Pasteur pipette, and were subsequently rinsed with hexane under suction filtration to remove any remaining gadolinium complex and air-dried. FIG. 10C shows FTIR-ATR spectra (normalized to the highest peak) measured from the powdered mixture before separation (top spectrum). The extracted fractions containing fentanyl and lactose (third and fifth spectra from the top, respectively), and the pure compounds (second and fourth spectra from the top, respectively) are also shown in FIG. 10C.

Figure 11A:
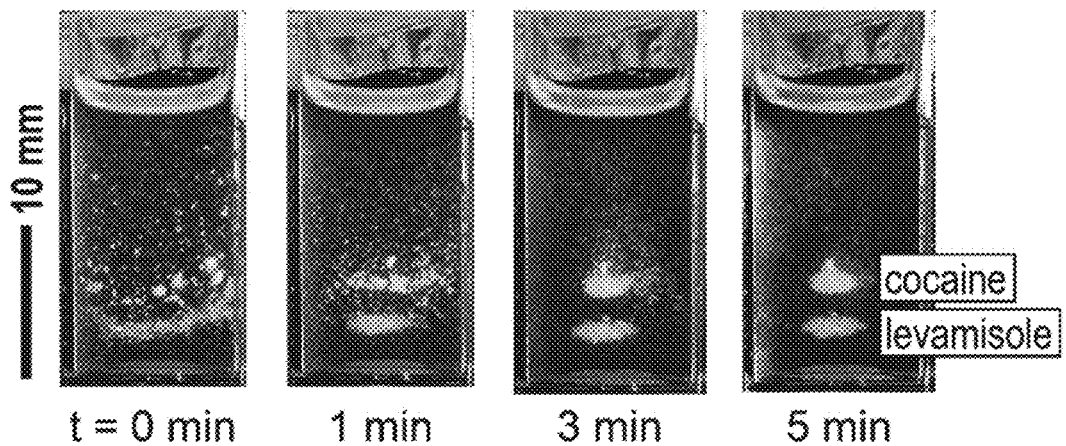
FIG. 11A shows time-lapse photographs of the separation of mixtures of powdered illicit drugs, adulterants, and dilutants using MagLev, according to one or more embodiments.
Figure 11A:
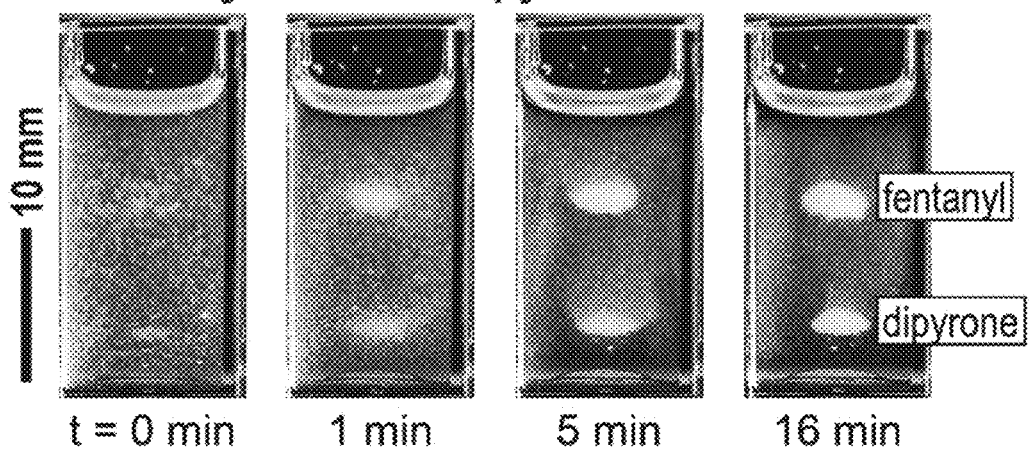
Figure 11A:
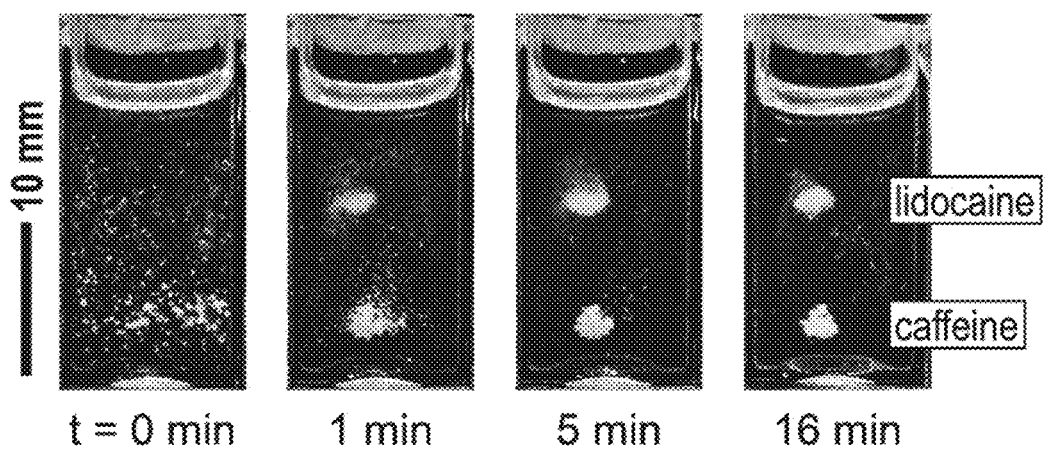
Figure 11A:
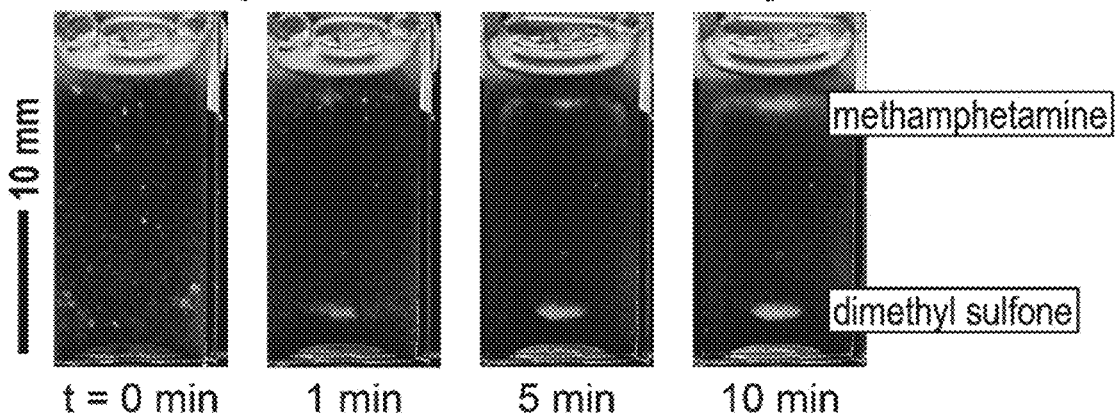
Figure 11A:
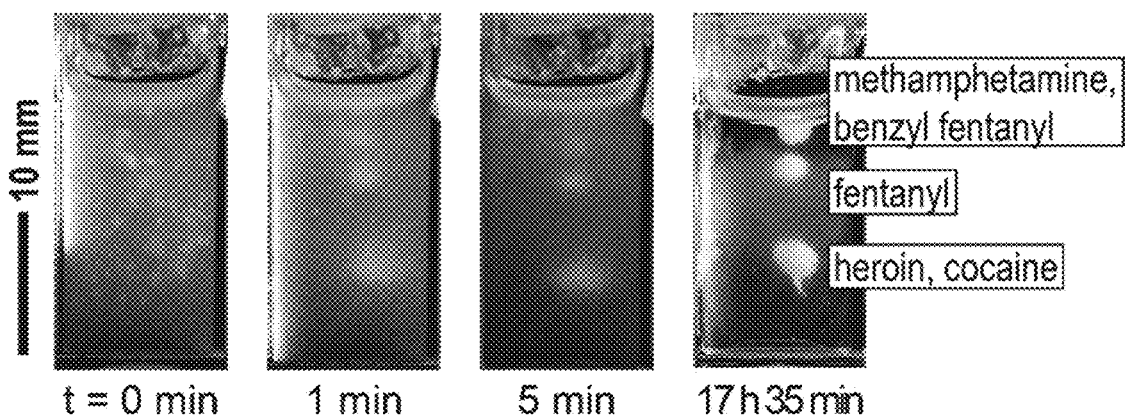
Figure 11B:
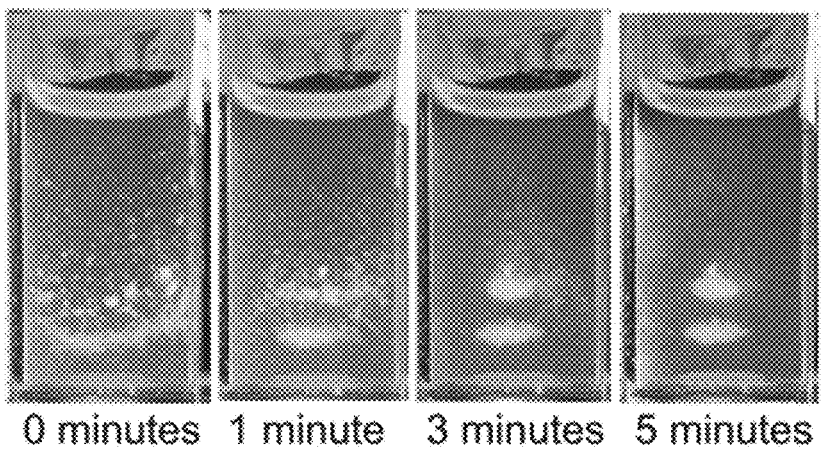
FIG. 11B shows the unprocessed images of FIG. 11A, according to one or more embodiments.
Figure 11B:
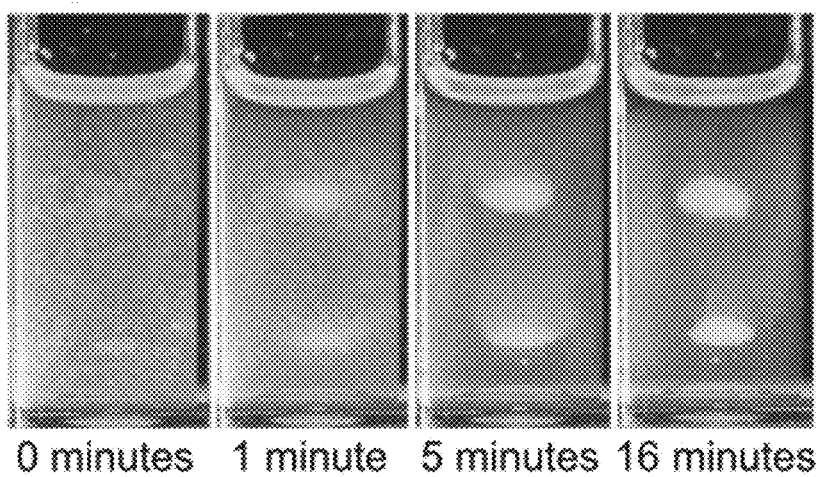
Figure 11B:
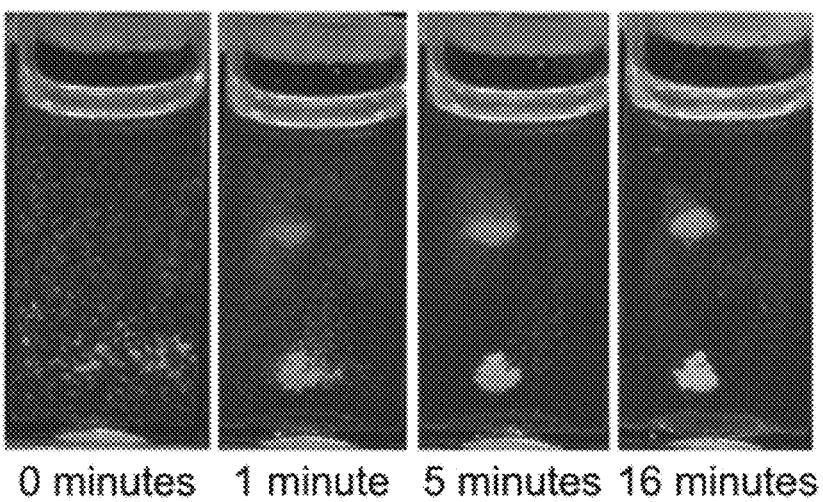
Figure 11B:
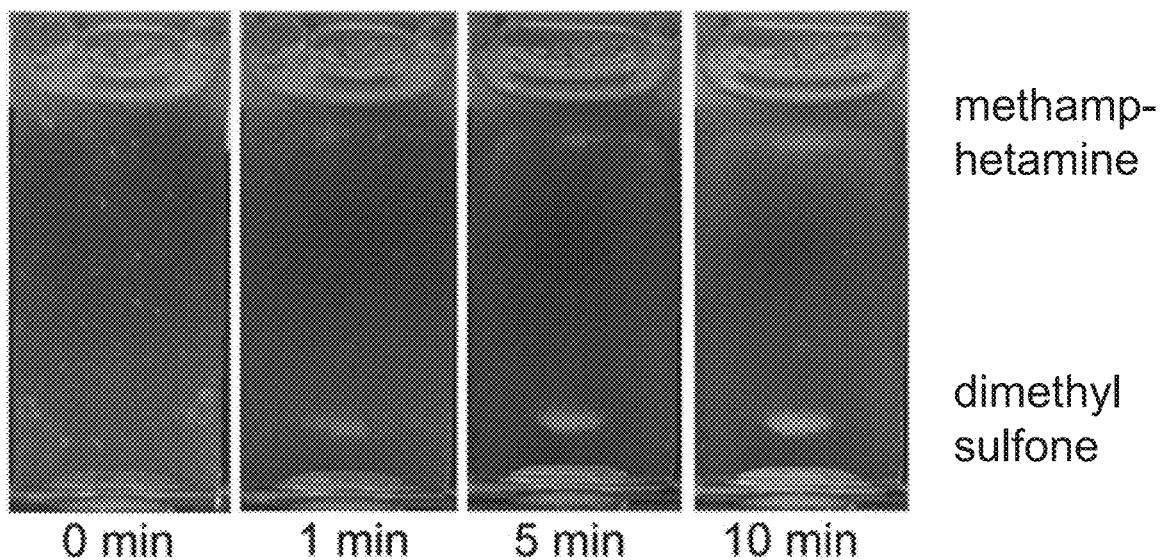
Figure 11B:
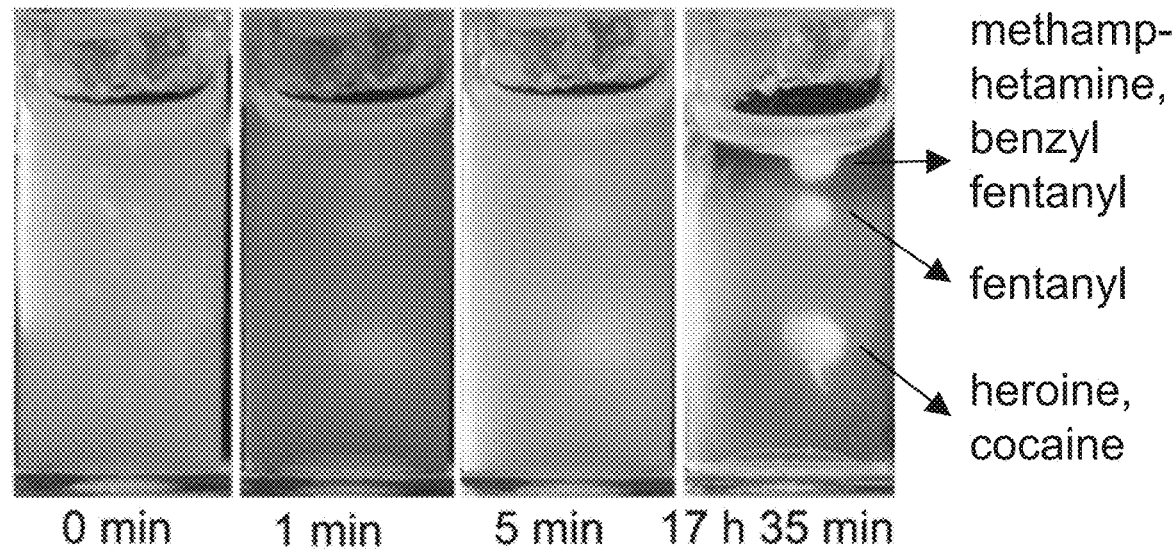

FIG. 11A shows time-lapse photographs of the separation of mixtures of powdered illicit drugs, adulterants, and dilutants (2.5-9.5 mg of each compound) using MagLev. The paramagnetic solution used in the device was Gd(DPM)$_3$TOPO (450 mM) dissolved in a mixture of 23 vol % hexane and 77 vol % tetrachloroethylene. Photographs were uniformly post-processed for contrast and clarity; the original images are shown in FIG. 11B.

MagLev was used to separate dilute (1.0-2.6 wt %) compounds from powdered mixtures, including: (i) 1.3 wt % fentanyl-HCl, 2.6 wt % heroin-HCl, and 96.1 wt % α-lactose (see FIGS. 10A-C and FIG. 9); (ii) 1.0 wt % lidocaine·HCl and 99.0% caffeine (see FIG. 12B); and (iii) 99.0 wt % lidocaine·HCl and 1.0 wt % caffeine (see FIG. 12B). In some embodiments, FTIR-ATR could not detect the presence of fentanyl-HCl in the first mixture before separation of the mixture, but it provided clear confirmatory identification of fentanyl-HCl in the fraction having the expected density (as compared to pure fentanyl) for fentanyl-HCl after separation (see FIG. 10B). In some embodiments, the lower limit in weight percent for a component of mixture that can be separated by MagLev was below 1 wt % (see FIG. 12B).

Figure 12A:
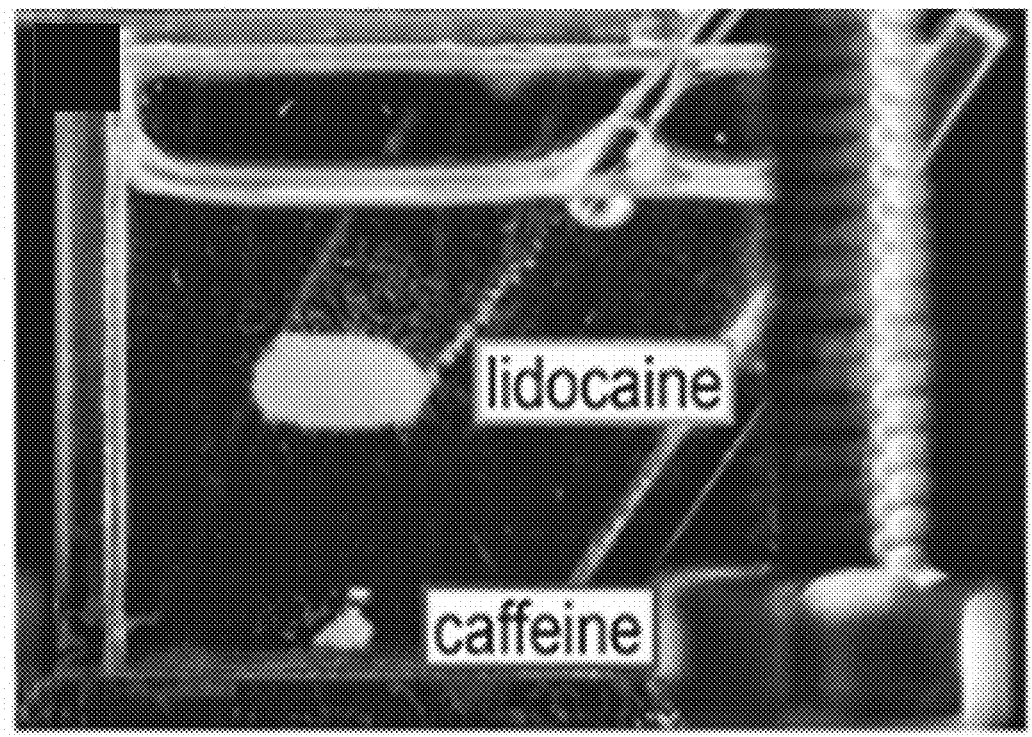
FIG. 12A shows MagLev separation of a mixture of lidocaine·HCl and caffeine, according to one or more embodiments.
Figure 12B:
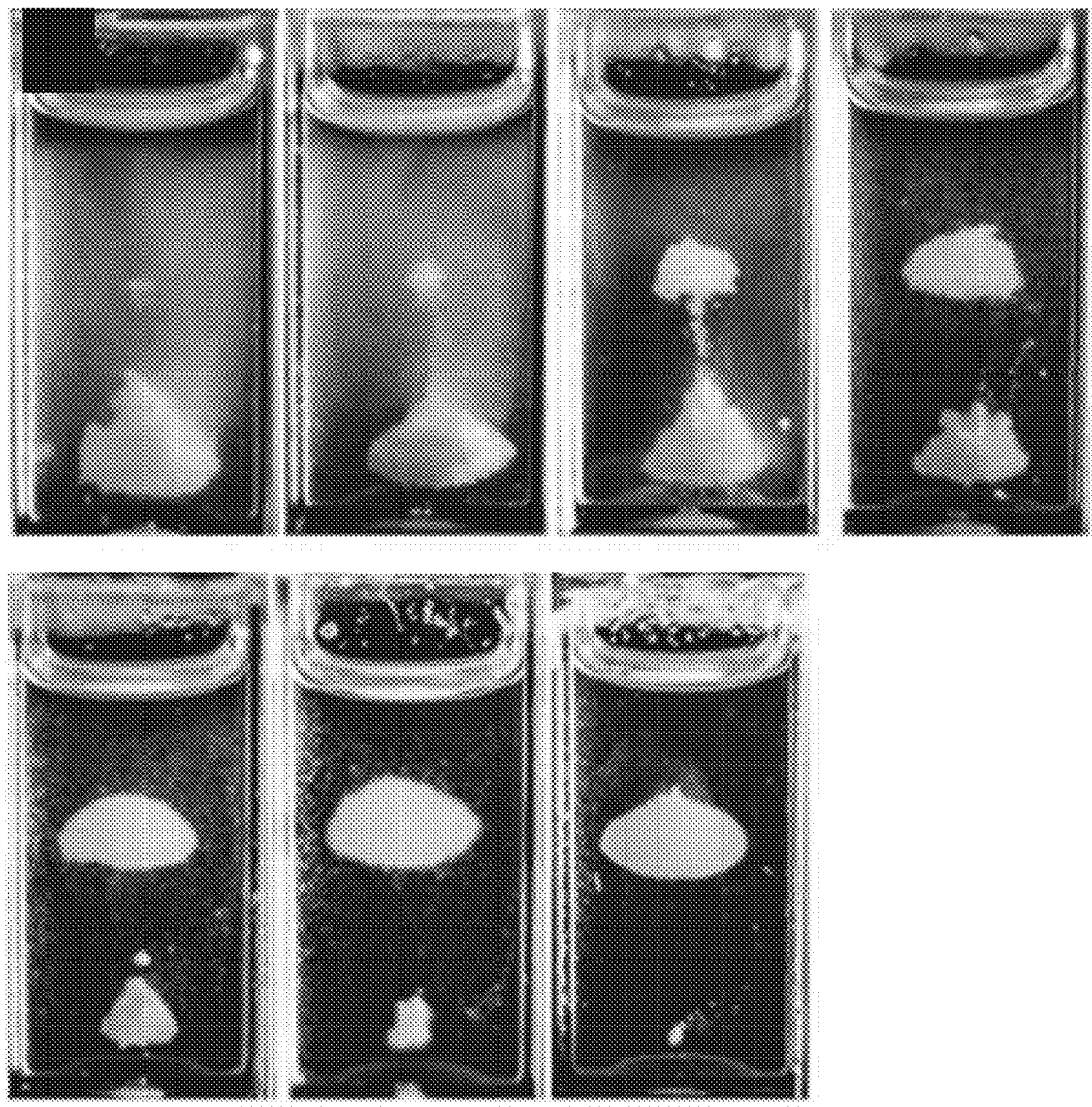
FIG. 12B shows MagLev separation of powdered mixtures of lidocaine·HCl and caffeine in different proportions, according to one or more embodiments.

The separation of lidocaine·HCl from caffeine (see FIGS. 12A-G)-demonstrated herein as model constructed from easily accessible, low-risk, but relevant adulterants demonstrated that MagLev can facilitate identification of dilute compounds in powdered mixtures by separating these fractions (in some embodiments, as few as five 100-200 μm crystals, approximately 0.1 mg) from other compounds in 50 mg samples consisting of hundreds to thousands of particles of other compounds (see FIG. 12B).

This model system facilitated the development of MagLev for uses with powdered mixtures of illicit drugs, and also for the investigation of the dynamics of separation of particulates in a MagLev device. MagLev separated the binary mixtures of lidocaine·HCl and caffeine of seven different compositions into two fractions, and the amount of compounds in each fraction (quantified by image analysis, see FIG. 12D) agreed quantitatively with the known compositions of the samples. The size of the crystals influenced the kinetics of separations: both compounds consisted of rod-shaped crystals (length of crystals (see FIG. 12C): a) lidocaine—minimum 20 μm; quartile 1st 61 μm, 2nd 92 μm, and 3rd 135 μm; maximum 292 μm; b) caffeine—minimum 4 μm; quartile 1st 12 μm, 2nd 18 μm, and 3rd 28 μm; maximum 89 μm; n=200). Caffeine, however, was present mostly as large aggregates (500-2000 μm, by visual estimation from FIG. 12B) that consisted of small crystals.

MagLev separated crystals of both compounds within approximately 20 minutes, but some non-aggregated (small) particulates of caffeine remained suspended after this period (observed as less transparent paramagnetic solutions in samples of high (≥75 wt %) caffeine content), due to the high ratio of drag-to-magnetic-force for small particles. The time of separation of the illicit drugs (see FIG. 11A) were comparable to that of caffeine or lidocaine, indicating that the particle sizes found in the powders of the illicit drugs are of a similar range.

Following separation using MagLev, the fractions were extracted and characterized by NMR (see FIG. 3E) and FTIR-ATR (see FIG. 3F). The close match of the spectra of the extracted fractions to the standards (pure compounds) suggested excellent separation of crystals of these two compounds using MagLev. The separation was near complete; residual crystals due to incomplete separation may still be present in the fractions, but were at or below the limit-of-detection of either spectroscopic method. The separation with MagLev also enabled unambiguous identification of caffeine with FTIR-ATR—this compound could not be identified in the mixture before separation (see FIG. 3F).

Figure 12C:
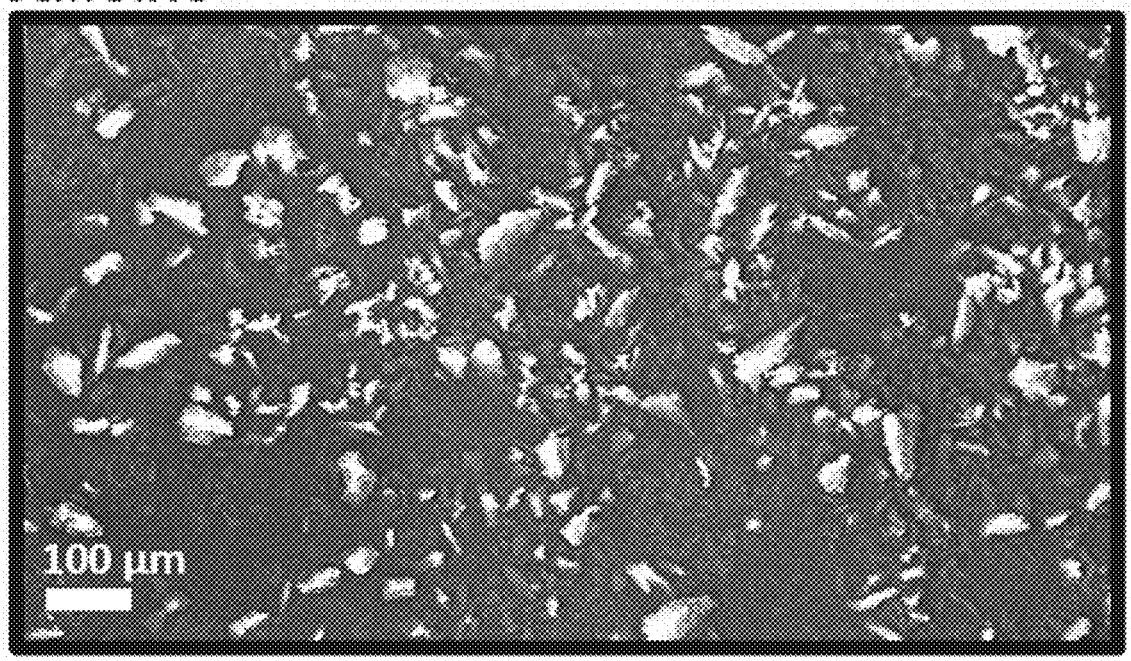
FIG. 12C shows scanning electron micrographs of crystals of pure lidocaine·HCl and caffeine, according to one or more embodiments.
Figure 12C:
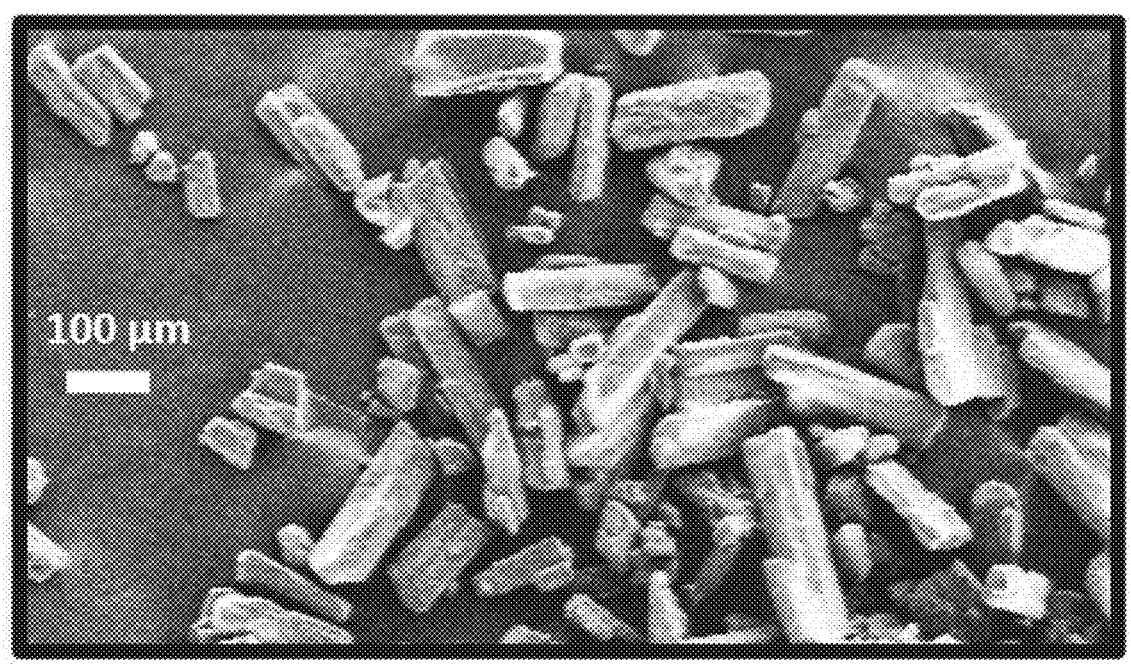
Figure 12D:
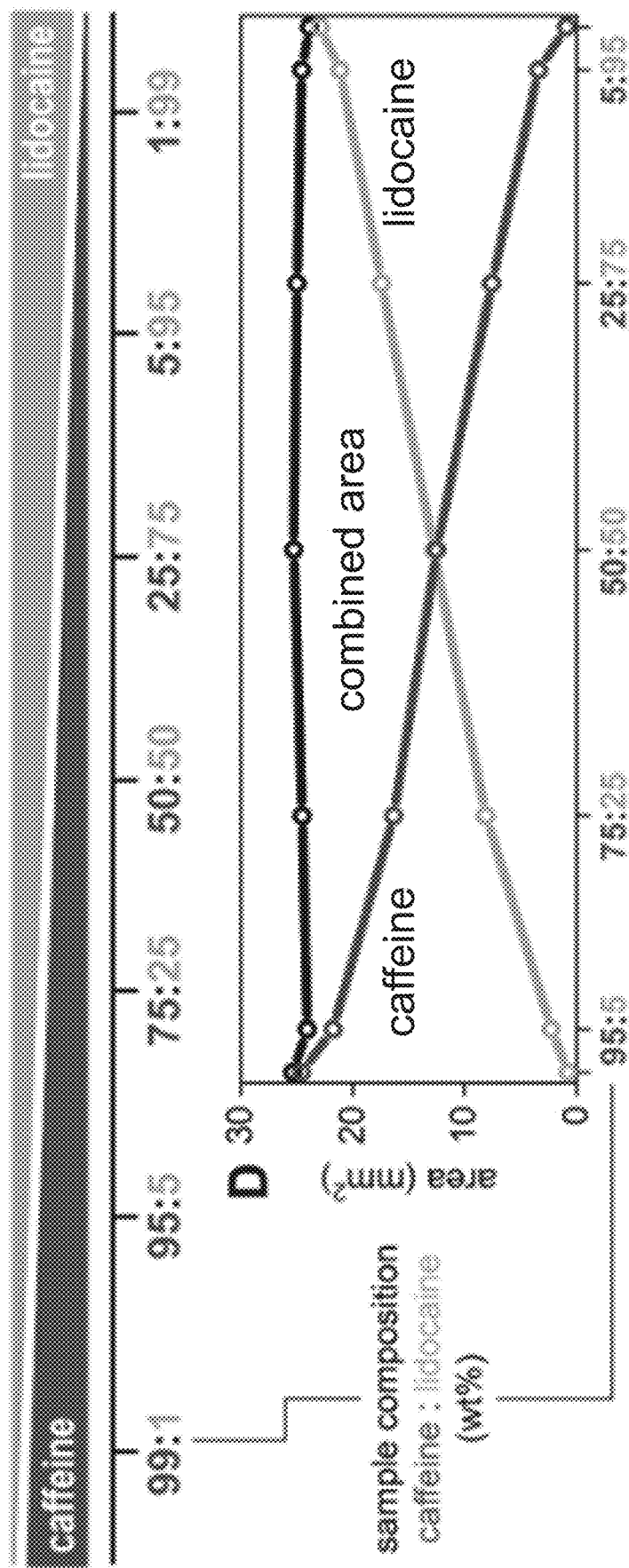
FIG. 12D shows the projected, two-dimensional areas of the levitating fractions of lidocaine·HCl and caffeine, and their combined area, plotted against the chemical composition of the mixtures, according to one or more embodiments.
Figure 12E:
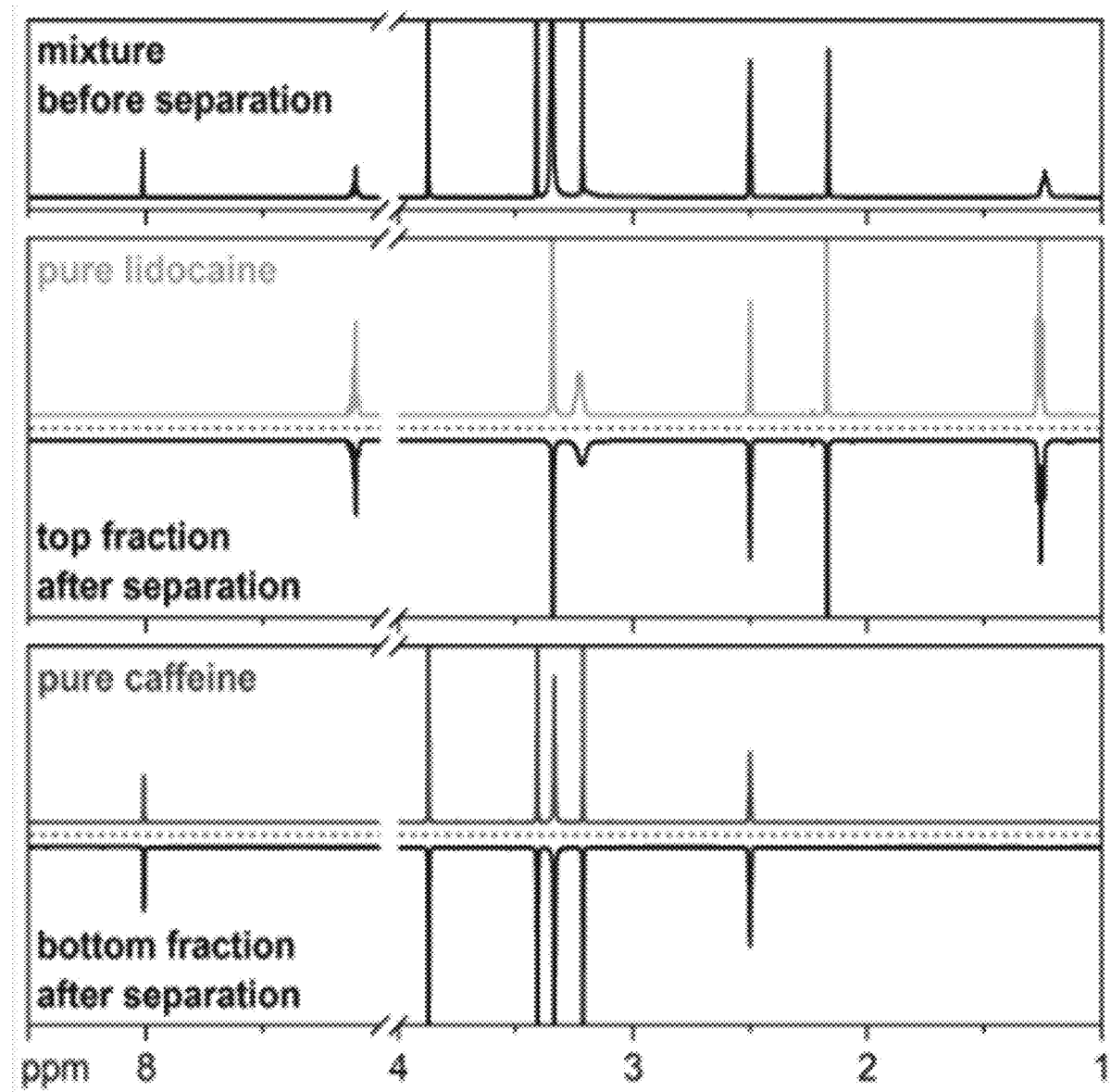
FIG. 12E shows $^1H$ NMR characterization of a mixture of lidocaine·HCl and caffeine, and the fractions after separation using MagLev, according to one or more embodiments.
Figure 12F:
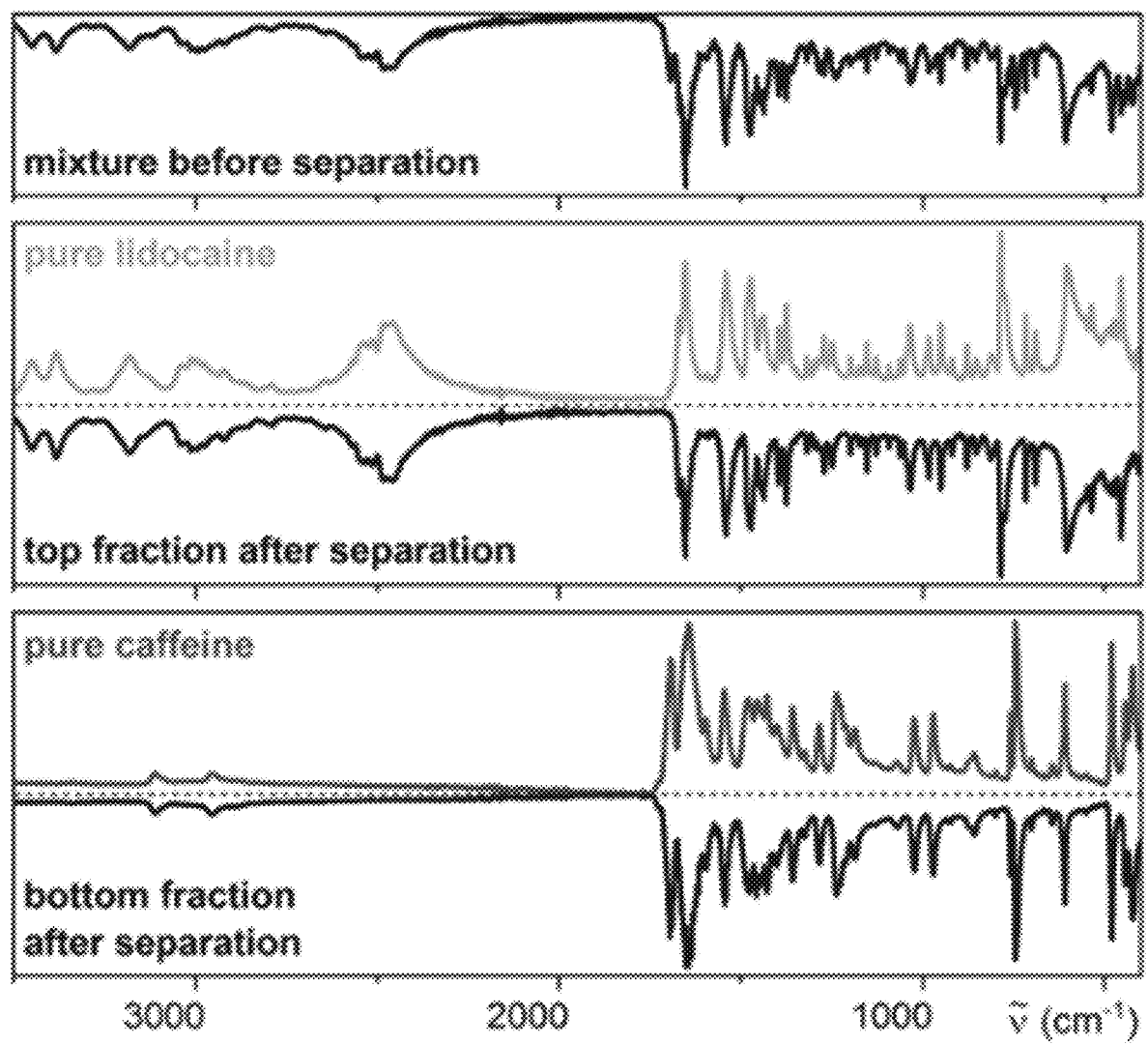
FIG. 12F shows FTIR-ATR characterization of the samples purified in FIG. 12E, according to one or more embodiments.
Figure 12G:
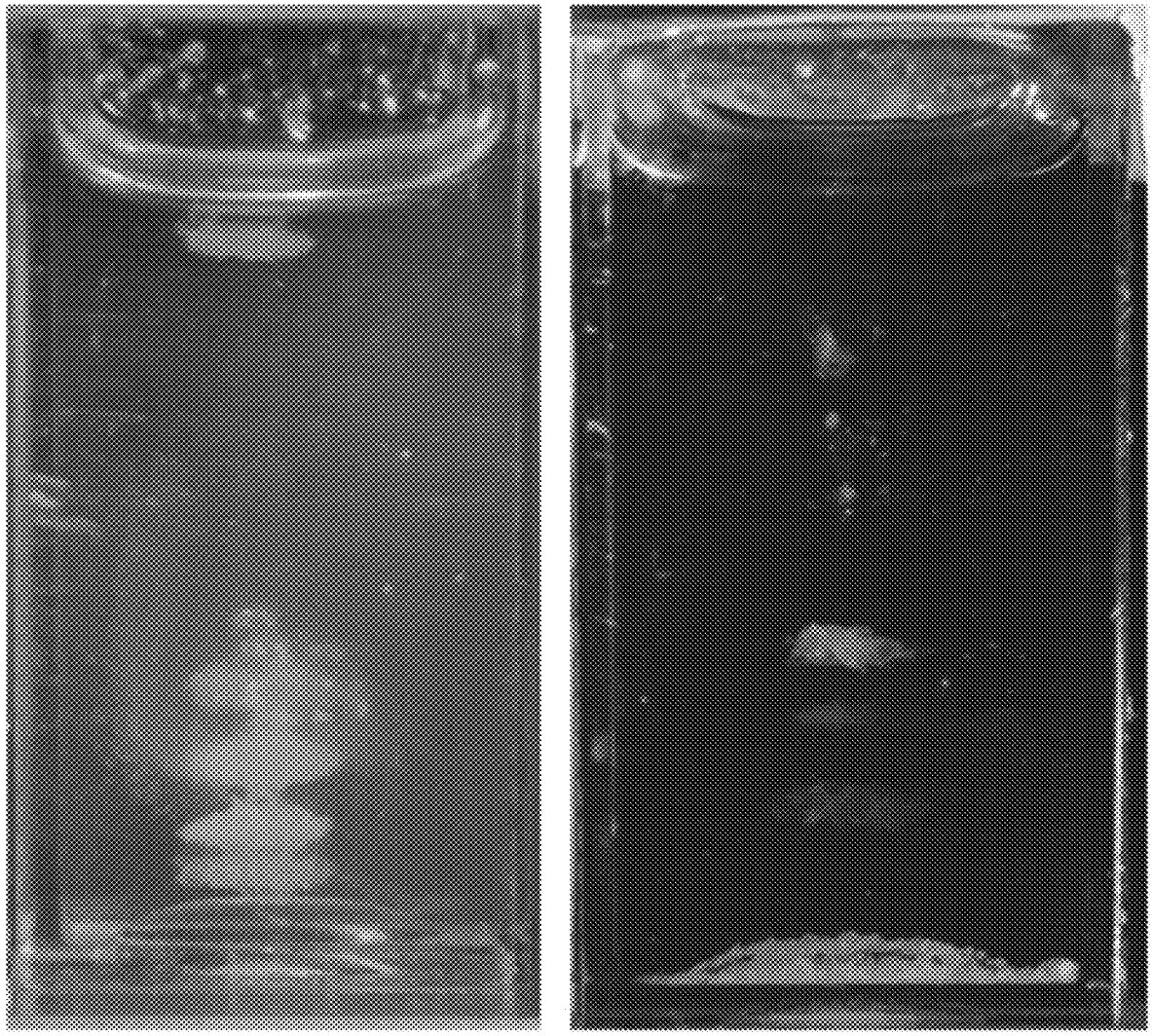
FIG. 12G shows unprocessed images of FIG. 12B, according to one or more embodiments.

FIGS. 12A-G show a model system for the investigation of MagLev separation of powdered mixtures and the following characterization with spectroscopic techniques, according to some embodiments. FIG. 12A shows MagLev separation (30 minutes) of a mixture of lidocaine·HCl and caffeine (95:5 wt %; 50 mg) in a cuvette filled with the paramagnetic solution, and extraction using a Pasteur pipette, according to some embodiments. FIG. 12B shows MagLev separation (20 minutes) of powdered mixtures (50 mg) of lidocaine·HCl (top clouds) and caffeine (bottom clouds) in different proportions (wt %), according to some embodiments. The paramagnetic solution in FIGS. 12A-B consisted of Gd(DPM)$_3$TOPO (450 mM) dissolved in a solvent mixture of 23 vol % hexane and 77 vol % tetrachloroethylene. Height of cuvettes: 25 mm. FIG. 12C shows scanning electron micrographs of crystals of lidocaine·HCl and caffeine (pure compounds), according to some embodiments. FIG. 12D shows the projected, two-dimensional areas of the levitating fractions of lidocaine·HCl and caffeine, and their combined area, plotted against the chemical composition of mixtures, according to some embodiments. The area was measured in images with a physical ruler for reference of distance with the software ImageJ. FIG. 12E shows $^1$H-NMR (600 MHz) characterization of a mixture (50 mg) of lidocaine·HCl and caffeine (50:50 wt %) and the fractions after separation (30 minutes) in the MagLev, according to some embodiments. The individual fractions were extracted as in FIG. 3A and rinsed with hexane during suction filtration and air-dried on a filter paper. Part of the residue (3.0 mg) was dissolved in DMSO-d$_6$ (0.6 mL)—no lidocaine was detected with $^1$H NMR in the caffeine-rich fraction, and no caffeine in the lidocaine·HCl-rich fraction. Signals from the solvent, DMSO, (at 2.5 ppm) and water (at 3.3 ppm) were present. FIG. 12F shows FTIR-ATR characterization (normalized to highest peak) of the samples purified in FIG. 12E except that the residue was characterized as a dry powder. Pure compounds were used as controls for both the $^1$H NMR and FTIR-ATR characterization. The photographs in FIGS. 12A-B were uniformly post-processed to enhance contrast and clarity; FIG. 12G shows the originals.

MagLev was used to measure the densities of 23 compounds (6 active compounds, 10 representative adulterants, and 9 diluents) found in mixtures of powdered drugs (see FIGS. 10A-10C, FIGS. 11A-B, FIG. 13, and Table 6). Most compounds reached their equilibrium positions in the MagLev device in 5-30 minutes (see FIG. 11A and FIG. 13), depending on the size of the grains or crystals.

Figure 13:
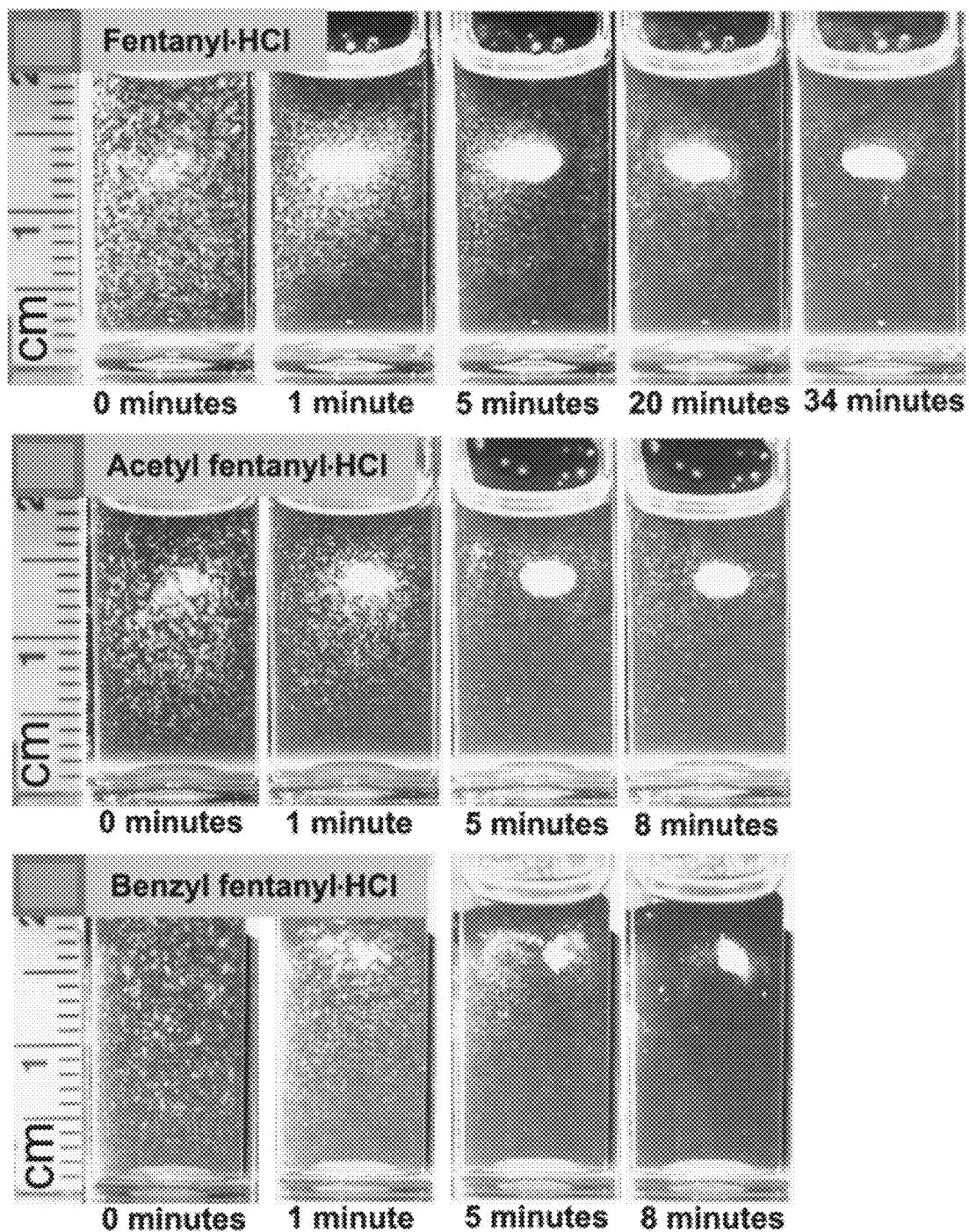
FIG. 13 shows time-lapse photography of individual drugs levitating in a MagLev device, according to one or more embodiments.
Figure 13:
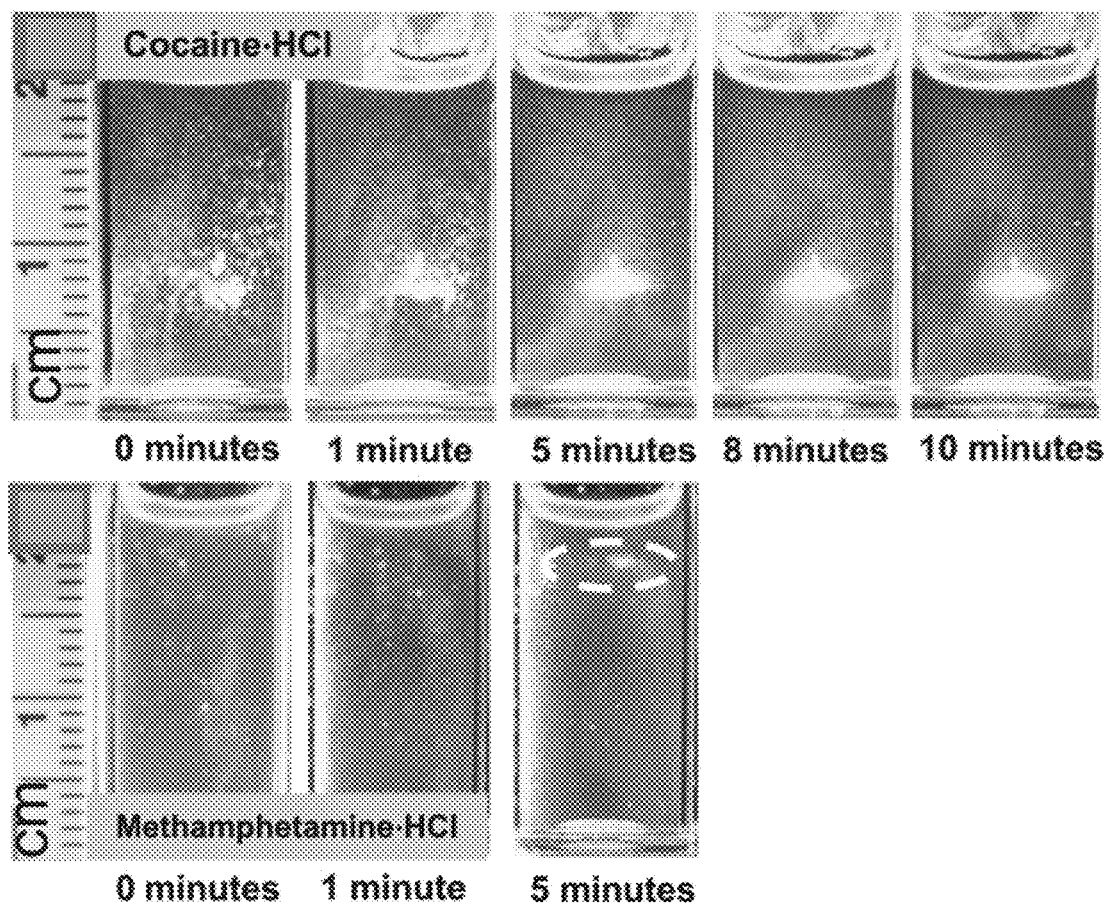

FIG. 13 shows time-lapse photography of individual drugs (2-9 mg of powder) levitating in a MagLev device, according to some embodiments. The paramagnetic solution consisted of Gd(DPM)$_3$TOPO (450 mM) dissolved in a mixture of 23 vol % hexane and 77 vol % tetrachloroethylene. The white dashed circle in the lower right image highlights the area where methamphetamine-HCl equilibrated in the MagLev. The images were uniformly post-processed for contrast and clarity.

In some embodiments, MagLev are performed on suspended objects or particles. Most illicit drugs, adulterants, and diluents are readily water-soluble (with the notable exceptions of cocaine, phencyclidine, and heroin in their free-base forms). Thus, in some embodiments, their separation and analysis with MagLev requires non-polar paramagnetic solutions to suspend and levitate them. Few existing paramagnetic chelates are soluble at high concentration in non-polar solvents, while still maintaining a low viscosity of the solution. Therefore, in some embodiments, mixtures of hexane ($\rho$=0.66 g cm$^{-3}$) and tetrachloroethylene ($\rho$=1.62 g cm$^{-3}$) were used as the solvent for the gadolinium(III) chelate complexes, because mixtures of these solvents spanned the range of densities useful for analysis of powdered drugs, and had suitable characteristics (e.g., low polarity, appropriate density, low viscosity, and toxicity). None of the compounds (illicit drugs, adulterants, or diluents) investigated in these Examples (see Table 3) dissolved in the non-polar paramagnetic solutions used, as judged by eye (see FIG. 10A, FIG. 11A, FIGS. 12A-G, and FIG. 13).

Using MagLev, it was possible to carry out presumptive identification of multiple compounds simultaneously (see FIG. 4), and, thus, to increase the likelihood of a correct identification of the components (using a lookup table of known densities for reference) in samples, because certain combinations of drugs and/or adulterants are more common than others. For example, methamphetamine is commonly found in binary powdered mixtures with dimethyl sulfone.

FIG. 4 shows separations of powdered mixtures (50-60 mg) of adulterants and diluents using MagLev, according to some embodiments. The left image shows lidocaine·HCl, dimethyl sulfone, potato starch, D-(+)-glucose, and β-D-(−)-fructose in a solution of Gd(DPM)$_3$TOPO (450 mM) dissolved in tetrachloroethylene. The right image shows hydroxyzine·2HCl, acetaminophen, diltiazem·HCl, levamisole·HCl, D-mannitol, sucrose, and sodium carbonate (at bottom) separated in a paramagnetic solution of Gd(acac)$_3$ TOPO (1100 mM) in tetrachloroethylene. Table 6 lists the densities of the levitating compounds, according to some embodiments. Photographs were uniformly post-processed for contrast and clarity.

For powdered mixtures of illicit drugs, in some embodiments, a mixture of 5-12 compounds in one sample is not uncommon.

Figure 14:
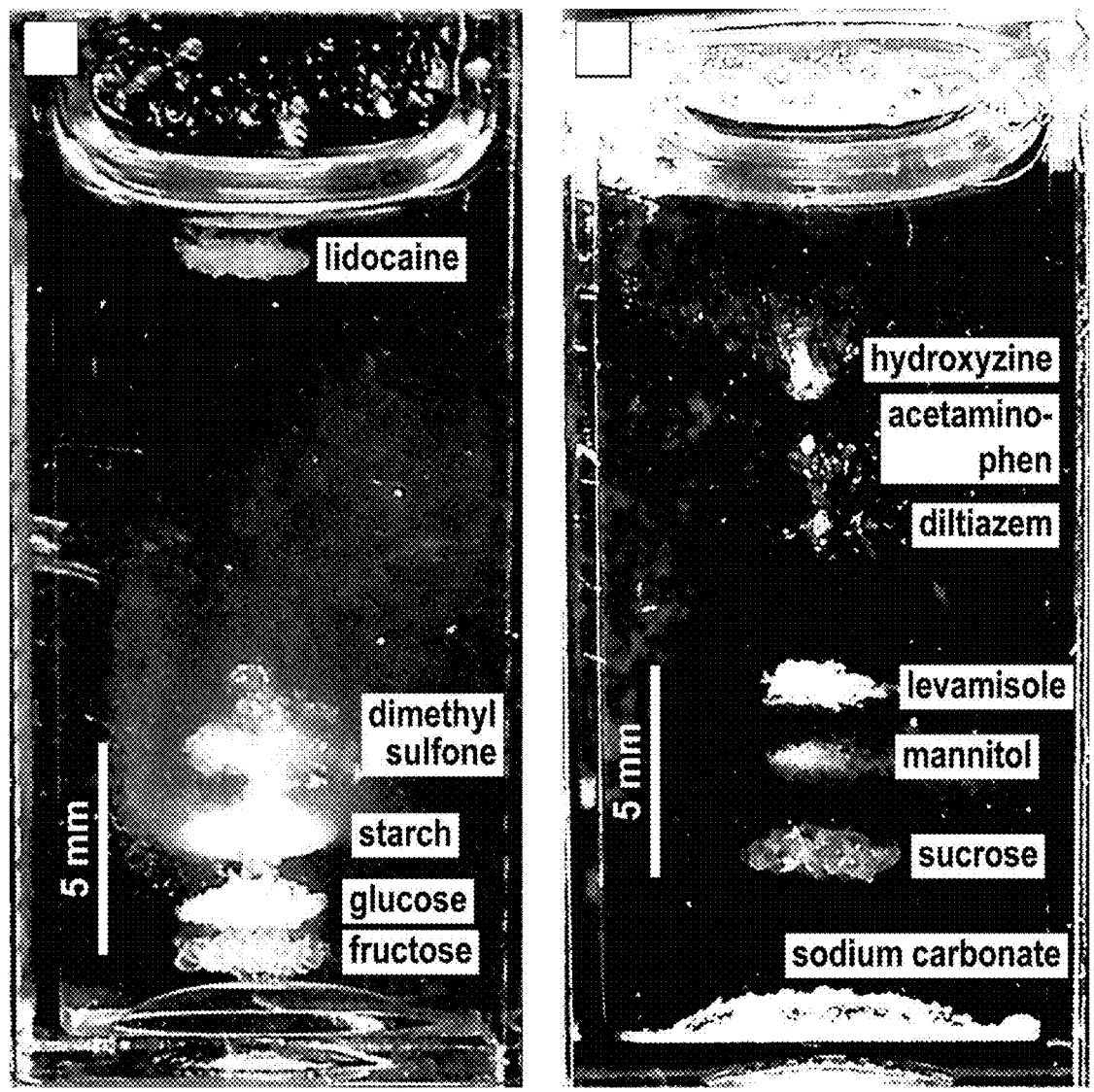
FIG. 14 shows separations of powdered mixtures of adulterants and diluents using MagLev, according to one or more embodiments.

FIG. 14, right image, demonstrates application of MagLev in the simultaneous separation of seven different adulterants and diluents from a powdered mixture, according to some embodiments. Most compounds in powdered mixtures of illicit drugs have densities in the range of 1.10-1.58 g cm$^{-3}$ (see Table 6). The procedure for MagLev used in these Examples can measure a larger range of density (e.g., 0.60-1.77 g cm$^{-3}$; see FIGS. 7A-C).

The densities of compounds determined by MagLev largely agreed with values reported in the literature (see Table 6), which were measured by, for example, XRD and calculated from the dimensions and occupancy of the unit cells, or by gas pycnometry. The density measurements deviated from literature values by less than 20.2%. The largest differences were recorded for the hydrochlorides of methamphetamine (20.1%), levamisole (10.7%), procaine (6.0%), cocaine (5.6%), and diltiazem (4.8%). Without wishing to be bound by theory, these differences may be due to impurities or different forms of the drug present in samples (e.g., as hydrates, solvates, or carbonates, admixture with other compounds with similar density, particles that are partly amorphous instead of fully crystalline, crystals that included polymorphs, or other issues). Nonetheless, these differences in density were largely irrelevant for separations, as long as the compounds do separate. In some embodiments, the values of densities for relevant compounds can, however, be important for the presumptive identification of compounds that have not been previously separated by MagLev, and should be better established (both in pure samples, and as encountered in different mixtures of illicit drugs).

To minimize errors, for compounds that have been previously characterized and that have been documented in look-up tables, density-based presumptive identification with MagLev can be performed under the same set of conditions (e.g., type of MagLev device, type of paramagnetic chelate complex, and concentration of solution) used for previous characterizations.

In some embodiments, MagLev is simple to use and portable. It thus, in some embodiments, offers a new method for screening drugs outside of a well-equipped forensic laboratory (e.g., at crime scenes and law enforcement sites). Because, in some embodiments, separation by MagLev is rapid, it could shorten the time required for presumptive identification of illicit drugs at crime scenes. In some embodiments, complementary and more precise techniques could subsequently be used for confirmatory identification, because MagLev is non-destructive. In some embodiments, the synergy of MagLev with FTIR-ATR is attractive for analysis of drugs because both techniques are portable, require little training to use, and work well with powdered compounds. In some embodiments, the two are also complementary because MagLev compensates for the low sensitivity of FTIR-ATR in complex mixtures, by separating and concentrating fentanyl or other compounds of primary interest. In some embodiments, uses of MagLev in this type of application can be optimized in the laboratory using easily obtained compounds—e.g., lidocaine·HCl and caffeine—that are relevant to illicit mixtures of drugs, as components of model systems, and can thus avoid the often prohibitive regulations placed on the use of most active compounds (see Table 4).

In some embodiments, producers of illicit drugs make new analogs more quickly than these compounds can be "scheduled" as illegal compounds. Before a drug can be scheduled, multiple agencies must determine if it has a "strong index of suspicion." For example, for synthetic opioids, there must be a strong suspicion that the drug causes miosis, depressed respiration, changes in mental status, and additional signs of opioid toxicity. In some embodiments, a strength of MagLev is that the method is non-specific to the molecular structure or the biological activity; an additional, more structure-specific technique (e.g., FTIR or, Raman-spectroscopy, or mass-spectrometry) may be required to enable the assignment of new compounds to a class. In some embodiments, this characteristic also makes MagLev suitable for providing a rapid early warning of a new or unfamiliar compound whose density (and probably structure) varies only slightly from those of compounds of a previously known class of compounds (new analogs of fentanyl are an example); through separation, MagLev enables the molecular characterization of those compounds by other techniques. In some embodiments, MagLev could aid in the detection of new designer drugs, unconventional mixtures of drugs, fentanyl-laced drugs of inconsistent and unexpectedly high concentration, and harmful adulterants on the illegal market. Circumventing detection by MagLev would require additional and unfamiliar efforts on the part of providers of street drugs. In some embodiments, MagLev enables the characterization of dilute compounds in mixtures of powders using techniques that would otherwise not be able to identify the molecular structure of dilute compounds in mixtures of powders.

Example 17: Two Methods for Fingerprinting Powdered Mixtures of Drugs after Levitation with MagLev In some embodiments, MagLev separation coupled with time-lapse photography, image analysis, and machine learning (including signal processing techniques) provides a method to obtain unique "fingerprints" of mixtures of powdered drugs of prescription or illicit origin. The separation of drug particles from mixtures were performed in a cuvette filled with an apolar paramagnetic solution (such that the dissolution of hydrophilic compounds was avoided or significantly reduced) that is placed between two permanent magnets held in position by a frame. The individual components of the mixtures equilibrated (levitated) at their equivalent density (corresponding to a specific position between the magnets—a ruler was placed next to the cuvette for reference) in the density gradient generated between the magnets, forming levitating "clouds" of particles of a more or less spherical shape. The n-position was defined as the middle of the centroid of the levitating clouds. Three different methods were used to generate the fingerprints:

The first method of fingerprinting was based on the measurement of density and the amount of substance, and on modelling (see Method 1 below) the particle size distribution (taking into account the change in size of the clouds over time, the shape of the cuvette, and viscosity of the paramagnetic solution). This method relied on both the dynamic separation process (to determine characteristic particle sizes) and the final state of rest of the separated particles (to determine the density of the drugs).

The second method (see Method 2 below) of fingerprinting was based on time series classification using signal processing, and machine learning. A classification method that used supervised learning to create representations of each powdered mixture was employed. When a new series of measurements was obtained, the measurements were compared to the stored class representations to determine the maximum likelihood classification. In some embodiments, the classification procedure built on several component techniques from the field of signal processing, for example, dynamic time warping (DTW) and DTW barycenter averaging (DBA).

The third method (see Method 3 below) used machine learning, including deep neural networks, specifically, convolutional neural networks, for image classification.

In some embodiments, digital fingerprinting can be used to perform attribution, i.e., the process of finding the source of the powdered mixtures (e.g., illicit drugs), or the source of the components in the mixtures. To perform attribution with digital fingerprints, they are, in some embodiments, compared to other fingerprints in a database and the degree of similarity between the different fingerprints are estimated through different types of methods that compare different characteristics of the fingerprint. These methods, in some embodiments, can process and evaluate data about the types of drugs present, quantities of drugs relative to each other, and characteristic particle sizes of each drug. The fingerprints, in some embodiments, can be coupled to other types of data, such as time of seizure and location, enabling the tracking of similar types of fingerprints geographically and over time. This could, for example, be useful to track drug traffic networks to identify the batch, supplier, and, ultimately, the network of distribution channels in the drug trade. The methods described in this Example focus on the analysis of mixtures of powders that contain drugs. However, the method can be used on any powdered mixture (e.g., powdered chemicals, food products, or explosives).

Method 1

In some embodiments, an experiment generates a series of approximately 100 images, or more, in a time series from a DSLR camera to be processed and analyzed. Each image was processed by first cropping the region of interest (bounded by the lower and side walls of the cuvette and the fluid meniscus at the top), extracting the "intensity," i.e., the value channel in hue, saturation, value ("HSV") color space, calibrating the number of pixels to a linear distance based on a ruler included in the image, and recording the timestamp of the image. After this processing step, each image was an n-by-m matrix of intensity values with known linear spacing (meters) and known time of image capture, where n and m are the height and width of the cropped image in pixels, respectively.

Following the processing step, each processed image was analyzed to characterize the location of suspended particles, as indicated by pixels with high intensity values due to particles reflecting light. To perform this analysis, the lateral pixels (in the m-direction) were averaged over each row in the matrix representing the image to yield a single value for each vertical pixel location within the image, resulting in an n-by-1 matrix representing the average amount of particles stored at each vertical location (height above the bottom magnet) within the MagLev device (see FIG. 15 and FIG. 16). These values were calculated for each image and plotted at sequential points in time to visualize the distribution of particles over time within the device (see FIG. 16). The plots were further analyzed by fitting normal distributions to each of the peaks representing equilibrium-point clusters of particles (see FIG. 17). These normal distributions were fit directly to the n-by-1 matrix, and the mean intensities in the vertical direction of the MagLev device (described previously), using the fitdist function in MATLAB with the argument 'Normal'. From these distributions, the behavior of the peaks (e.g., vertical translation, sharpening) was quantified over time in terms of the mean value, $\mu$, and the full width at half maximum, FWHM, of each distribution (see FIG. 17).

Figure 15:
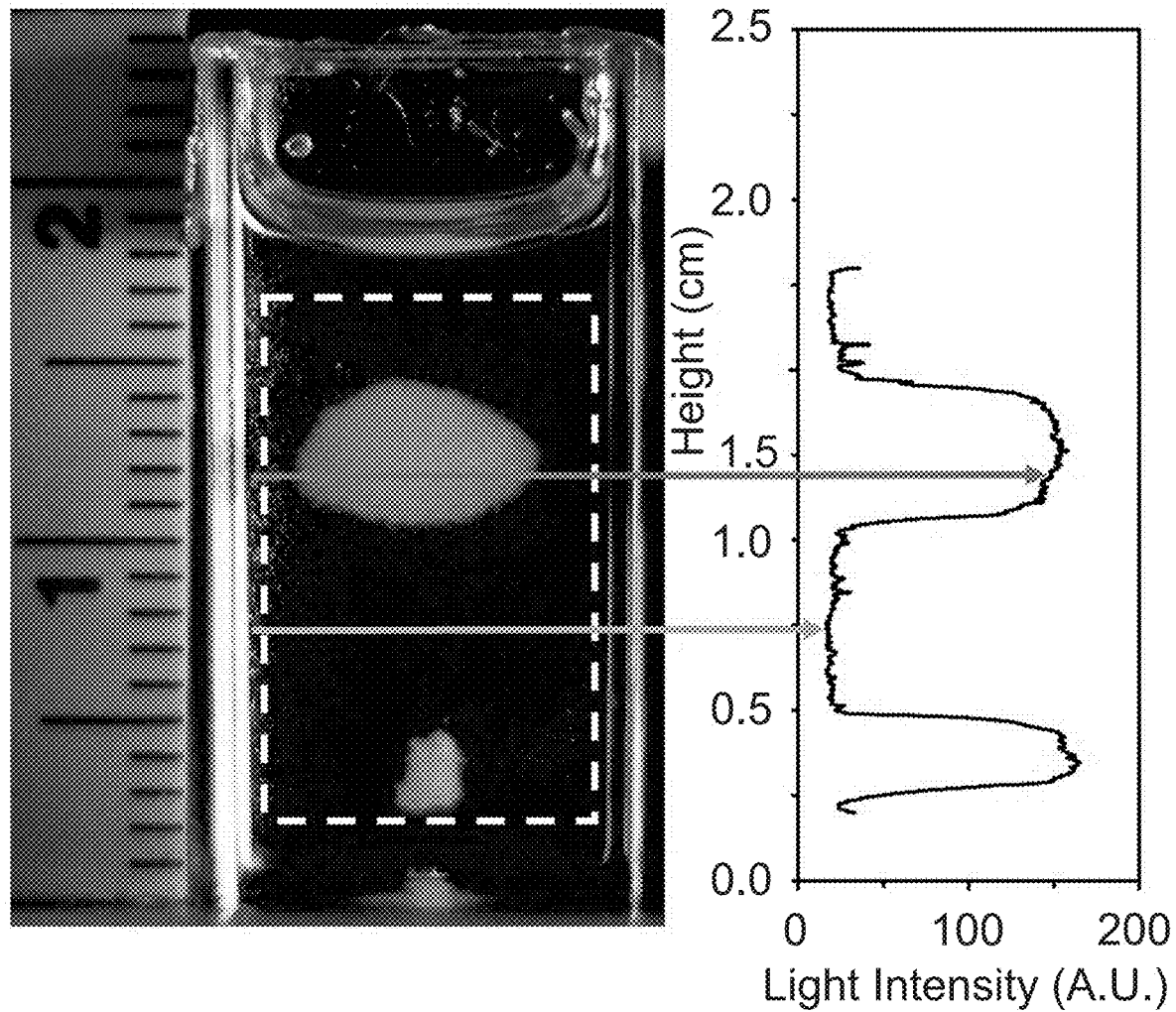
FIG. 15 shows image processing for determination of light intensity of image at different heights (n-direction) in the cuvette, according to one or more embodiments.

FIG. 15 shows image processing for determination of light intensity of image at different heights (n-direction) in the cuvette, according to some embodiments. The image shows the separation of lidocaine·HCl (47.5 mg) and caffeine (2.5 mg) that levitated in a paramagnetic solution (0.45 M Gd(DPM)$_3$TOPO dissolved in a mixture of 23 vol % hexane and 77 vol % of tetrachloroethylene) in a cuvette inside the MagLev device. The image was captured after 20 minutes of separation.

Figure 16:
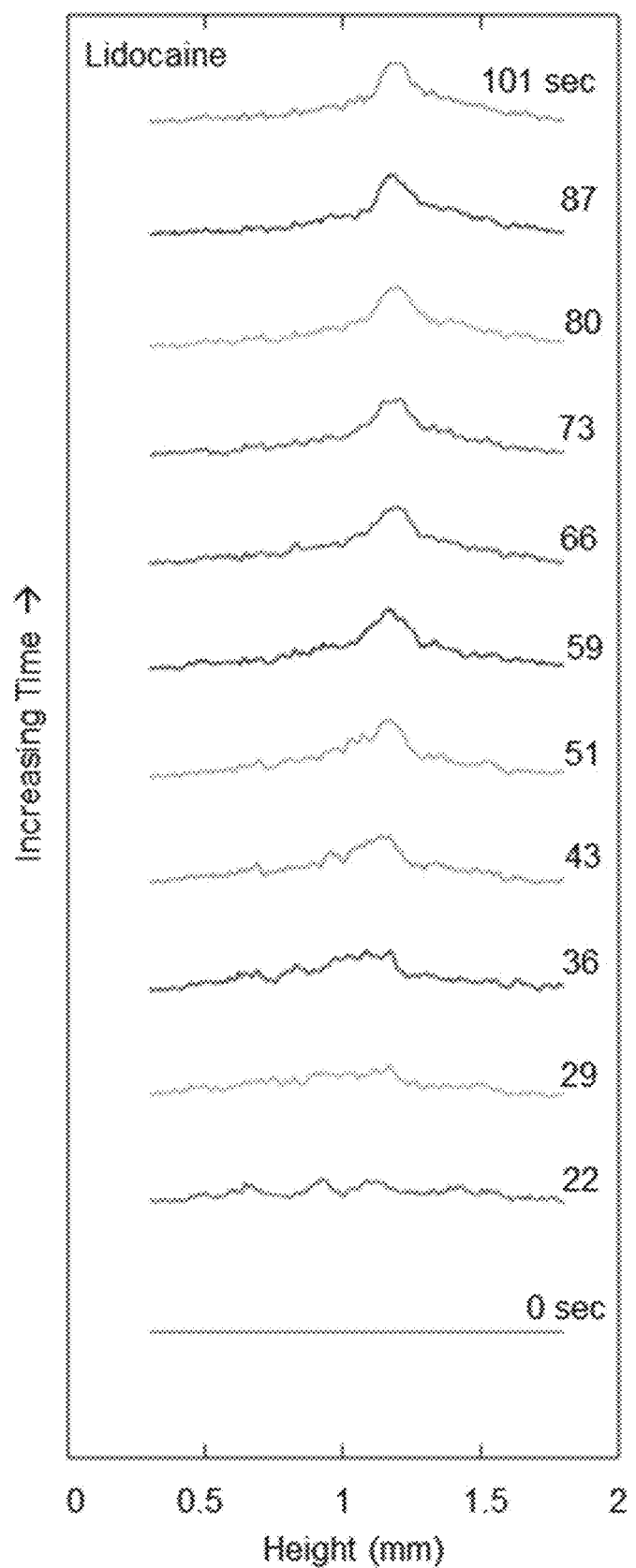
FIG. 16 shows equilibration of equal amounts of lidocaine and caffeine in the MagLev device over time, according to one or more embodiments.
Figure 16:
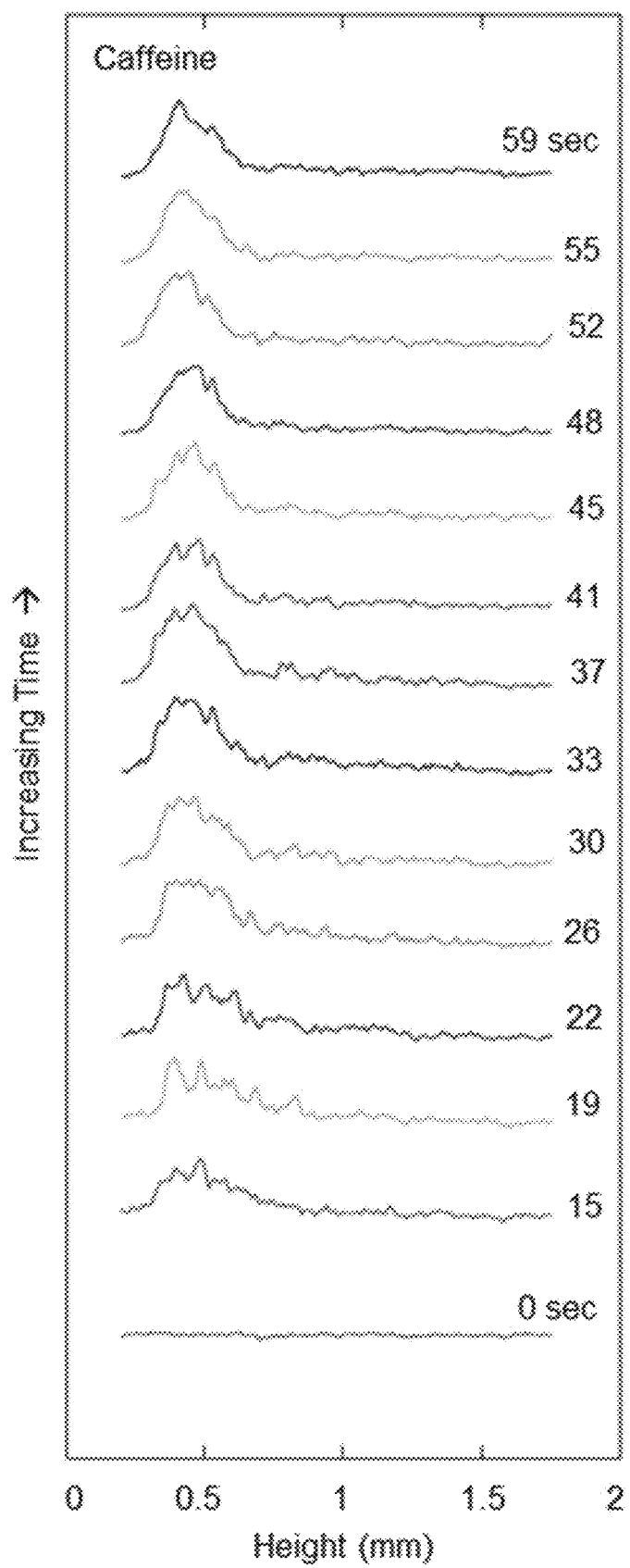
Figure 16:
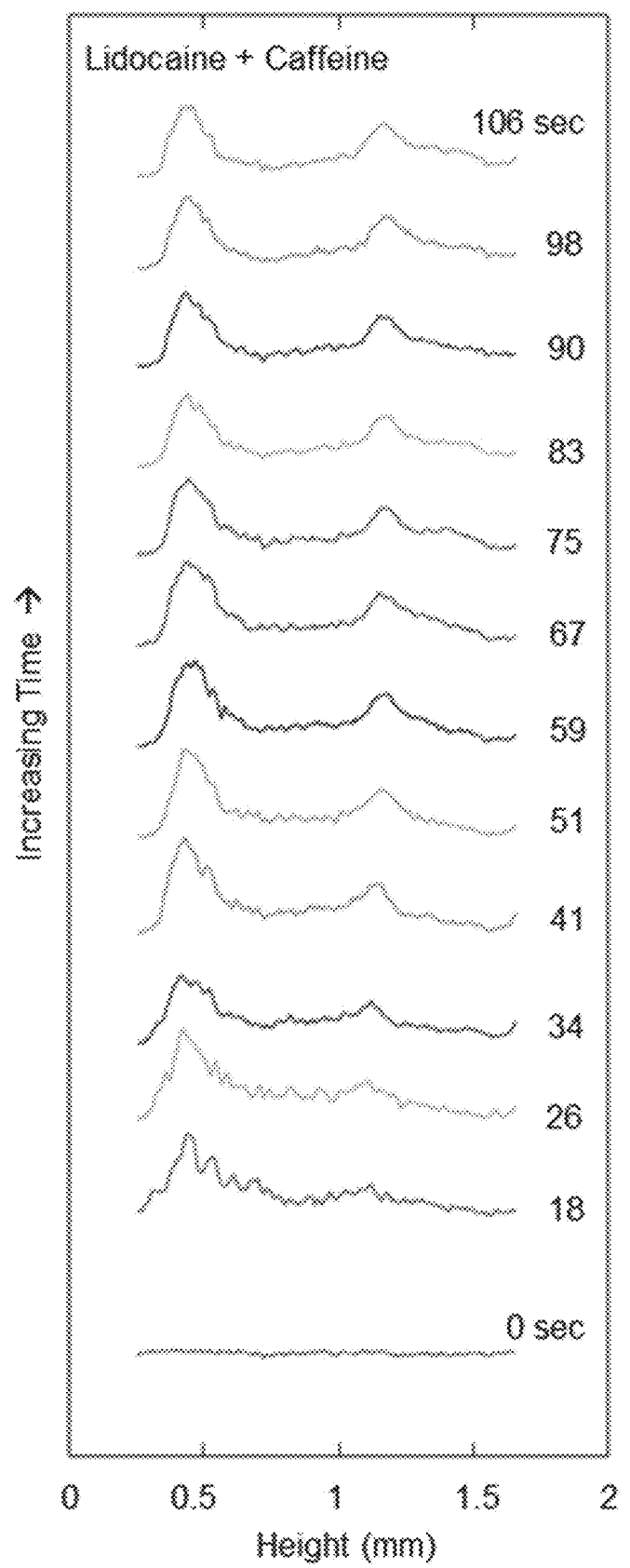

FIG. 16 shows the equilibration of 5 mg lidocaine and 5 mg caffeine in the MagLev device over time, according to some embodiments. The powders were levitated separately (left and middle plot) or together (right plot) in a paramagnetic solution of Gd(DPM)$_3$TOPO (450 mM) in a solvent mixture of 22.9 vol % hexane and 77.1 vol % tetrachloroethylene. The data were obtained from multiple camera images of the levitating powders on a black background acquired over time.

Figure 17:
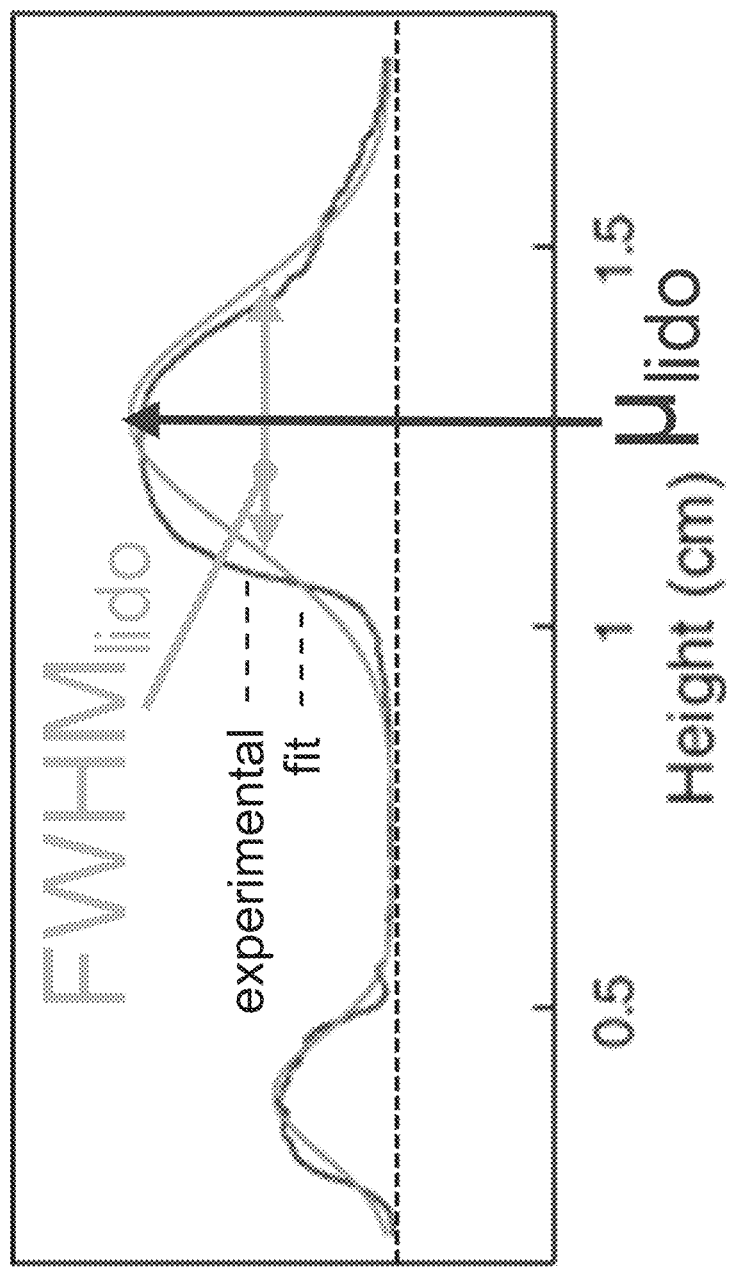
FIG. 17 shows experimental data, and the normal distribution fitted to this data, for lidocaine, according to one or more embodiments.

FIG. 17 shows experimentally measured data and the normal distribution fitted to this data for lidocaine showing the mean, $\mu_{lido}$, and full width at half maximum, FWHM$_{lido}$, of the lidocaine sample at this point in time, according to some embodiments. The left, unlabeled, peak is caffeine.

In some embodiments, small clouds (a few crystals) of levitating compounds can, in some cases, be difficult to detect when averaging the intensity of the pixels for each m-row, especially if there is significant background noise. In some embodiments, an alternative method of generating intensity profiles over the n-direction is to map the light intensity along the m-position with maximum integrated area under the intensity curve (n versus m). In some embodiments, this method was not used to estimate the amount of substance but, using the intensity curve with the strongest possible signal, was used to detect the presence and position (density) of small clouds of compound. This latter method was used, as demonstrated in FIGS. 19A-B, to generate intensity profiles from the images in FIG. 18 for three different time points as the samples separated in the MagLev device. The intensity profiles in FIG. 19A were generated by manually (by eye in ImageJ) estimating the m-position generating the intensity profile with the strongest signal, however, the profile can be automatically generated from images using a computer code that yield a similar result as in FIGS. 19A-B and FIG. 20. In FIG. 20, the intensity curves for 50 mg samples were compared with different proportions of lidocaine HCl and caffeine.

In some cases, the images were taken with a set polarizers that were oriented perpendicular to each other, with the first polarizer being placed between the light source and the cuvette, and the second polarizer between the cuvette and the lens of the camera. The polarizers enabled identification of compounds that polarized light, adding another dimension to the fingerprint.

Figure 18:
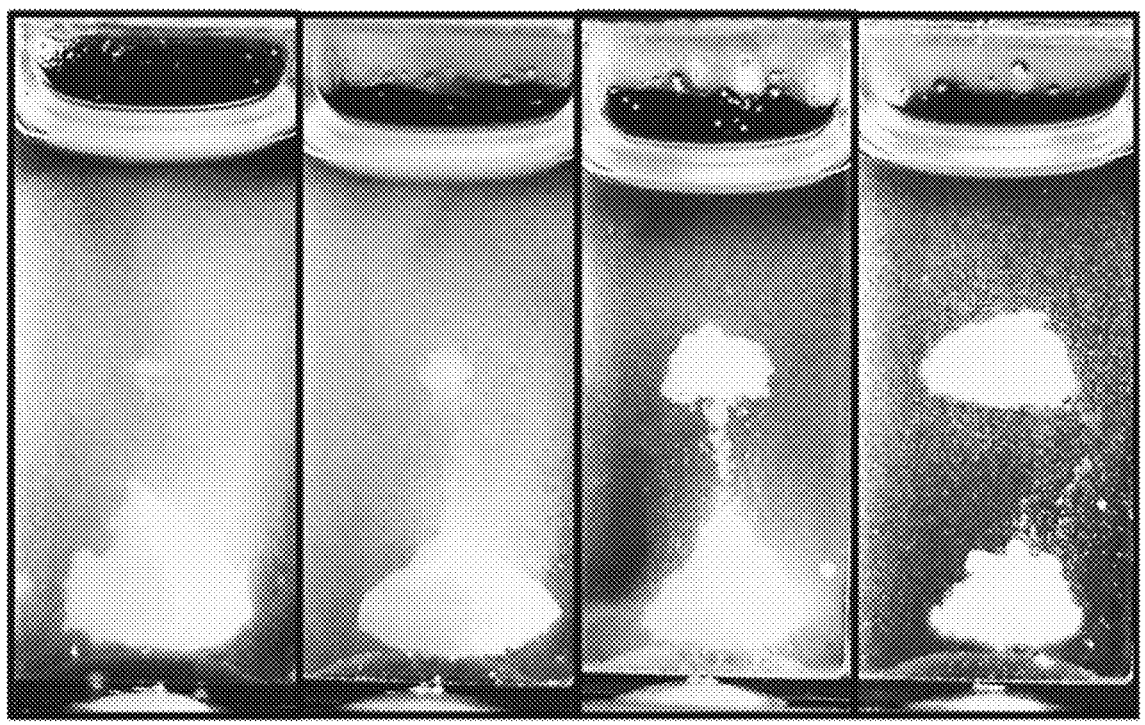
FIG. 18 shows images of the powdered mixtures of lidocaine·HCl and caffeine, in different proportions, after separation in the MagLev device, according to one or more embodiments.
Figure 18:
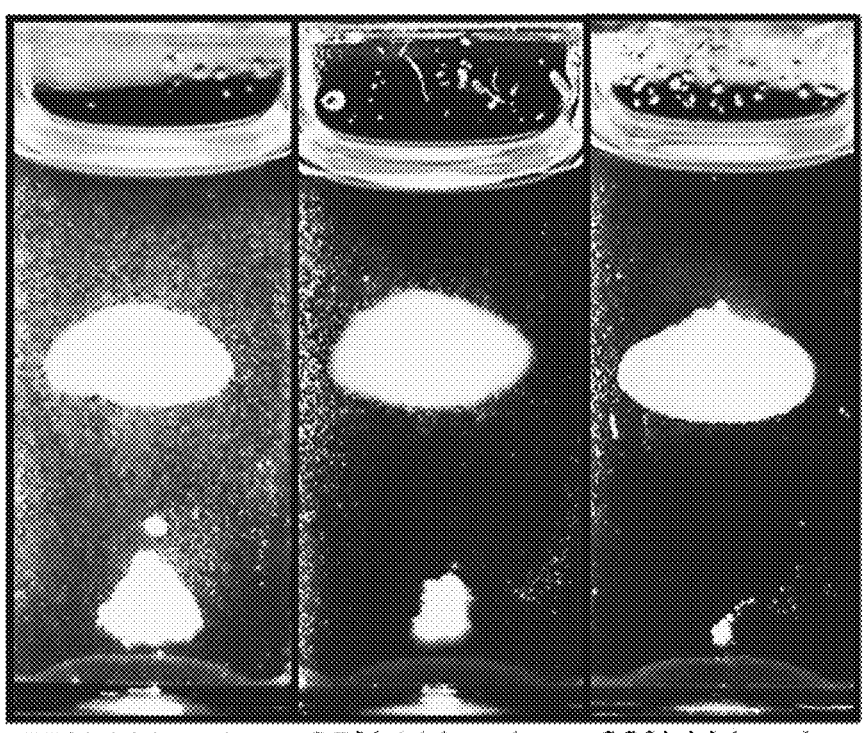

FIG. 18 shows images of the powdered mixtures (50 mg) of lidocaine·HCl and caffeine, in different proportions, after 20 minutes of separation in the MagLev device, according to some embodiments. The paramagnetic solution consisted of Gd(DPM)$_3$TOPO (450 mM) dissolved in a solvent mixture of 22.9 vol % hexane and 77.1 vol % tetrachloroethylene. The cuvette was 25 mm tall.

Figure 19A:
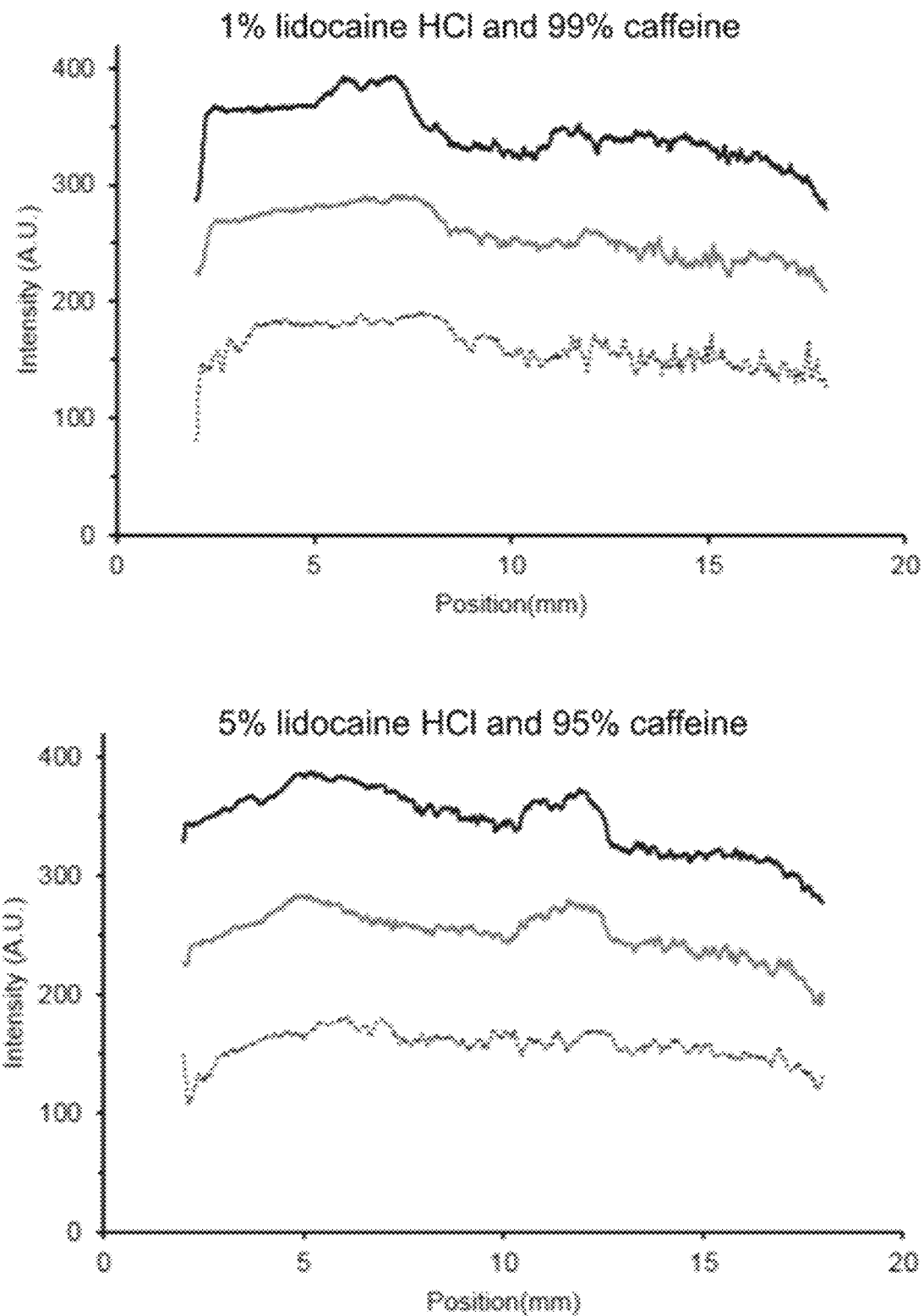
FIG. 19A shows use of ImageJ to follow the separation of mixtures of lidocaine·HCl and caffeine in different proportions over time in the MagLev device, according to one or more embodiments.
Figure 19A:
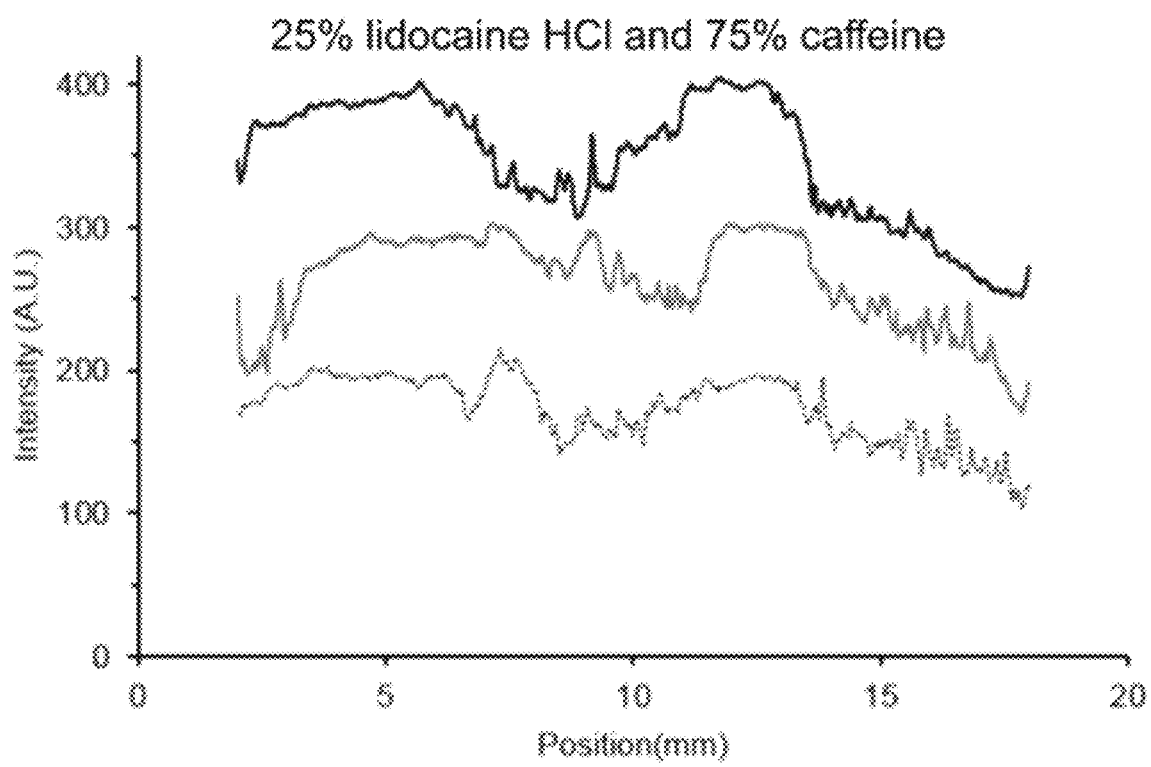
Figure 19A:
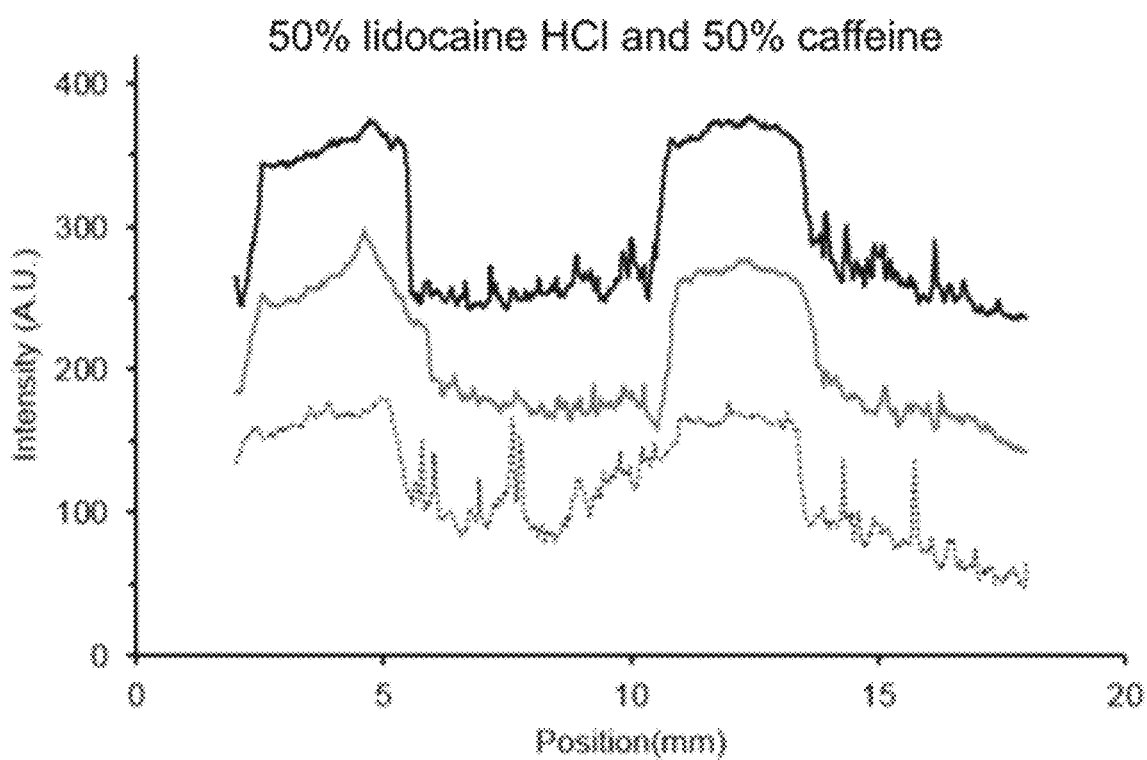
Figure 19A:
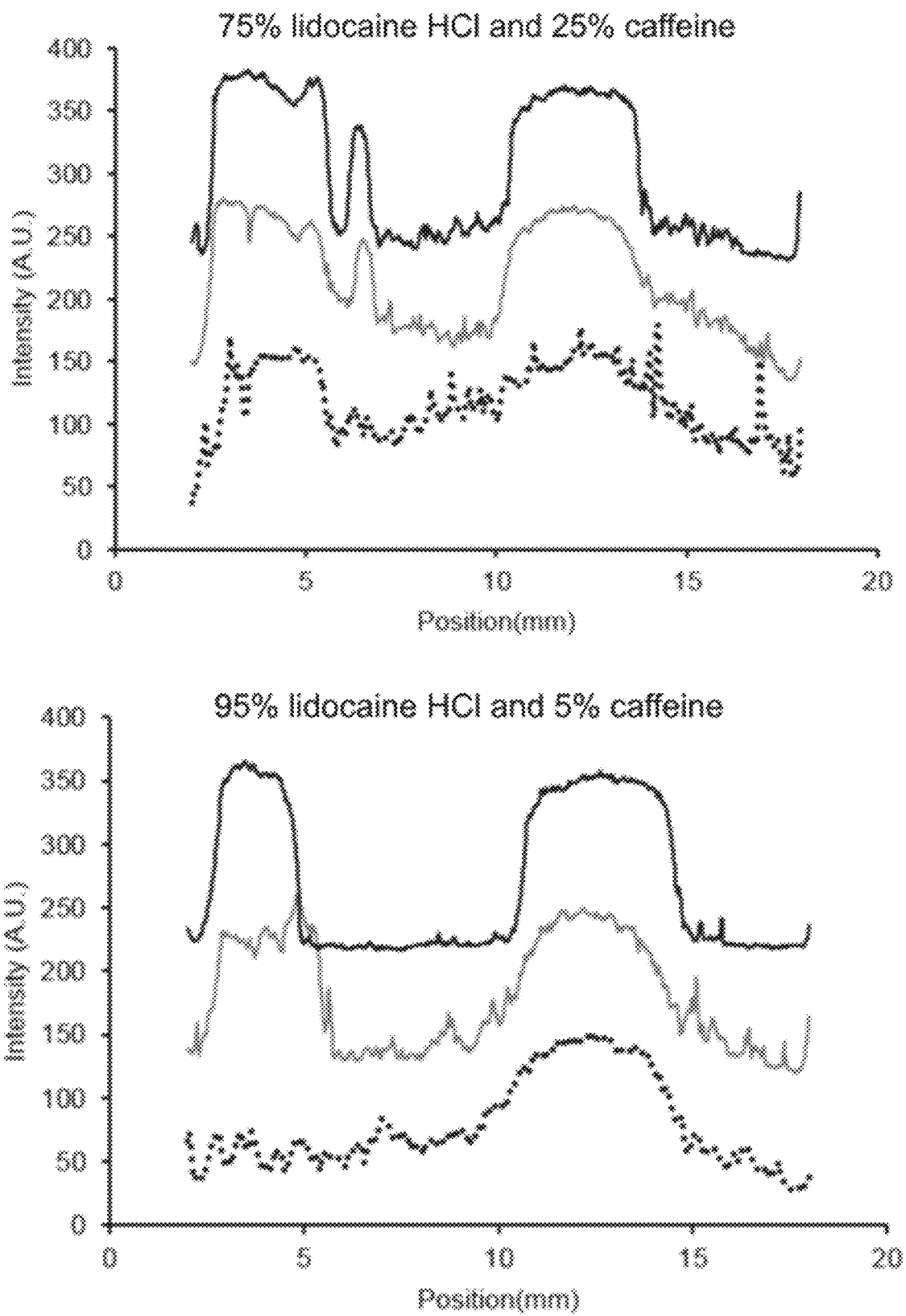
Figure 19A:
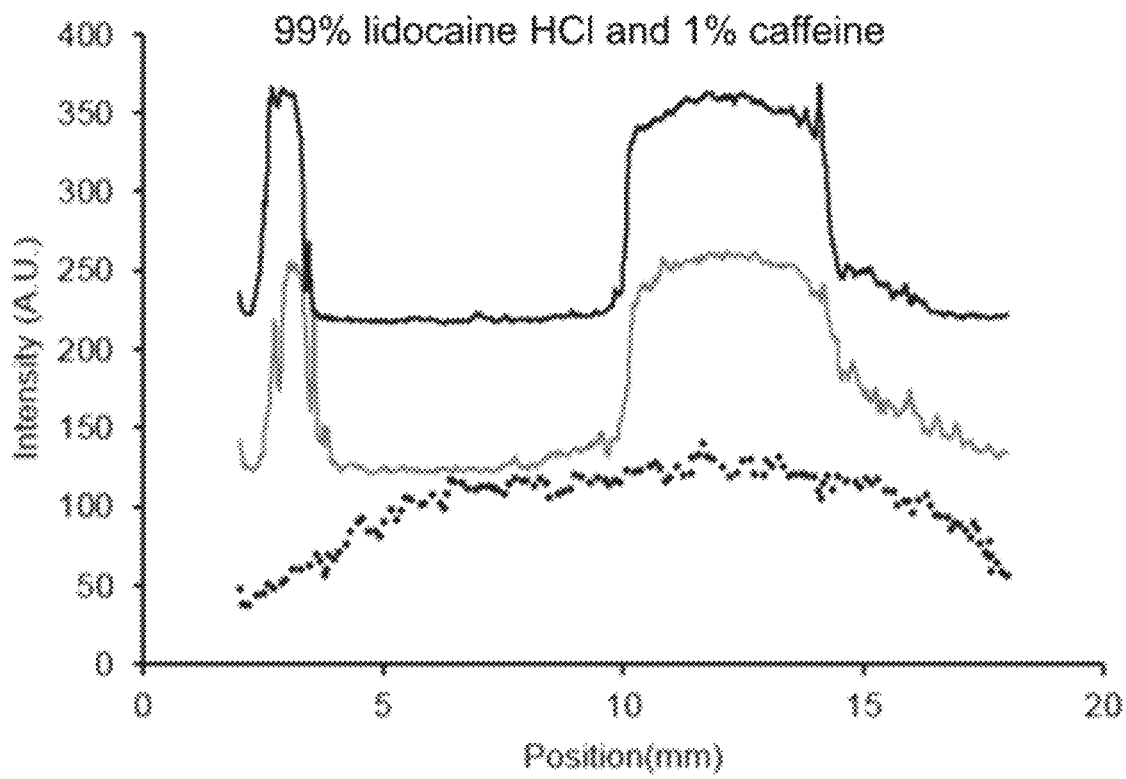
Figure 19B:
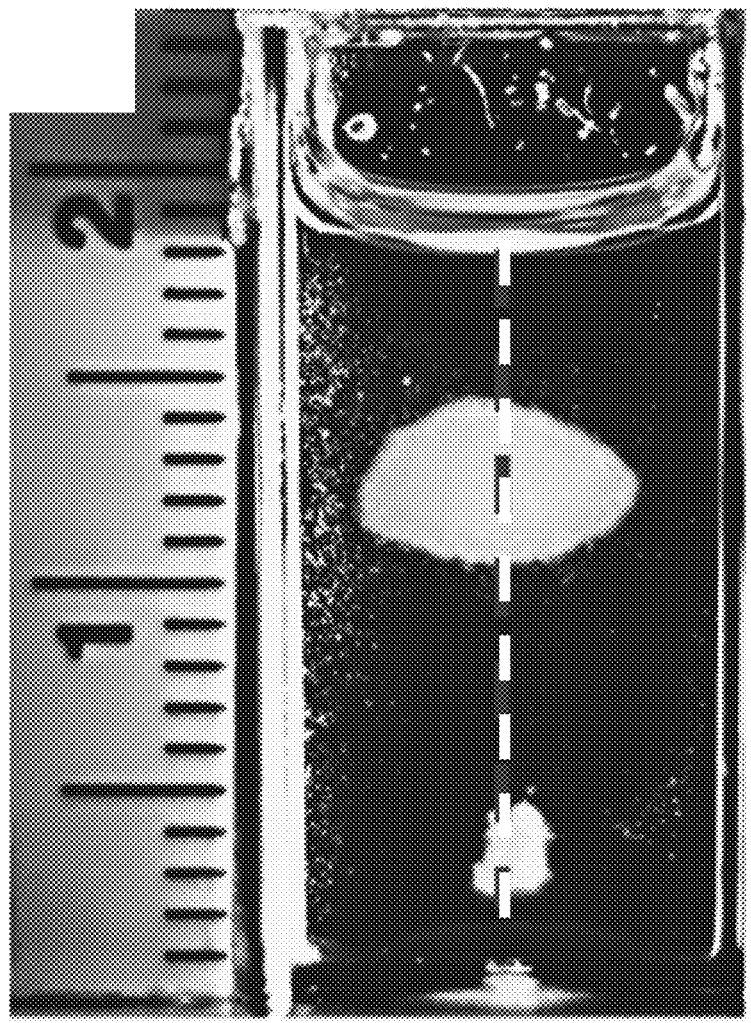
FIG. 19B shows that the profiles of FIG. 19A were measured manually with ImageJ in the middle of the cuvette, according to one or more embodiments.
Figure 20:
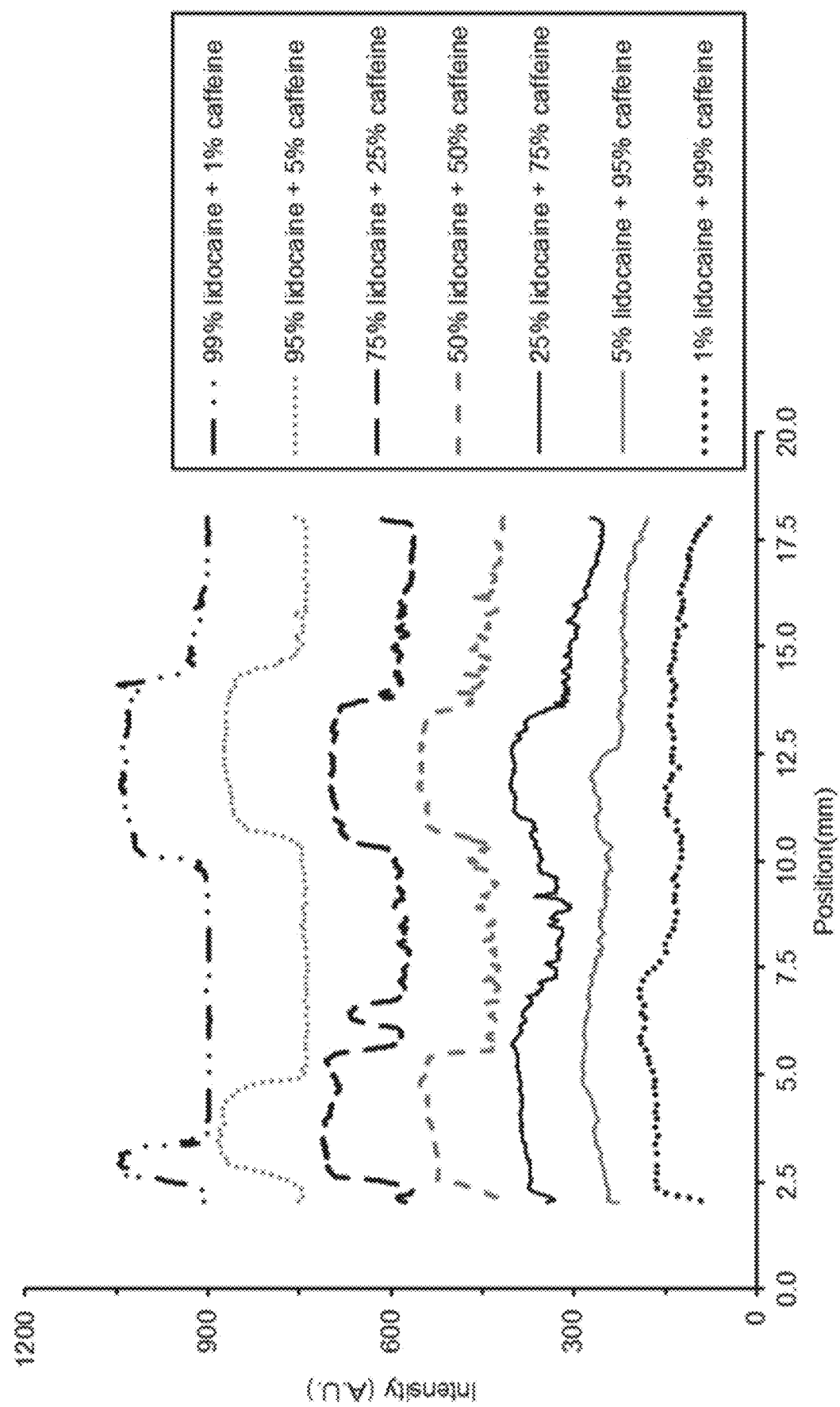
FIG. 20 shows use of ImageJ to measure the separation of mixtures of lidocaine·HCl and caffeine in different proportions in the MagLev device, according to one or more embodiments.

FIG. 19A shows ImageJ was used to follow the separation of mixtures of lidocaine·HCl and caffeine in different proportions over time in the MagLev device. In each plot, the top curve is 20 minutes, the middle curve is 5 minutes, and the bottom curve is 0 minutes. FIG. 19B shows the paramagnetic solution, which consisted of Gd(DPM)$_3$TOPO (450 mM) dissolved in a solvent mixture of 22.9 vol % hexane and 77.1 vol % tetrachloroethylene. All profiles shown in FIG. 19A were measured manually with ImageJ in the middle of the cuvette (dashed line in FIG. 19B). The sample in the camera image contained 95 weight % lidocaine·HCl and 5 weight % caffeine, and it was taken after 20 minutes of separation in the MagLev device.

FIG. 20 shows that ImageJ was used to measure (light intensity-gray value) the separation of mixtures of lidocaine·HCl and caffeine in different proportions in the MagLev device after 20 minutes of separation, according to some embodiments. The paramagnetic solution consisted of Gd(DPM)$_3$TOPO (450 mM) dissolved in a solvent mixture of 22.9 vol % hexane and 77.1 vol % tetrachloroethylene.

Method 2

Figure 21:
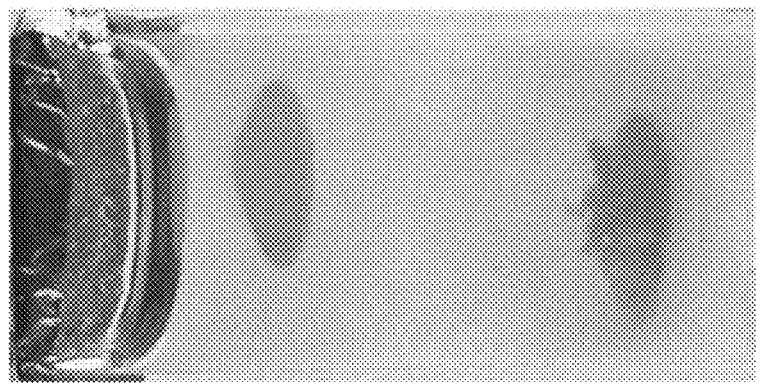
FIG. 21 shows images of levitated samples of powder in the MagLev device, according to one or more embodiments.
Figure 21:
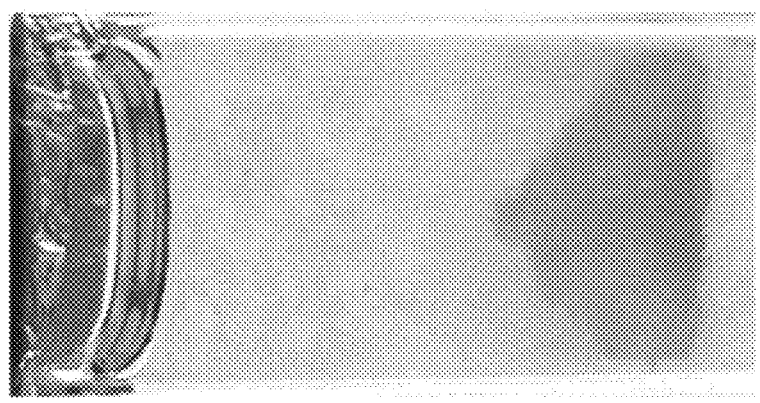
Figure 21:
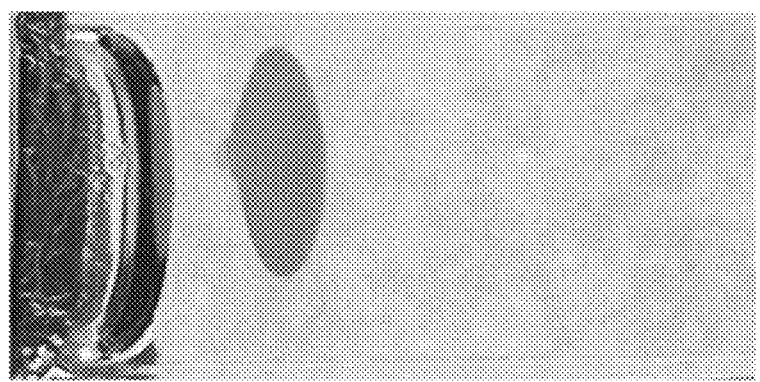

The time series (i.e., the averaged light intensity for each n-row of pixels inside the cuvette) was extracted, using the methods illustrated in FIG. 15, from images, such as the ones exemplified in FIG. 21, and labeled according to their compositions. The images of the separated samples in the cuvette (see FIG. 21) were made in an enclosed box that contained the MagLev device and several light sources for controlled illumination. This illumination and imaging of the separated samples in the MagLev device was highly reproducible. The profiles (time series) for the different samples possessed distinct features (see FIG. 23, FIG. 24, and FIG. 25). For example, lidocaine·HCl had a distinctly different profile than caffeine. In some embodiments, a major challenge in discriminating between lidocaine and caffeine profiles is their variations in the time and measurement domain. For example, lidocaine HCl samples may vary in their compositions resulting in measurement signals that are stretched or compressed (vary over time). To classify the measurement profiles, these variations must be accounted for.

FIG. 21 shows images of levitating samples of powder in the MagLev device, according to some embodiments. The powders (each cuvette contained 50 mg of powder) levitated in a paramagnetic solution (0.45 M Gd(DPM)$_3$TOPO dissolved in tetrachloroethylene) in a cuvette inside the MagLev device. The image was captured after 20 minutes of separation. These images were captured using the box in FIG. 22.

Method 3

Several pathways within machine learning were investigated, including deep neural networks, specifically, convolutional neural networks, for image classification. Rather than processing the images and converting them to spatial sequences, entire sets of images were inserted to train the classifiers (one classifier for each mixture of powders).

The invention claimed is:

1. A magnetic levitation system comprising:
a first and second magnets having surfaces of their like-poles facing each other; and
a container disposed between the first and second magnets' like poles and containing a solution comprising a paramagnetic complex in a non-aqueous solvent; wherein the paramagnetic complex comprises a paramagnetic metal and at least one ligand that coordinates to the paramagnetic metal via electron donation.

2. The system of claim 1, wherein the paramagnetic complex has the structure

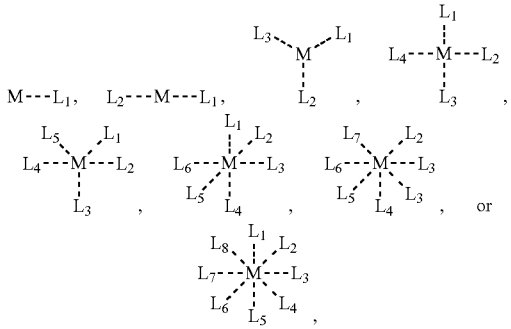

wherein M is a paramagnetic metal and $L_1$, $L_2$, $L_3$, $L_4$, $L_5$, $L_6$, $L_7$, and $L_8$ are ligands that coordinate to the paramagnetic metal via electron donation.

3. The system of claim 2, wherein $L_1$, $L_2$, $L_3$, $L_4$, $L_5$, $L_6$, $L_7$, and La are independently selected from the group consisting of substituted or unsubstituted phosphine oxides, oxazoles, imidazoles, pyridines, diamines, bipyridines, phenanthrolines, diketonates, malonamides, malonates, β-ketoesters, β-ketoamides, carboxylates, dicarboxylates, and ethylenediaminetetraacetic acid.

4. The system of claim 2, wherein two or more of $L_1$, $L_2$, $L_3$, $L_4$, $L_5$, $L_6$, $L_7$, and $L_8$ are covalently bonded to a substituent group consisting of 1-20 carbon atoms.

5. The system of claim 2, wherein at least one of $L_1$, $L_2$, $L_3$, $L_4$, $L_5$, $L_6$, $L_7$, and La comprises

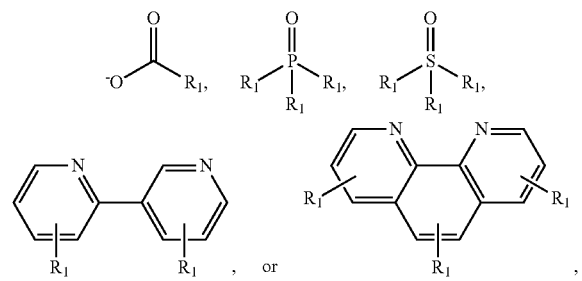

wherein each occurrence $R_1$ is independently H, $(C_1-C_{20})$ alkyl, $(C_2-C_{20})$alkenyl, $(C_2-C_{20})$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

6. The system of claim 5, wherein each occurrence of $R_1$ and $R_2$ is independently $(C_1-C_{10})$alkyl or $(C_6-C_{10})$aryl.

7. The system of claim 5, wherein each occurrence of $R_1$ and $R_2$ is independently methyl, ethyl, propyl, butyl, pentyl, hexyl, heptyl, octyl, nonyl, decyl, phenyl, or isomers thereof.

8. The system of claim 7, wherein each occurrence of $R_1$ and $R_2$ is independently methyl, butyl, tert-butyl, octyl, or phenyl.

9. The system of claim 2, wherein the paramagnetic complex has the structure

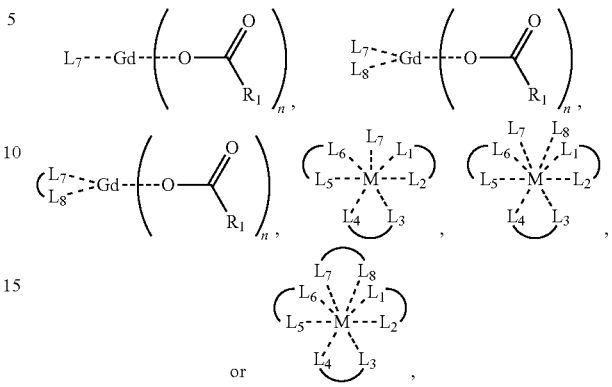

wherein n is an integer from 1-7 and wherein

denotes the group consisting of 1-20 carbon atoms.

10. The system of claim 9, wherein

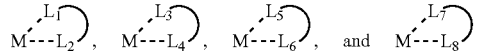

are independently selected from the group consisting of 2,2'-dipyridyl, optionally substituted with one or more $R_1$, 1,10-phenanthrenyl, optionally substituted with one or more $R_1$, and

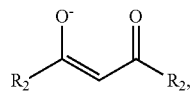

wherein each occurrence of $R_2$ is independently H, $(C_1-C_{20})$ alkyl, $(C_2-C_{20})$alkenyl, $(C_2-C_{20})$alkynyl, $(C_3-C_{10})$cycloalkyl, $(C_6-C_{10})$aryl, or $(C_6-C_{10})$heteroaryl, each of which is optionally substituted with one or more substituents selected from the group consisting of halogen, $R^a$, $OR^a$, $NR^aR^b$, $COR^a$, $CO_2R^a$, or $CONR^aR^b$; and where $R^a$ and $R^b$ are independently selected from the group consisting of hydrogen and $(C_1-C_6)$alkyl.

11. The system of claim 2, wherein the paramagnetic complex has the structure,

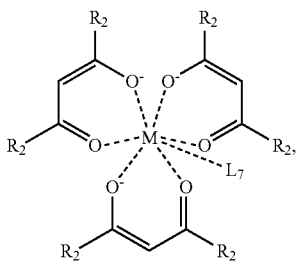

-continued

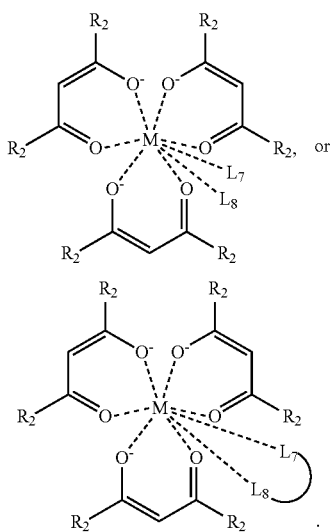

12. The system of claim 11, wherein the paramagnetic complex has the structure

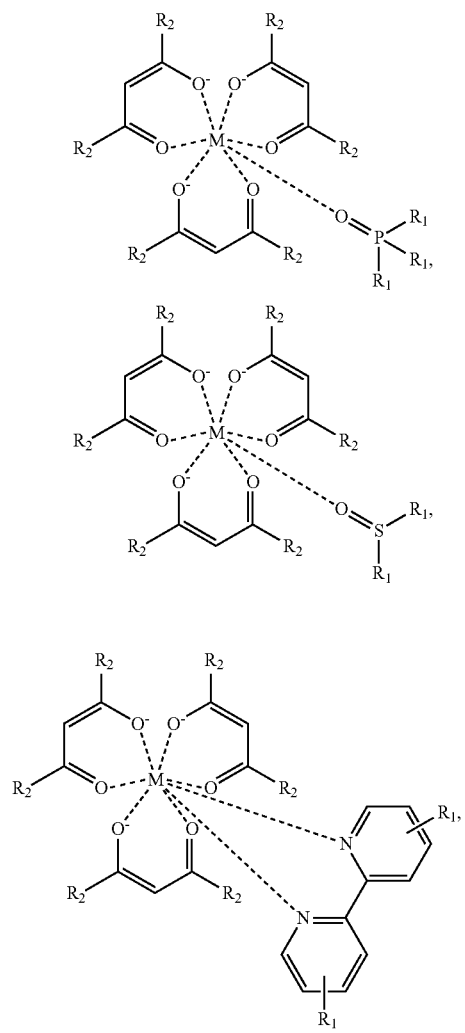

-continued

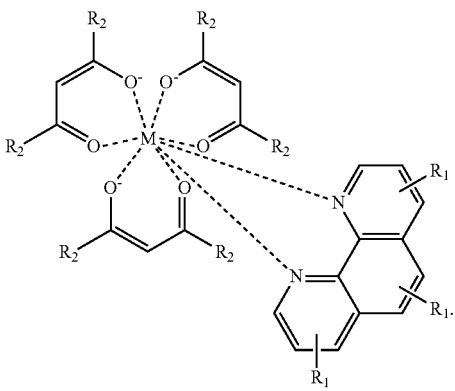

13. The system of claim 2, wherein M is selected from the group consisting of scandium, titanium, vanadium, chromium, manganese, iron, cobalt, nickel, cerium, praseodymium, neodymium, europium, gadolinium, terbium, dysprosium, copper, holmium, erbium, thulium, and lanthanum.

14. The system of claim 13, wherein M is gadolinium.

15. The system of claim 1, wherein the paramagnetic complex is

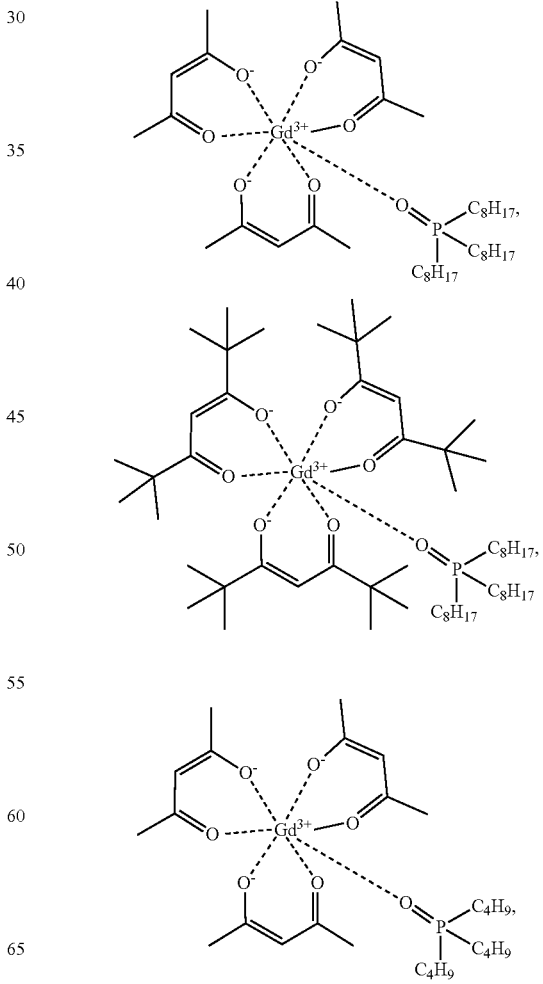

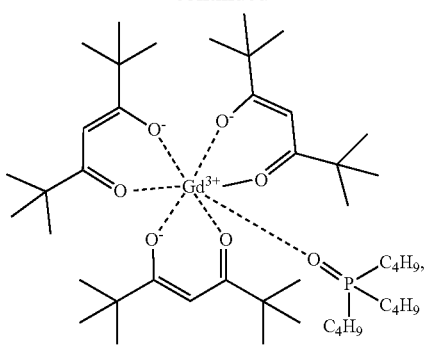
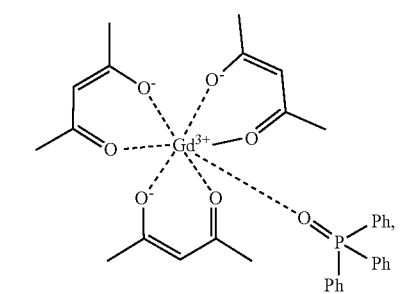
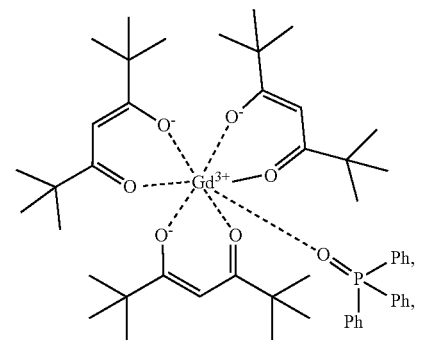
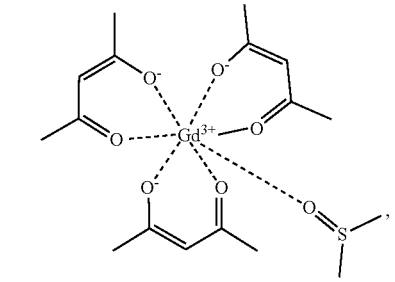
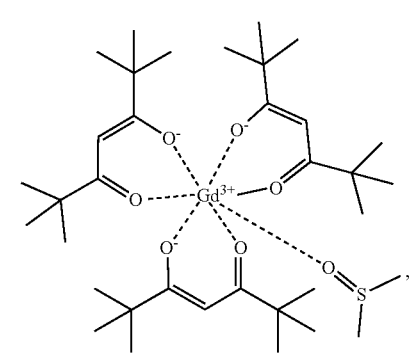
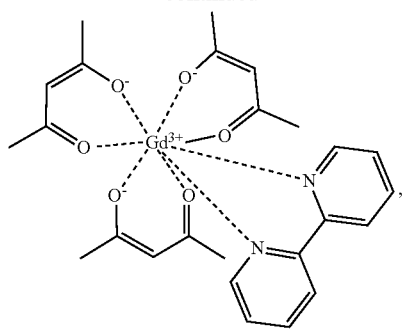
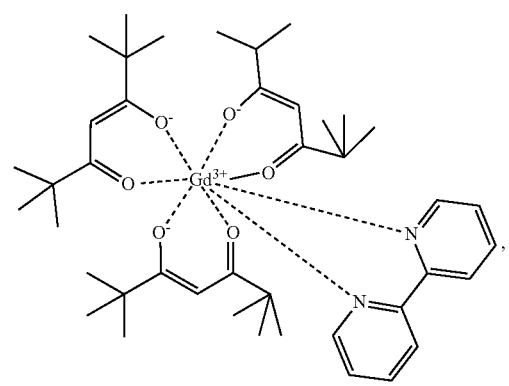
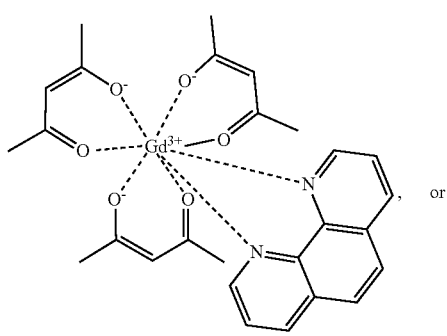
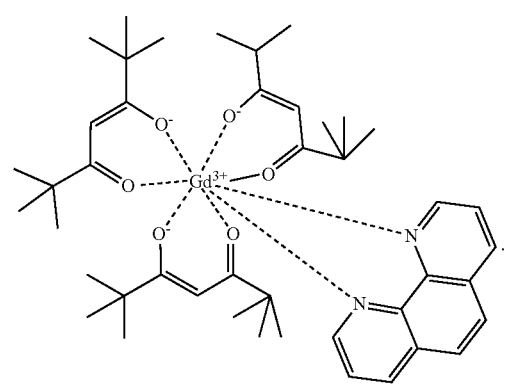

16. The system of claim 15, wherein the paramagnetic complex is

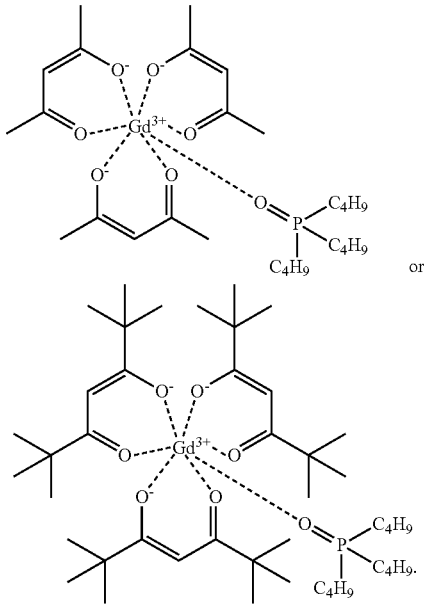

or

17. The system of claim 1, wherein the solvent is selected from the group consisting of acyclic and cyclic hydrocarbons, acyclic and cyclic halo- or per-halo hydrocarbons, aromatic hydrocarbons, acyclic and cyclic ethers, and acyclic and cyclic aldehydes, ketones, esters, amides, sulfides, sulfoxides, and sulfones, and a combination thereof.

18. The system of claim 17, wherein the solvent is pentane, hexane, heptane, octane, nonane, decane, undecane, dodecane, tetrachloroethylene, carbon tetrachloride, dichloromethane, trichloromethane, diethyl ether, tetrahydrofuran, ethyl acetate, butyl acetate, or a combination thereof.

19. The system of claim 18, wherein the solvent is hexane, tetrachloroethylene, or a combination thereof.

20. The system of claim 19, wherein the solvent is tetrachloroethylene.

21. The system of claim 1, wherein the system further comprises a camera, or a light source to illuminate the container, or both.

22. The system of claim 1, wherein the container is an open or closed vessel capable of holding the solution.

23. The system of claim 1, wherein the container is made from a glass, a plastic, a polymer, a ceramic, one or more plant-based fibers in a polymer matrix, one or more plant-based fibers in a ceramic matrix, an aerogel, a gel comprising polar or apolar solvents, a non-ferromagnetic, non-ferrimagnetic, or non-paramagnetic metal, or a combination thereof.

24. The system of claim 1, wherein the container is a cuvette, jar, test tube, centrifuge tube, or capillary tube.

25. The system of claim 24, wherein the container is a cuvette.

26. The system of claim 1, wherein the first and second magnets are each independently selected from the group consisting of a permanent magnet, an electromagnet, and a superconducting magnet.

27. The system of claim 26, wherein the first and second magnets are permanent magnets.

28. The system of claim 1, wherein the first and second magnets are each independently neodymium magnets, samarium-cobalt magnets, ferrite magnets, or Alnico magnets.

29. The system of claim 1, wherein the first and second magnets are each independently shaped as a block, a cylinder, a sphere, a disc, or a ring.

30. A method of analyzing a sample comprising one or more solid compounds, the method comprising:
(a) providing the magnetic levitation system of claim 1;
(b) depositing the sample in the solution; and
(c) allowing each of the solid compounds in the sample to migrate to a position in the container indicative of its density.

31. The method of claim 30, further comprising
(d) analyzing one or more of the solid compounds to determine or confirm its identity.

32. The method of claim 31, wherein step (d) comprises positioning the container such that one or more of the compounds contact the wall of the container and analyzing said compound(s) through the wall of the container using a spectrometer.

33. The method of claim 31, wherein step (d) comprises removing the one or more solid compounds from the container.

34. The method of claim 33, wherein the one or more solid compounds are removed using a pipette, a siphon, a spoon, a spatula, or a small basket.

35. The method of claim 31, wherein the analysis comprises a technique selected from the group consisting of Fourier transform infrared spectroscopy with attenuated total reflectance, mass spectrometry, nuclear magnetic resonance spectroscopy, Raman spectroscopy, X-ray diffractometry, capillary electrophoresis, gas chromatography, ion-mobility spectrometry, liquid chromatography, microcrystalline tests, supercritical fluid chromatography, thin layer chromatography, ultraviolet/visible spectroscopy, microscopy, visual examination, colorimetric tests, fluorescence spectroscopy, immunoassays, melting point analysis, pharmaceutical package inserts, and combinations thereof.

36. The method of claim 35, wherein the technique comprises a portable or handheld device.

37. The method of claim 35, wherein the technique is Fourier transform infrared spectroscopy with attenuated total reflectance, Raman spectroscopy, mass spectrometry, X-ray diffractometry, a colorimetric test, or a combination thereof.

38. The method of claim 35, wherein the Raman spectroscopy is conducted using a portable or handheld device.

39. The method of claim 30, wherein the sample is a crystalline or amorphous sample.

40. The method of claim 30, wherein the sample comprises one or more controlled substances, adulterants, diluents, or a combination thereof.

41. The method of claim 30, wherein the sample comprises fentanyl, acetyl fentanyl, benzyl fentanyl, carfentanyl, cocaine, heroin, oxycodone, methamphetamine, cannabinoids, lysergic acid diethylamide, methaqualone, methadone, hydromorphone, Ritalin, Adderall, peyote, 3,4-methylenedioxymethamphetamine, acetaminophen, caffeine, diltiazem, dipyrone/metamizole, lidocaine, hydroxyzine, levamisole, papaverine, procaine, phenacetin, dimethyl sulfone, D-fructose, D-glucose, α-lactose, D-mannitol, sodium carbonate, starch, including potato starch, sucrose, talc, quinine, butylated hydroxytoluene, hypromellose, polyethylene glycol, polyethylene oxide, magnesium stearate, titanium dioxide, an isomer thereof, a salt thereof, a combination thereof.

42. The method of claim 41, wherein the salt is a sodium, aluminum, potassium, calcium, hydrochloride, citrate, nitrate, sulfate, acetate phosphate, diphosphate, maleate, mesylate, tartrate, or gluconate salt.

43. The method of claim 42, wherein the salt is a hydrochloride salt.

44. The method of claim 30, wherein the sample comprises a salt of fentanyl or caffeine.

45. The method of claim 30, wherein the one or more compounds are present in the sample between 0.01 and 100 weight percent.

46. The method of claim 45, wherein the one or more compounds are present in the sample between 0.01 and 10 weight percent.

47. The method of claim 30, further comprising:
(e) generating a profile of the position of the one or more compounds relative to the container; and
(f) generating a database comprising a plurality of profiles, each of which corresponds to a known solid compound or a known mixture of solid compounds.

48. The method of any one of claim 47, wherein the profile of the sample and the profiles of the database are determined at a plurality of time points after the sample is deposited in the solution in step (b).

49. The method of claim 47, further comprising:
(g) comparing the profile of the sample to the profiles in the database.

50. The method of claim 49, wherein step (g) further comprises determining the identity of the compound based on the comparison.

51. The method of claim 49, wherein step (g) further comprises:
using a computer to calculate the distances between the generated profile of the sample and the profiles in the database to identify a profile in the database within a minimum distance to the generated profile; wherein the distance is a Euclidian or Mahalanobis distance.

52. The method of claim 49, wherein the profile in the database further comprises the source of the known solid compound or the known mixture of solid compounds and step (g) further comprises determining the source of the sample.

53. The method of claim 49, wherein step (g) further comprises determining the particle size or the mixture of particle sizes of the compound.

54. The method of claim 49, wherein the profile in the database further includes a source of the compound and step (g) further comprises determining the source of the sample.

55. The method of claim 30, wherein the method comprises obtaining and processing spectroscopic, spectrometric, chromatographic, colorimetric, microscopic, photographic, or visual signals of the one or more solid compounds at a position in the container before, at predetermined times during migration, and after migration.

56. The method of claim 55, wherein the method comprises obtaining and processing microscopic or photographic images of the one or more solid compounds at a position in the container before, at predetermined times during migration, and after migration.

57. The method of claim 56, wherein the light intensity of one or more portions of the image before, at predetermined times during migration, and after migration is measured.

58. The method of claim 55, wherein the signals, images, or light intensity measurements of the container are processed by using dynamic time warping, barycenter averaging, machine learning, or a combination thereof.

59. The method of claim 58, wherein the machine learning comprises deep neural networks.

60. The method of claim 59, wherein the machine learning comprises supervised deep learning to train a convolutional neural network on hundreds-to-thousands of signals, images, or light intensity measurements.

61. The method of claim 60, wherein the analysis of unknown mixtures comprises inputting one or more generated signals, images, or light intensity measurements into the trained convolutional neural network and obtaining an output of the identity of the mixture.

* * * * *